United States Patent [19]
Goldsmith et al.

[11] Patent Number: 5,619,061
[45] Date of Patent: Apr. 8, 1997

[54] MICROMECHANICAL MICROWAVE SWITCHING

[75] Inventors: Charles Goldsmith, Plano; Bradley M. Kanack, Desoto; Tsen-Hwang Lin, Dallas; Bill R. Norvell, Richardson; Lily Y. Pang, McKinney; Billy Powers, Jr., Richardson; Charles Rhoads, McKinney; David Seymour, Plano, all of Tex.

[73] Assignee: Texas Instruments Incorporated, Dallas, Tex.

[21] Appl. No.: 332,282

[22] Filed: Oct. 31, 1994

Related U.S. Application Data

[63] Continuation-in-part of Ser. No. 97,824, Jul. 27, 1993, Pat. No. 5,526,172.

[51] Int. Cl.$^6$ .................................................. H01L 29/00
[52] U.S. Cl. .......................... 257/528; 257/415; 257/619
[58] Field of Search ................................ 257/528, 532, 257/415, 419, 619, 621

[56] References Cited

U.S. PATENT DOCUMENTS

| | | | |
|---|---|---|---|
| 4,674,180 | 6/1987 | Zavracky et al. | 29/622 |
| 4,959,515 | 9/1990 | Zavracky et al. | 200/181 |
| 5,061,049 | 10/1991 | Hornbeck | 359/213 |
| 5,121,089 | 6/1992 | Larson | 333/107 |
| 5,164,688 | 11/1992 | Larson | 333/33 |
| 5,168,249 | 12/1992 | Larson | 333/81 A |
| 5,175,521 | 12/1992 | Larson | 333/235 |
| 5,479,042 | 12/1995 | James et al. | 257/415 |

OTHER PUBLICATIONS

R. T. Howe et al., "Silicon Micromechanics: Sensors and Actuators on a Chip," IEEE Spectrum, Jul. 1980, pp. 29–35.
J. Bryzek et al., "Micromachines on the March," IEEE Spectrum, May 1994, pp. 20–31.
K. E. Petersen, "Dynamic Micromechanics on Silicon: Techniques and Devices," IEEE Transactions of Electron Devices, vol. ED–25, No. 10, Oct. 1978, pp. 1241–1250.
K. E. Peterson, "Micromechanical Membrane Switches on Silicon," IBM J. Res. Develop., vol. 23, No. 4, Jul. 1979, pp. 376–385.
K. E. Peterson, "Forming the Contact Surface of Micromechanical Switches," IBM Technical Disclosure Bulletin., vol. 25, No. 4, Sep. 1982, pp. 2048–2050.
K. E. Peterson, "Electrostatically Controlled Micromechanical Switches Fabricated from All–Amorphous Films on Arbitrary Substrates," IBM Technical Disclosure Bulletin., vol. 21, No. 9, Feb. 1979, pp. 3768–3769.
J. J. Yao, "A Surface Micromachined Miniature Switch for Telecommunications Applications with Signal Frequencies from DC up to 4 Ghz," Transducers '95 – Eurosensors IX, Stockholm Sweden, Jun. 25–29, 1995, pp. 384–387.
R. Wright, "Sematech's Electrostatic Chuck Project," TI Technical Journal, Nov.–Dec. 1994, pp. 40–46.
D. Bosch et al., "A Silicon Microvalve with Combined Electromagnetic/Electrostatic Actuation," Sensors and Actuators A. 37–38 (1993), pp. 684–692.
Xi–Qing Sun, "Study of Fabrication Process of a Micro Electrostatic Switch and its Application to a Micro–mechanical V–F Converter," Sensors and Actuators A. 32 (1993), pp. 189–192.

*Primary Examiner*—Mark V. Prenty
*Attorney, Agent, or Firm*—Christopher L. Maginniss; James C. Kesterson; Richard L. Donaldson

[57] ABSTRACT

Micromechanical microwave switches with both ohmic and capacitive coupling of rf lines and integration in multiple throw switches useful in microwave arrays.

19 Claims, 42 Drawing Sheets

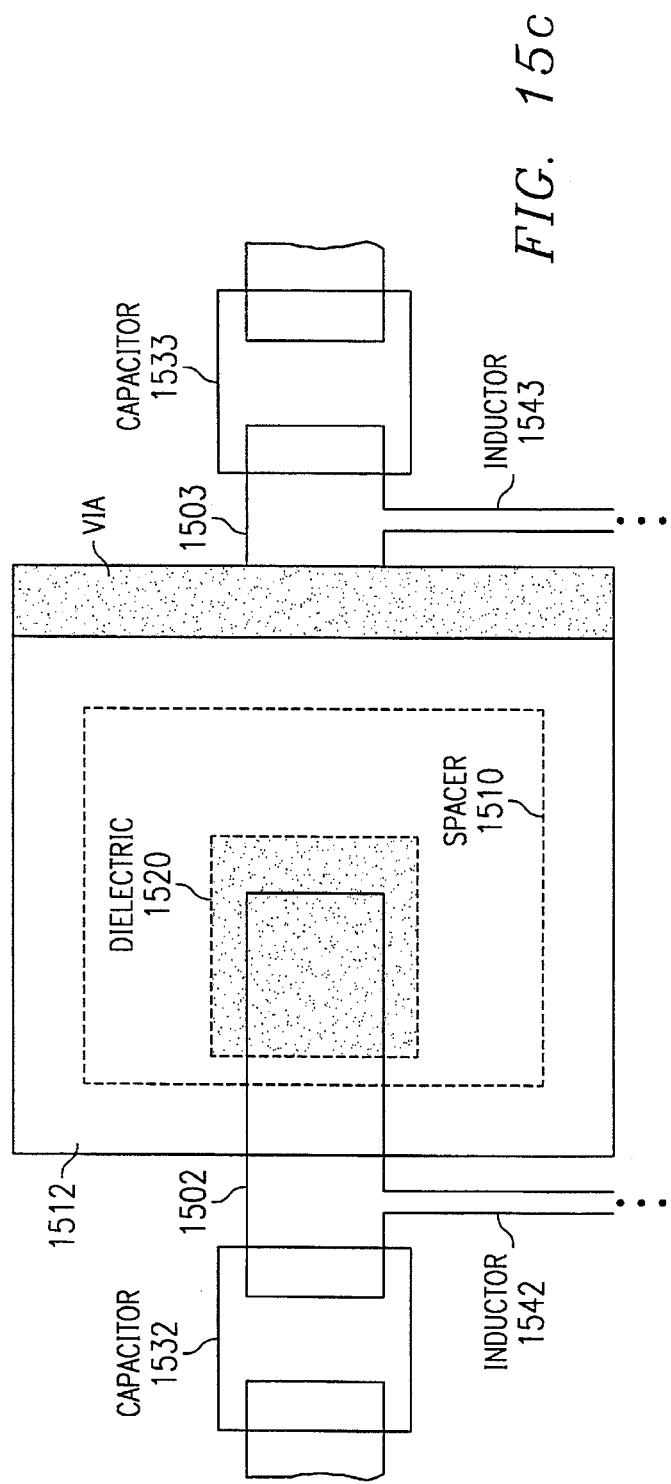
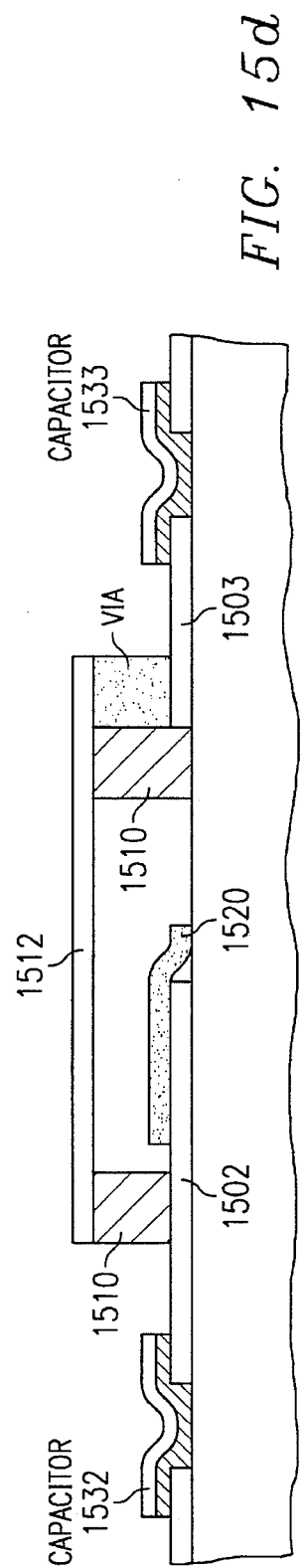
FIG. 15c
FIG. 15d

CAPACTIVE SWITCH METALLIZED DIELECTRIC MEMBRANE

OHMIC SWITCH METALLIZED MEMBRANE

3400

* UNITS OF PHASE SHIFT ARE π/8 RADIANS
⊗ HYBRID

LOCATION OF BEAMS FOR LOSSLESS 8-ELEMENT 8-BEAM MATRIX

MICROMECHANICAL MICROWAVE SWITCHING

CROSS-REFERENCE TO RELATED APPLICATIONS

This is a continuation-in-part of U.S. patent application Ser. No. 08/097,824, filed Jul. 27, 1993, and now U.S. Pat. No. 5,526,172.

BACKGROUND OF THE INVENTION

The invention relates to switches for electrical signals, and, more particularly, to switches and systems for high frequency signals with micromechanical switch elements.

Typical rf switches are p-i-n diodes, but p-i-n diodes have problems including power consumption (the diode must be forward biased to provide carriers for the low impedance state), high cost, and nonlinearity.

Peterson, Dynamic Micromechanics on Silicon: Techniques and Devices, 25 IEEE Tr.El.Dev. 1241 (1978), includes silicon micromechanical metal-coated cantilevers which act as metal-to-metal switches. FIGS. 1a–b illustrate in plan and cross sectional elevation views of such switches with silicon dioxide ("oxide") cantilever 102 extending out over 7 µm-deep opening 104 etched in silicon substrate 106. Metal electrodes 108–109 extend onto cantilever 102, and metal conductor 110 extends onto and up and out over the end of cantilever 102. Metal contact 120 on oxide 112 lies in the same plane as canitlever 102 and extends out under the end of conductor 110. The switch operates as follows. With no voltage applied between electrodes 108–109 and silicon substrate 106, cantilever 102 remains parallel to the surface of silicon substrate 106 and the switch is open. However, about 60 volts applied between the electrodes and the substrate pulls cantilever 102 towards substrate 106 until the end of conductor 110 makes contact with metal 120. This closes the switch. Release of the pull down voltage then opens the switch.

Micromechanical spatial light modulators with metallized polymer membranes appear in Hornbeck, U.S. Pat. No. 4,441,791. FIG. 2a shows a cross sectional elevation view through two pixels of an array of such pixels, and FIG. 2b shows the equivalent circuit. Voltage applied between the metal film 30–31 on the underside of polymer membrane 35 and the underlying electrode 21 pulls the membrane part way down to the electrode and thereby disrupts the flat surface of reflecting metal film 26 on the polymer membrane and thereby modulates reflected light. Applying too large a voltage collapses the polymer membrane down to the electrode and destroys the pixel. Selectively applying voltages to pixels in the array permits spatial light modulation.

Spatial light modulators with pixels made of metal torsion beams with landing pads appears in Hornbeck, U.S. Pat. No. 5,061,049. FIGS. 3a–d show such a pixel in perspective, cross sectional and plan views with metal beam 30 suspended by thin metal torsion hinges 34 and 36 over underlying electrodes 42 and 46 plus landing pads 40-14 41. With no voltage applied between electrodes 42, 46 and beam 30, the beam remains parallel to the metal surface 26, 28 as in FIG. 3b. A voltage applied between electrode 42 and beam 30 pulls on the beam and the beam twists counterclockwise (in FIG. 3d) on hinges 34, 36 and one beam edge moves down toward the electrode while the other beam edge rises as illustrated. Beam 30 stops when it contacts landing pad 40, which is at the same voltage as the beam (typically, ground). With beam 30 in this tilted position, light reflects at a different angle from the beam than light reflecting from the surface 28. Removal of the applied voltage allows hinges 34, 36 to relax and return beam 30 to the position parallel to the surface 28. Thus an array of such pixels can act as a spatial light modulator.

Further, applying a voltage between electrode 46 and beam 30 (and no voltage between electrode 42 and beam 30) will analogously twist beam 30 in the clockwise direction until it makes contact with landing pad 41. This provides a second angle of reflection for incident light.

SUMMARY OF THE INVENTION

The present invention provides micromechanical microwave switches and arrays of switches with membranes and flaps supported on at least two sides.

The invention has advantages including switches with no power consumption, low cost, and linearity; and also compatibility with both silicon and gallium arsenide integrated circuits.

BRIEF DESCRIPTION OF THE DRAWINGS

The drawings are schematic for clarity.

FIGS. 15a–d are variations of the embodiment of FIGS. 14a–d.

DESCRIPTION OF THE PREFERRED EMBODIMENTS

Overview of Preferred Embodiments

The preferred embodiment systems use single ones or arrays of preferred embodiment switches for functions such as beam steering in a phased array radar. And the preferred embodiment switches all switch a high frequency electrical signal by deflecting a movable element (conductor or dielectric) into or out of a signal path to open or close either capacitive or ohmic connections. FIGS. 4a–29 illustrate preferred embodiment switches, and FIGS. 31–45 show preferred embodiment systems incorporating preferred embodiment switches.

Figure 1A:
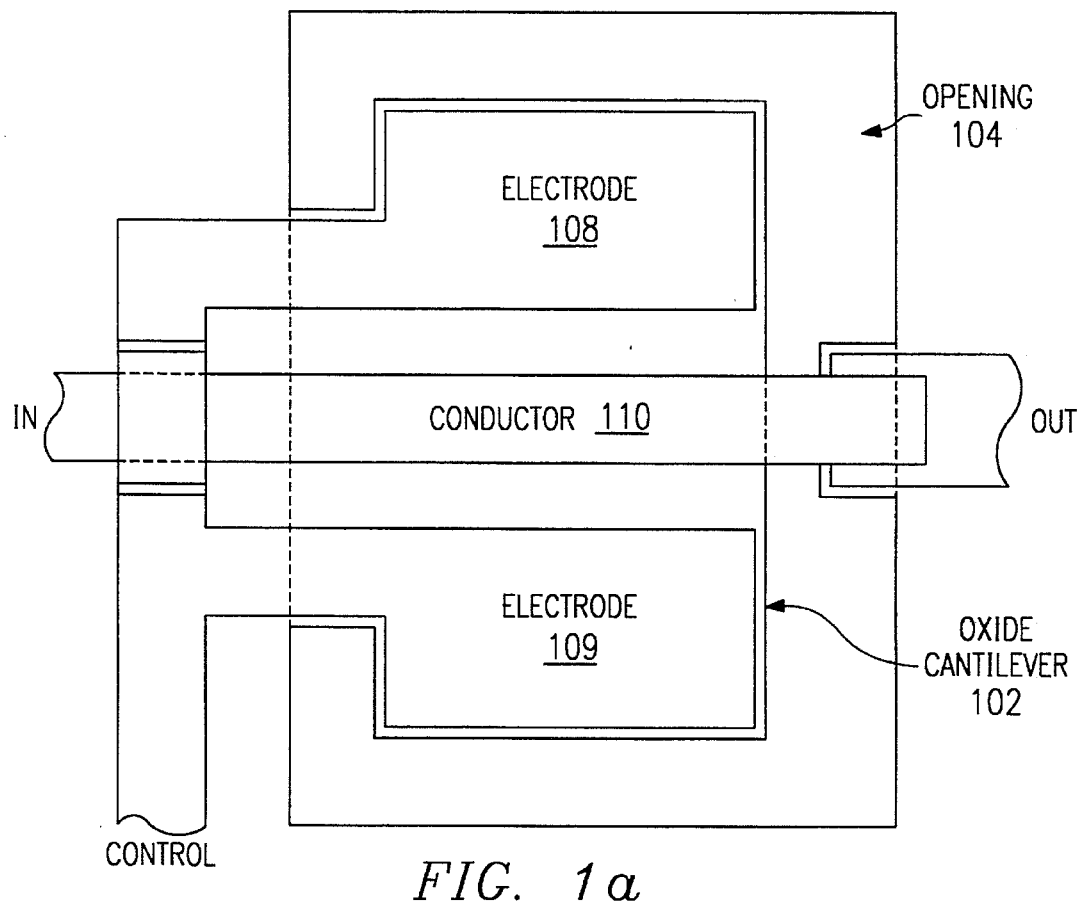
FIGS. 1a–b show a known micromechanical switch.
Figure 1B:
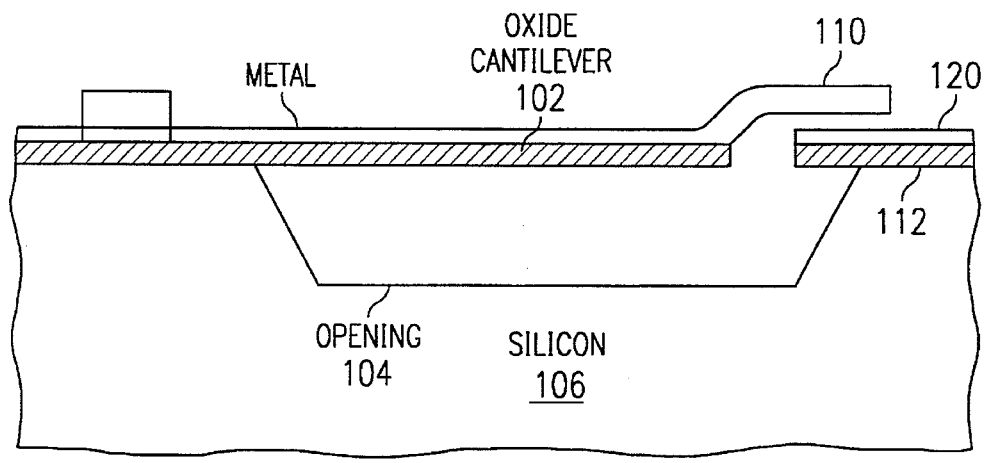
Figure 2A:
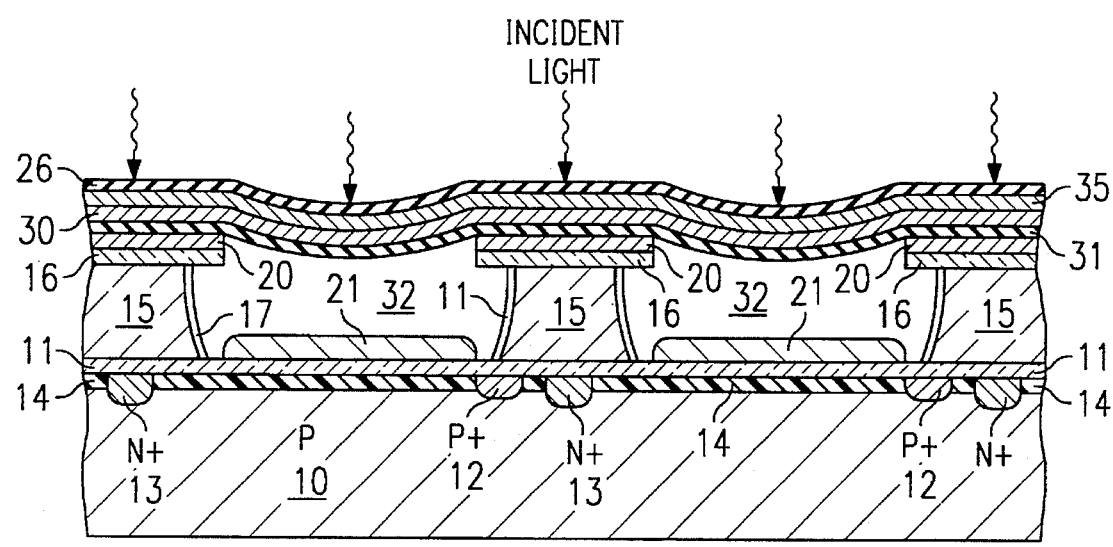
FIGS. 2a–b illustrate a known polymer spatial light modulator pixel.
Figure 2B:
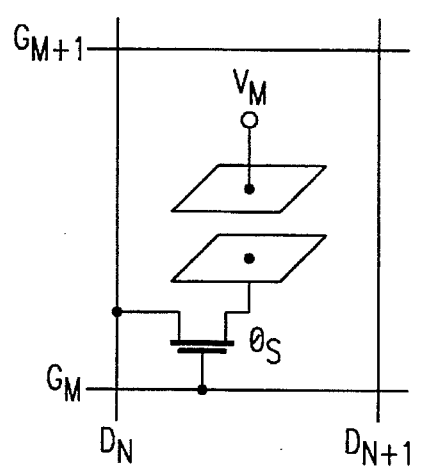
Figure 3A:
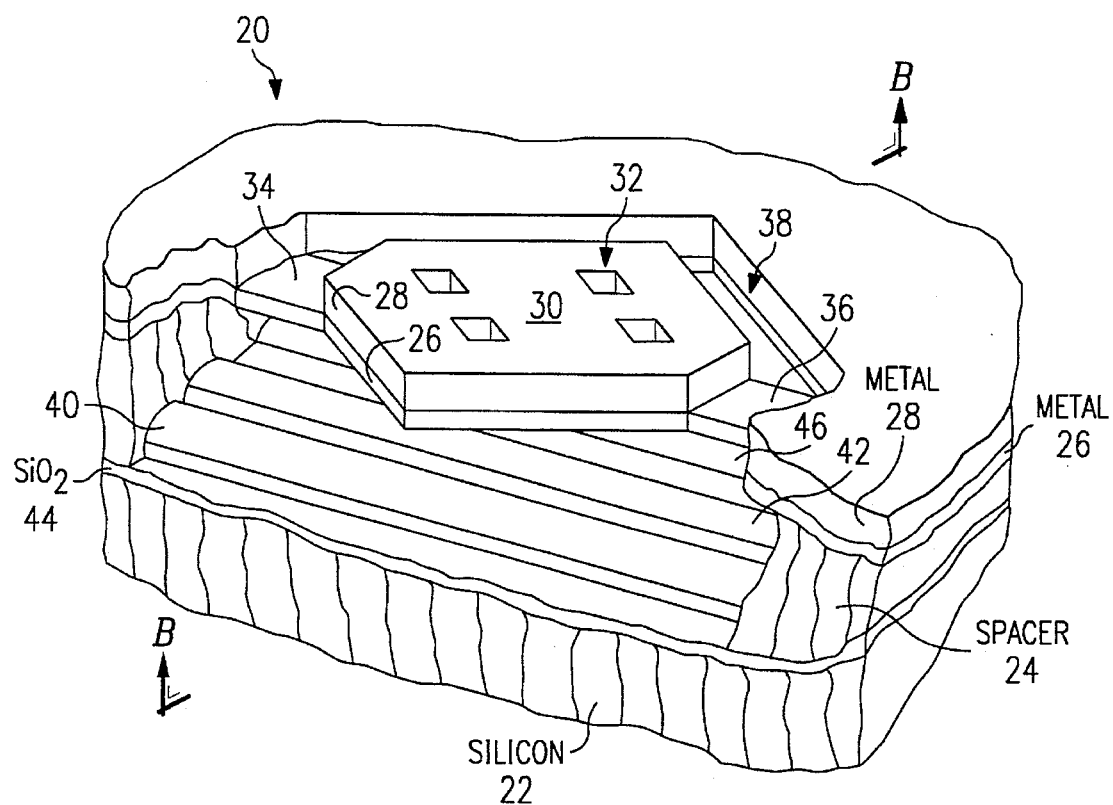
FIGS. 3a–d are perspective, cross sectional, and plan views of a metal torsion beam spatical light modulator pixel.
Figure 3B:
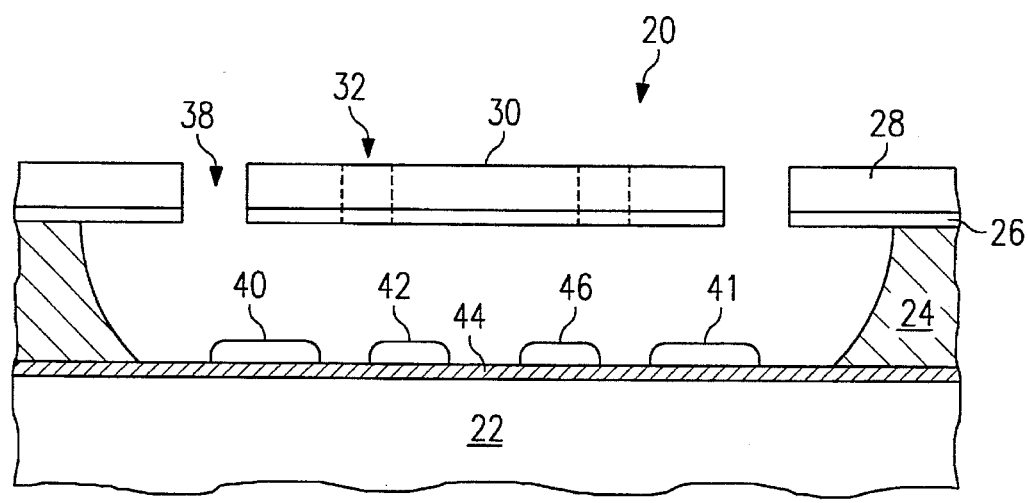
Figure 3C:
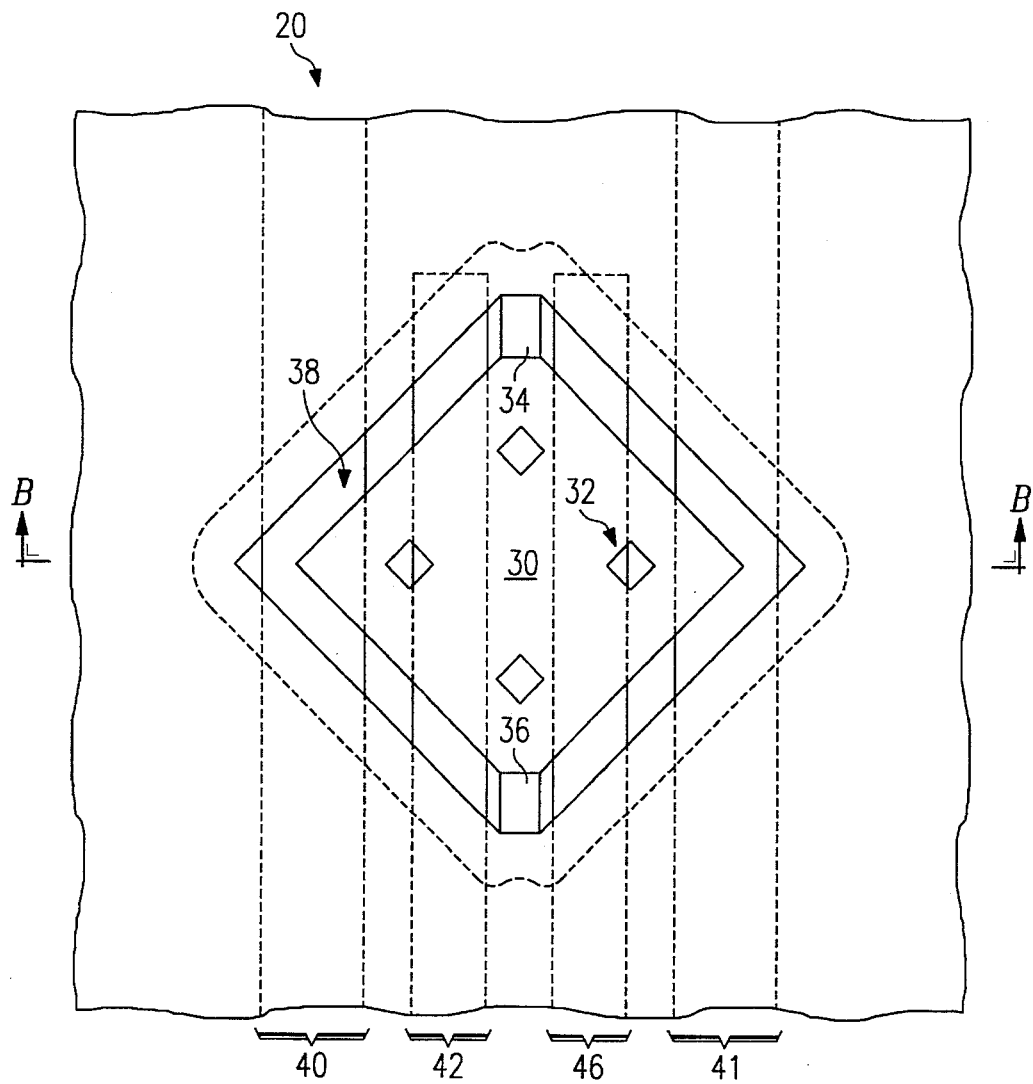
Figure 3D:
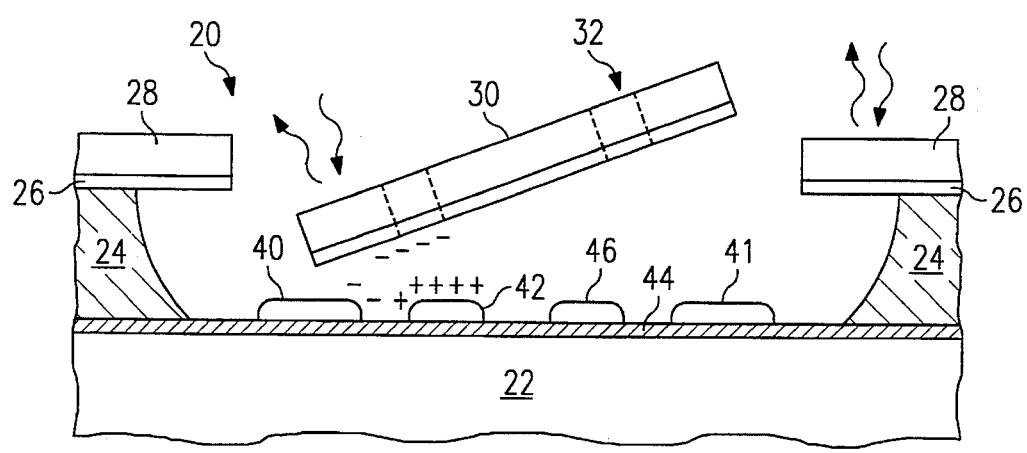
Figure 4A:
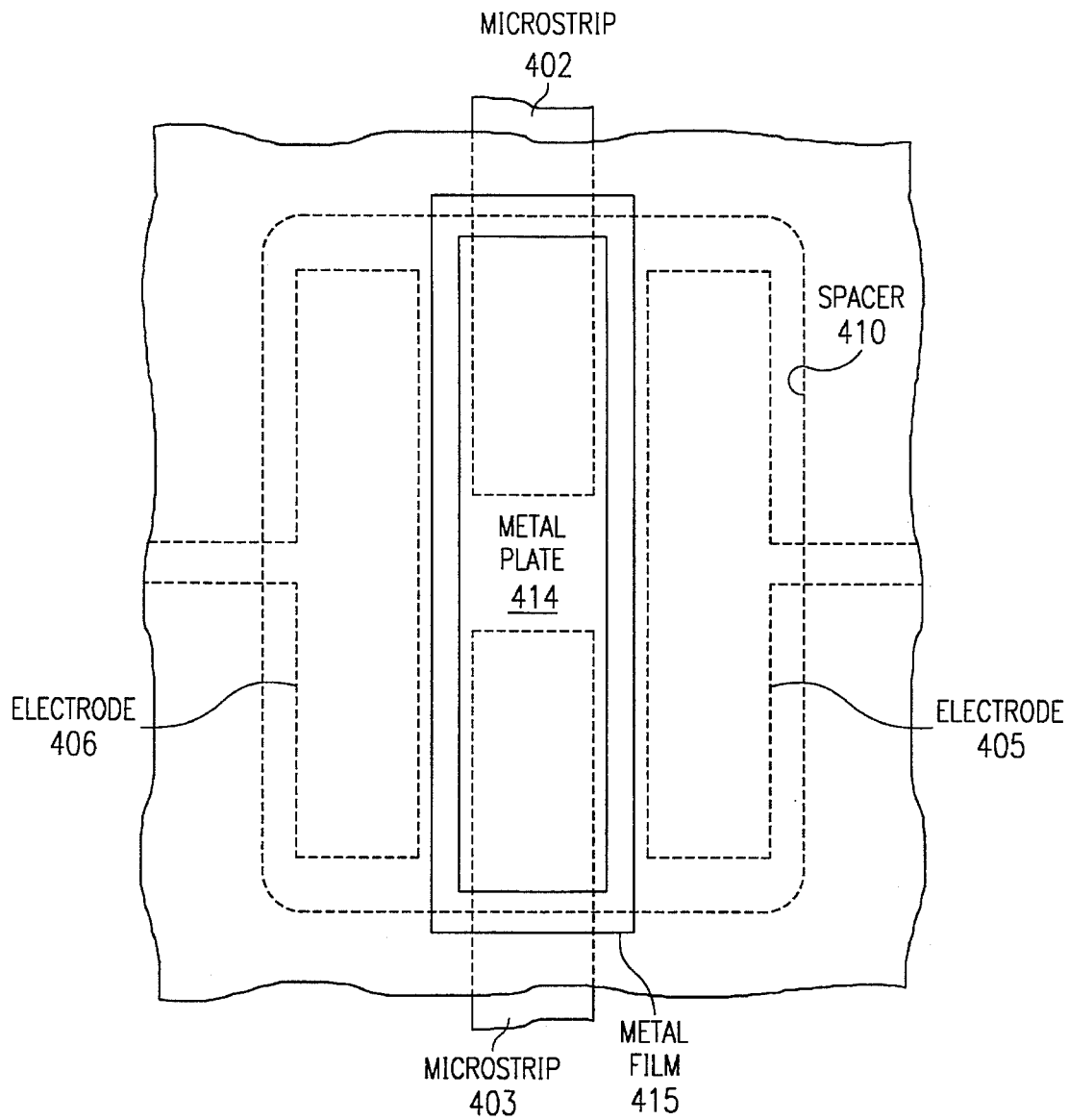
FIGS. 4a–e are plan and cross sectional elevation views of a top side metal membrane preferred embodiment switch.
Figure 4B:
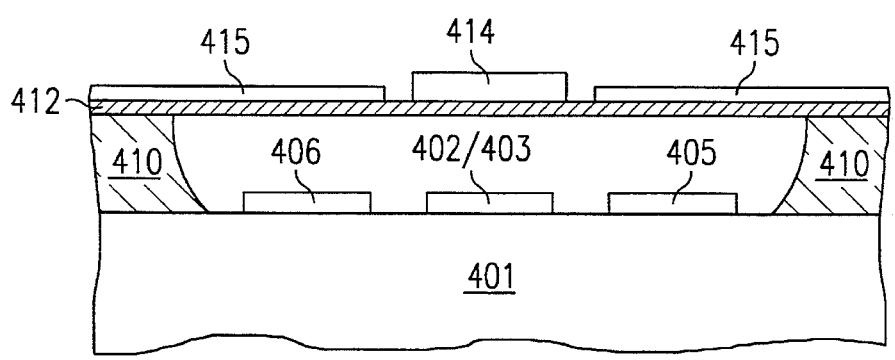
Figure 4C:
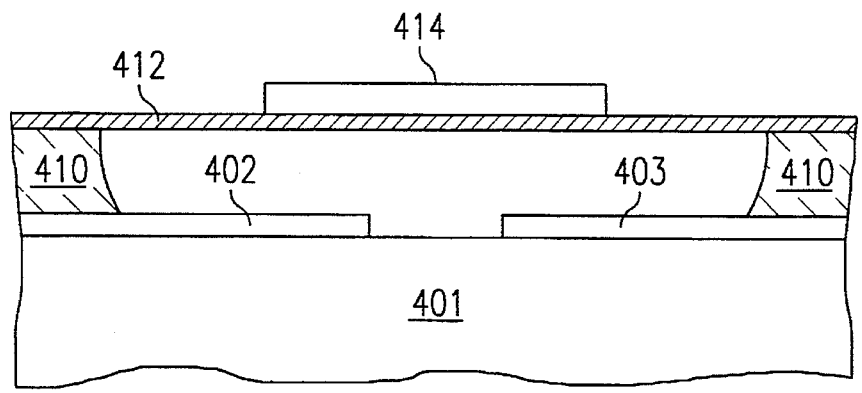
Figure 4D:
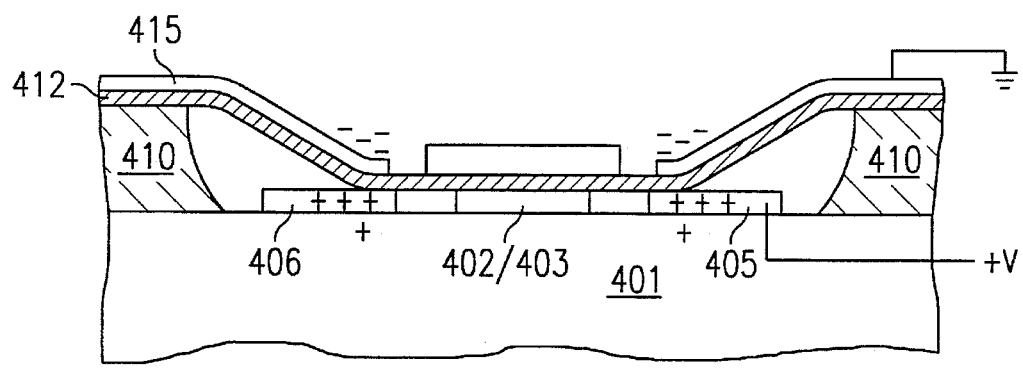
Figure 4E:
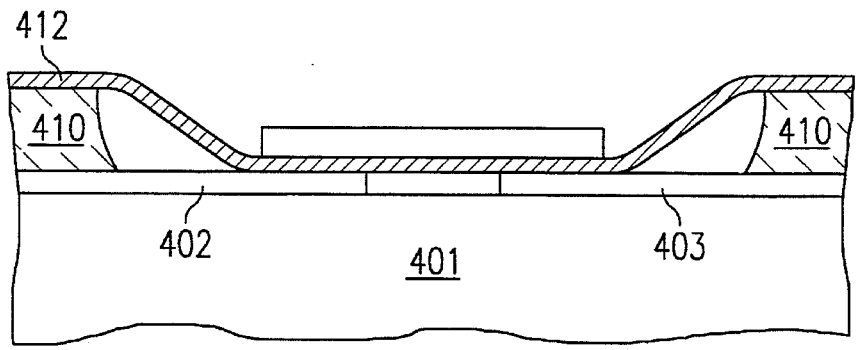

For example, FIGS. 4a–e illustrate first preferred embodiment switch, generally denoted by reference numeral 400, in plan view and cross sectional elevation views for both open and closed states. Switch 400 includes substrate 401 (which may be a silicon dioxide film a few μm thick on a silicon die) with transmission line microstrip segments 402–403 and control electrodes 405–406 on the substrate surface and within an opening in insulating spacer layer 410 on the substrate surface. Dielectric membrane 412 lies on spacer 410 and spans the opening. Metal plate 414 and metal film 415 attached to the upper surface of membrane 412 provide the signal conducting and mechanical deflection for the switching action, respectively. Indeed, metal film 415 and electrodes 405–406 form an air gap capacitor which deflects membrane 412 when charged, as follows. First, with metal film 415 grounded and electrodes 405–406 also grounded, dielectric membrane 412 is relatively flat as shown in cross setional elevation views FIGS. 4b–c. In this situation, the gap between microstrip segments 402–403 imposes a large impedance in the transmission line and the switch is open. Conversely, a positive voltage applied between electrodes 405–406 and grounded metal film 415 induces positive electric charges on electrodes 405–406 and negative charges on metal film 415, and these charges generate an attractive force which pulls metal film 415 (and membrane 412) down to electrodes 405–406 as illustrated in FIGS. 4d–e. Dielectric membrane 412 prevents metal film 415 from touching electrodes 405–406, so only leakage current flows during this activation of electrodes 405–406. Also as illustrated in FIGS. 4d–e, the pulling down of metal film 415 plus membrane 412 moves metal plate 414 down to bridge microstrip segments 402–403 and provide capacitive coupling of the segments. Hence, the high impedance in the transmission line has been replaced with a low impedance, and the switch is closed. Switch 400 pulls down or restores up in roughly a microsecond; the timing is a tradeoff with pull down voltage: higher electrode voltage implies faster pull down, and stiffer membranes imply faster restoring but require higher voltage for pull down.

Figure 5:
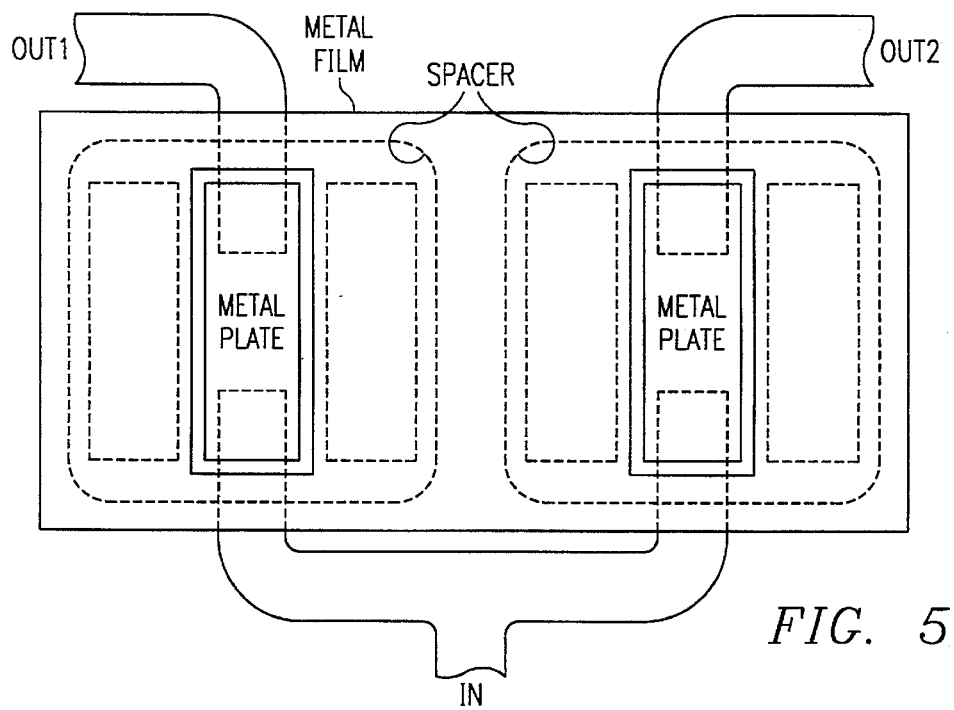
FIG. 5 shows a preferred embodiment single pole, double throw switch.

Switch 400 is a single pole-single throw (SPST) switch. However, switch applications, such as the transmit/receive module schematically illustrated in FIG. 40, frequently require a single pole-double throw (SPDT) switch. Integrating two switches 400 in parallel as shown in plan view in FIG. 5 provides the double throw in a compact structure: a single metal film and membrane spanning both openings in the spacer can be used.

The preferred embodiment switches include both ohmic and capacitive connections, electrostatic and thermal activation, conducting and dielectric deformable membranes, electrical and mechanical restoring forces, and localized and support element current carrying. The materials used for switch fabrication may also be used for fabrication of various transmission line configurations, including microstrip, stripline, coplanar waveguide, and coplanar stripline.

Figure 34A:
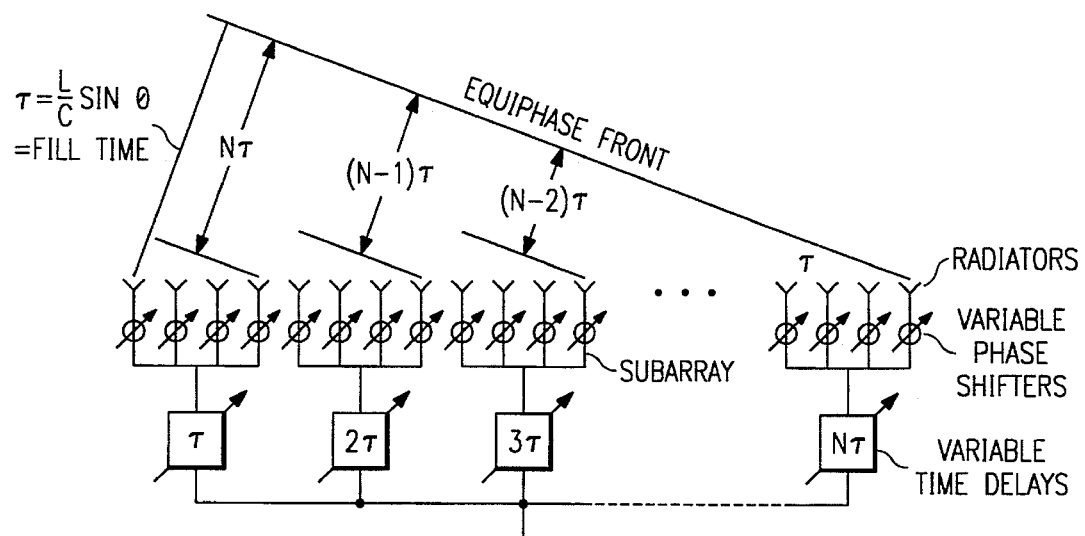
FIGS. 34a–c illustrate aperture fill time compensating newtworks.
Figure 34C:
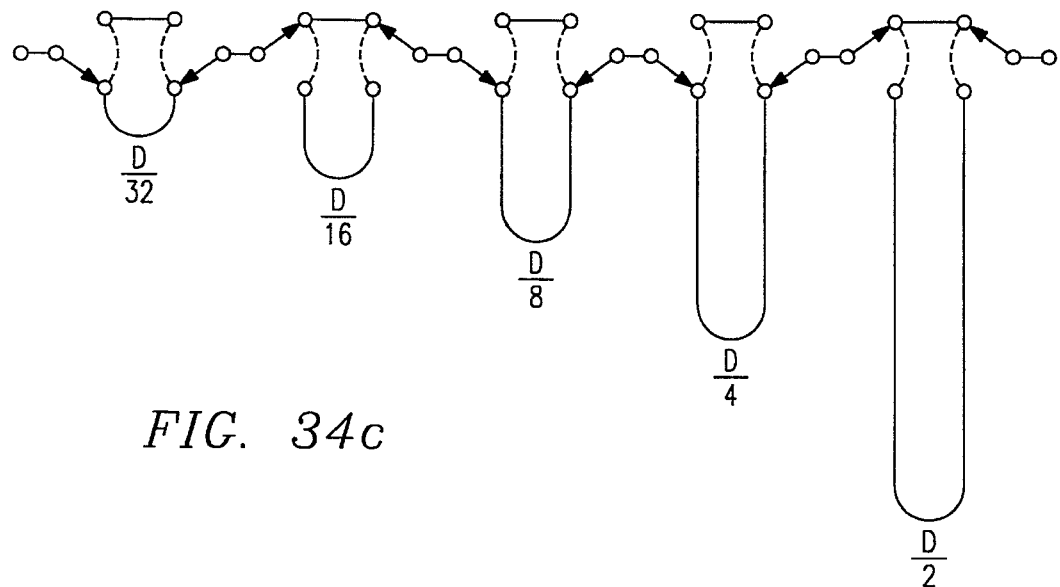
Figure 34B:
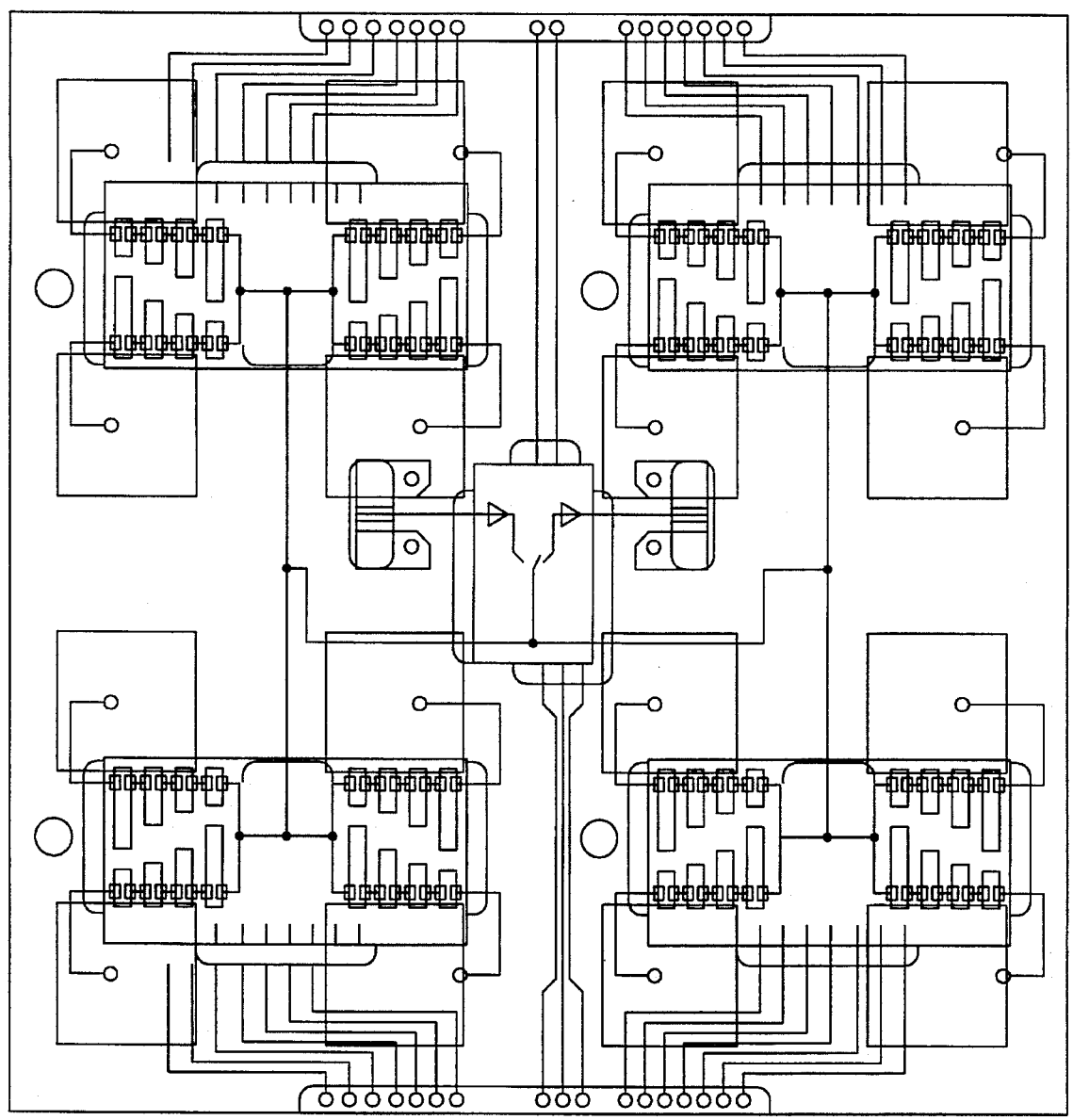
Figure 40:
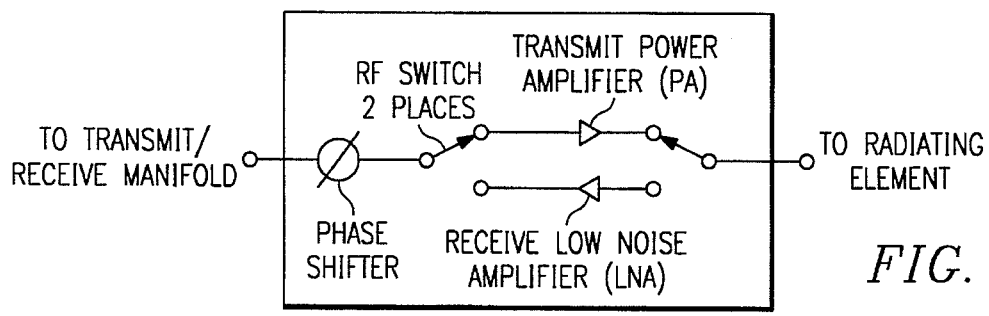
FIG. 40 shows a transmit/receive module

The preferred embodiment systems include both single switches as in the transmit/receive module of FIG. 40 and arrays of switches as in the time steered subarrays of a phase steered aperture 3400 illustrated in FIGS. 34a–c. Phase steered aperture 3400 consists of a 5 by 5 array of submodules with each submodule (FIG. 34b) a 4 by 4 array of antenna elements plus a power amplifier for transmit and a low noise amplifier for receive plus a 4-bit phase shifter for each antenna element. Each submodule connects to a variable time delay network (labelled τ, 2τ, . . . Nτ in FIG. 34a for the delays produced) which is a 5-bit switched line time delay as shown in FIG. 34c with SPDT switches and binary-weighted-length delay lines. Thus the total resolution of phase steered aperture 3400 is 9 bits.

Figure 6:
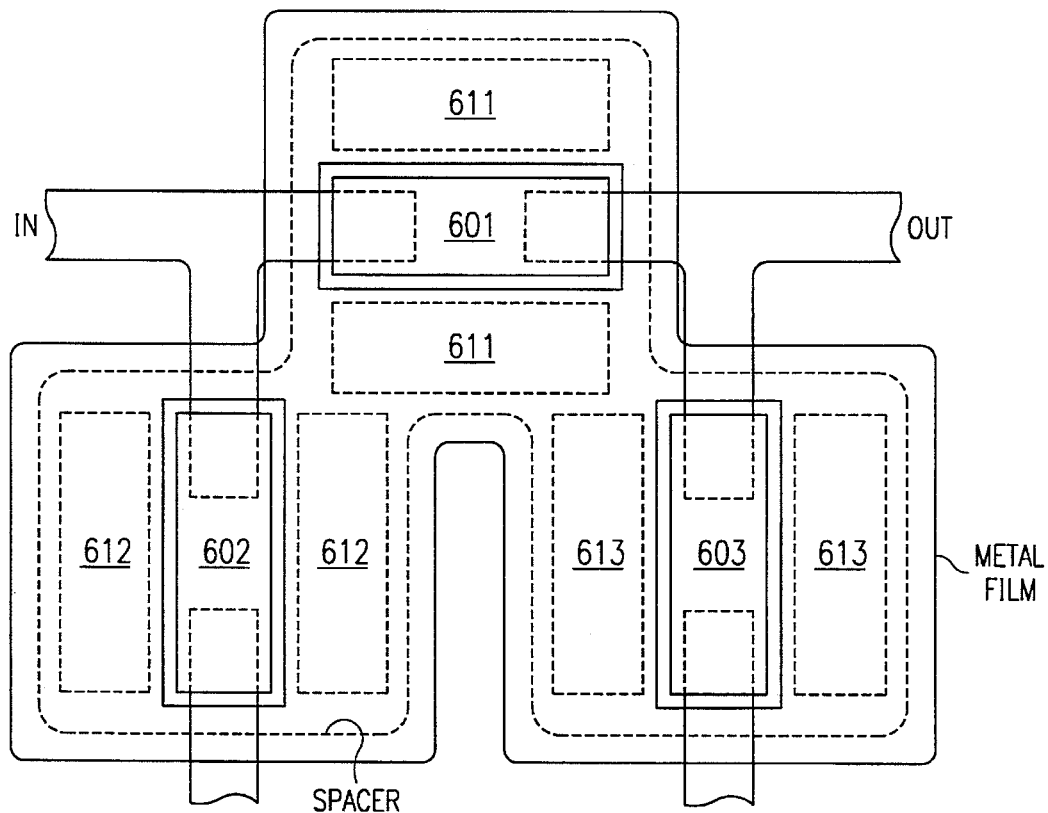
FIG. 6 illustrates a preferred embodiment merged pair of SPDT switches.

In FIG. 34c the total path length can be varied by in increments of D/32 up to a total increase of 31/32 D. Each bit of the 5-bit switched line time delay contains a pair of SPDTs that select either of two possible path lengths with path length differentials being D/2* for the kth bit. FIG. 34c shows selection of increases of D/32, D/8, and D/4 for total increase of 13/32 D. Each pair of SPDTs could be replaced by a compact layout which uses only three coupling metal plates 601–603 and electrode pairs 611–613 on a single U-shaped membrane as illustrated in FIG. 6. Activating electrodes 611 only pulls down metal plate 601 to couple the IN microstrip directly to the OUT microstrip; whereas activating electrodes 612–613 and deactivating electrodes 611 disconnects the direct coupling and couples in the delay loop.

The preferred embodiment systems include phase shifters, time delay networks, beam selectors, trasmit/reeive duplexing, and frequency selectors.

The following sections provide details as to these switches and systems plus variations of them.

Preferred Embodiment Switches With Localized Membrane

1. Topside metal plate capacitive coupling.

FIG. 4a–e show in plan and cross sectional elevation views preferred embodiment capacitive switch 400; note that the vertical dimensions have been greatly exaggerated for clarity. The previous section outlined the operation of switch 400 and noted that the signal conducting portion (plate 414) on the membrane is localized in the center of the membrane. Microstrip segments 402–403 have a width of about 50–75 μm, a thickness of about 0.4 μm (away from the switch structure the microstrip is plated to a thickness of about 5 μm), and are separated by a gap of about 100–125 μm. Electrodes 405–406 are about 0.4 μm thick and are spaced about 25 μm from microstrip segments 402–403. Spacer 410 is about 2 μm thick, and dielectric membrane 412 is about 0.2 μm thick and made of silicon nitride with adhered metal film 415 about 0.4 μm thick. Membrane 412 and metal film 415 and metal plate 414 include an array of 1 μm holes spaced about 7 μm apart which permit plasma etching to remove underlying spacer layer and create the opening in the spacer. The drawings omit showing these plasma access holes for clarity. Similarly, other preferred embodiments described in the following have drawings omitting plasma access holes.

Membrane 412 plus metal film 415 have a total thickness of 0.6 μm and are quite compliant but also provide sufficient restoring force to pull up after electrodes 405–406 are deactivated. Indeed, the thickness of membrane 412 and metal film 415 provide a tradeoff of the electrode threshold voltage required to pull down and the restoring force required for pull up (to overcome any sticking plus have a small switching time). For switch 400 an electrode voltage of about 30 volts suffices; the threshold voltage is a little less. Metal plate 414 is about 0.5 μm thick and about 50–75 μm wide and 300 μm long; thus when pulled down onto microstrip segments 402–403, metal plate 414 overlaps about 250 μm of each segment. With nitride membrane 412 as the capacitor dielectric, metal plate 414 capacitively couples to microstrip segments 402 and 403 with roughly a 5 pF capacitance. Thus for a 10 GHz signal on the transmission line, the 5 pF capacitor presents an impedance of roughly 3 ohms. Contrarily, with electrodes 405–406 at the same voltage as metal film 415, the tension in membrane 412 pulls it up about 2 μm to be flat and thereby drop the capacitance between metal plate 414 and microstrip segments 402–403 by a factor of roughly 75 due to the change of the dielectric from 0.2 μm of nitride to 1.8 μm of air plus 0.2 μm of nitride. Thus the open switch imposes an impedance of roughly 200 ohms in the transmission line at 10 GHz. Note that the size of switch 400 (metal plate about 600 μm long) is small compared to the signal wavelength at 10 GHz (3 cm in free space and roughly 1 cm for the microstrip over a material with effective dielectric constant of 10).

Also, switch 400 provides a dc block between the microstrips due to the rf capacitive coupling. Indeed, this is true of all of the following switches with capacitive coupling.

Substrate 401 may be made of various materials. For example, silicon on sapphire, gallium arsenide, alumina, glass, silicon on insulator, etc. Formation of the switch on a thick oxide region on a silicon substrate permits control circuitry for the control electrode, including charge pumps, to be integrated on the same die as the switch. The oxide also helps reduce dielectric losses associated with the silicon substrate. Similarly, spacer 410 may be made of various materials such as photoresist, PMMA, etc., or may be conductive as in some preferred embodiments described in the following and thus made of various metals.

Membrane 412 may be made of many different dielectrics such as quartz, silicon dioxide, silicon nitride, organic polymers of various types, and high dielectric ferroelectric material such as PLZT, SBN, BST, and GaAs, InP, and layered versions of such materials. However, a leaky dielectric should be used to avoid static charge build up in the dielectric which would act as an activation charge.

Figure 7A:
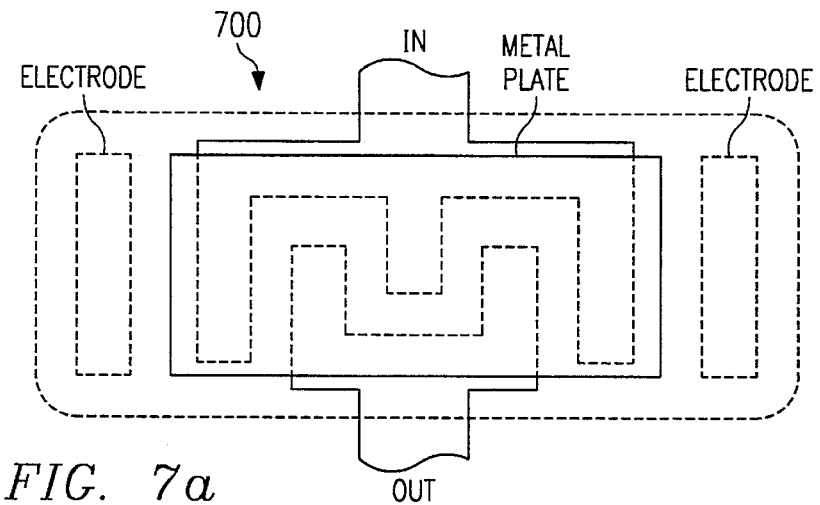
FIGS. 7a–c are plan views of variations of the switch of FIGS. 4a–e.
Figure 7B:
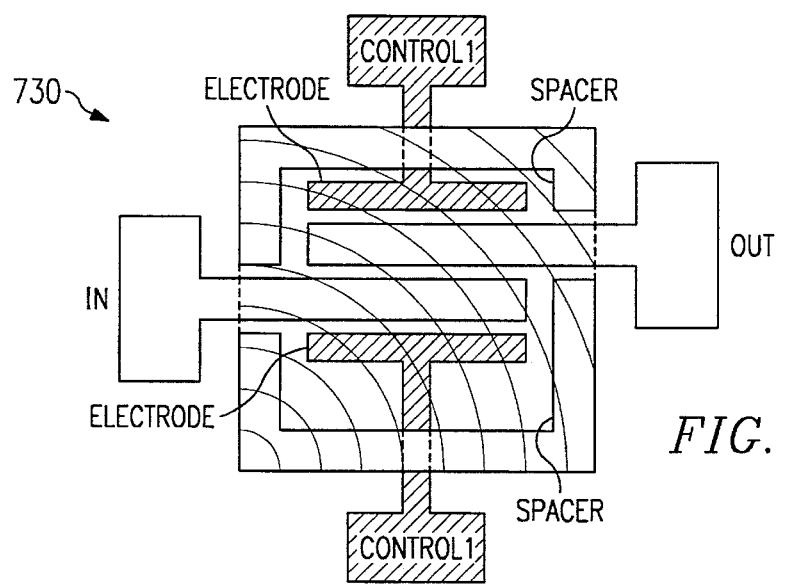
Figure 7C:
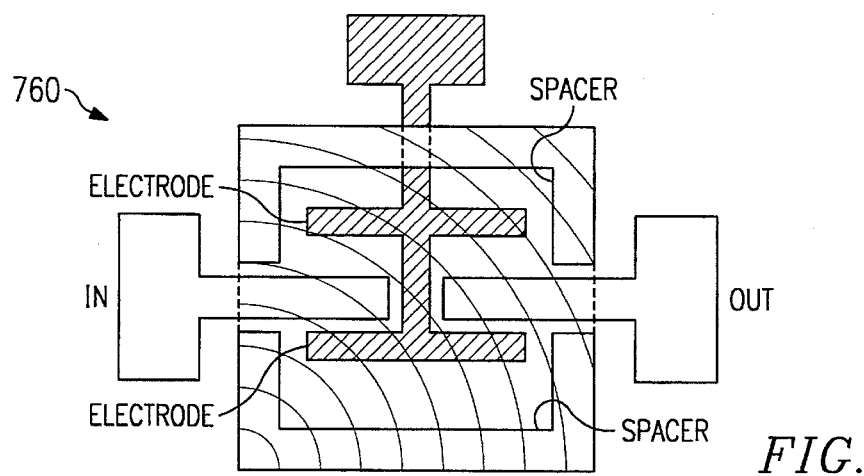

FIGS. 7a–c show in plan views variations of switch 400, labelled as 700, 730, and 760, respectively, Switch 700 has the IN and OUT microstrip segments in the form of interdigitated fingers. This geometry allows tier a shorter but wider switch while providing the same capacitive coupling as switch 400. Switch 730 has the IN and OUT microstrip segments as side by side which also shortens the switch; FIG. 7b shows the control electrodes but omits the metal plate and metal film for clarity and indicates two horseshoe-shaped spacers leaving gaps for the microstrip segments. Switch 760 has the two electrodes connected between the microstrip segment ends; this provides simple electrode connection plus an rf ground between the microstrip ends to increase isolation.

2. Dielectric membrane capacitive coupling.

Figure 8A:
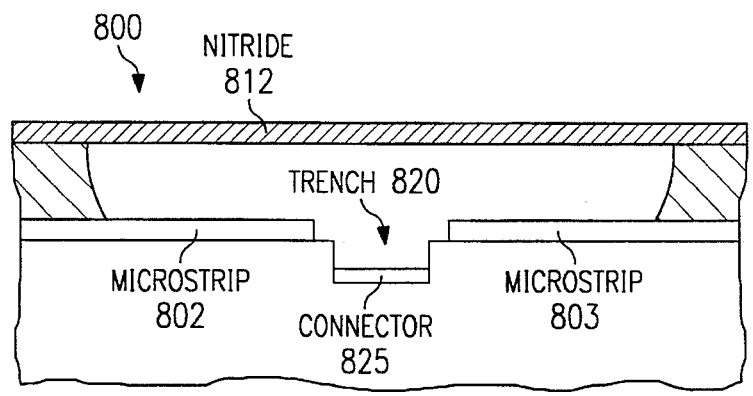
FIGS. 8a–c are plan and cross sectional elevation views of a dielectric membrane preferred embodiment switch.
Figure 8B:
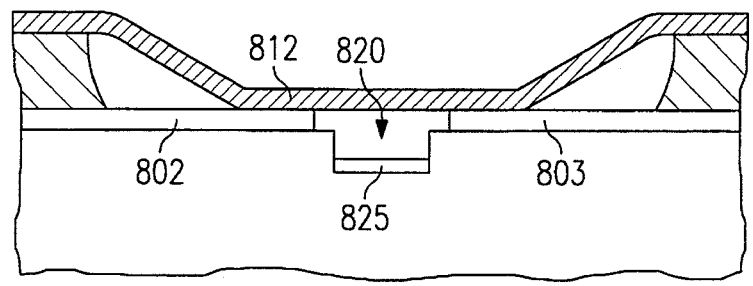
Figure 8C:
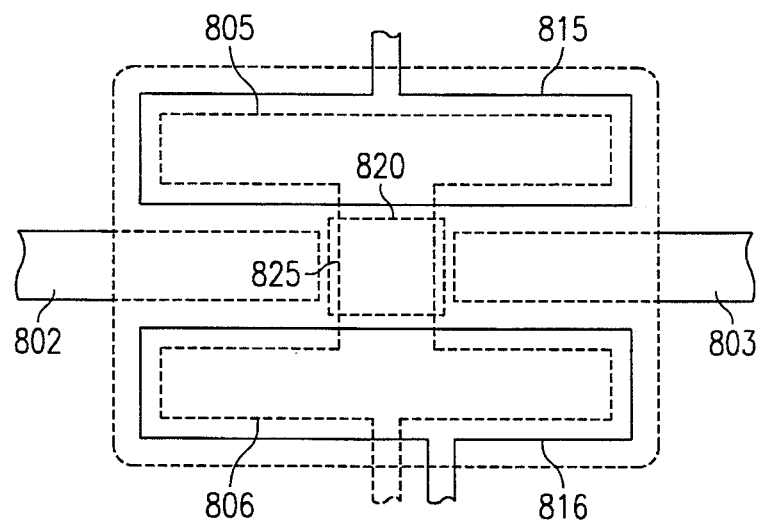

FIGS. 8a–c show switch 800 in cross sectional elevation view along the microstrips and in plan view as similar to switch 400 but with the omission of the metal plate. Switch 800 operates by changing the dielectric over and coupling the microstrip segments 802–803 from air to the nitride of membrane 812 and thereby increasing the capacitive coupling by a factor of about 7. Trench 820 at least 1–5 μm deep and 20 μm long (and at least as wide as the microstrip segments) limits the capacitive coupling through the substrate. Also, trench 820 permits microstrip segments 802–803 to be brought closer together, and metal electrode connector 825 may run through trench 820 and provide an rf ground to further lessen the capacitive coupling through the substrate plus simplify connection to electrodes 805–806. Grounded metal films 815–816 lie on membrane 812 over electrodes 805–806. FIG. 8a shows switch 800 open, and FIG. 8b shows electrodes 805–806 activated and switch 800 closed.

Switch 800 relies on the change in dielectric constant from about 1 (air when the switch is open) to the dielectric constant of the membrane (when the switch is closed). Thus membrane 812 could be made of a ferroelectric such as PLZT, BST, SBN, and so forth to increase the ratio of off impedance to on impedance.

Of course, switch 400 could have a trench and electrode connector analogous to trench 820 and connector 825, and switch 800 could have interdigitated microstrip segments analogous to switch 700.

3. Underside metal plate ohmic coupling.

Figure 9A:
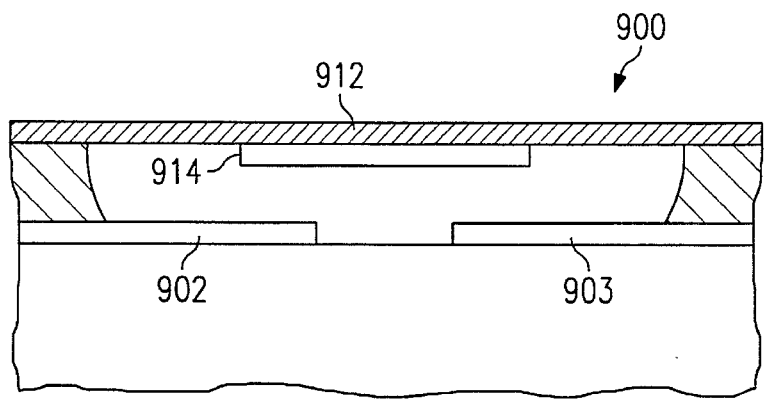
FIGS. 9a–b are cross sectional elevation views of a dielectric membrane with underside metal preferred embodiment switch.
Figure 9B:
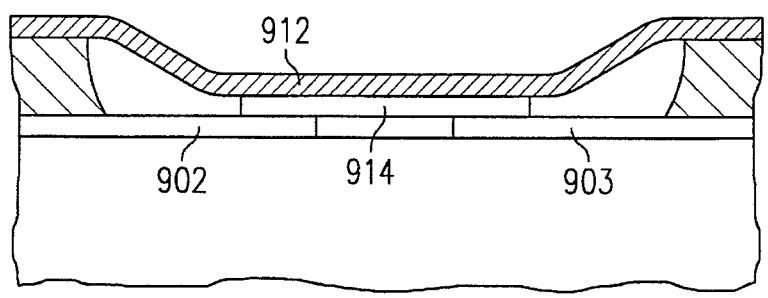

Preferred embodiment switch 400 could be modified to replace the capacitive coupling with an ohmic coupling by placing the metal plate on the underside of the dielectric membrane as illustrated in cross sectional elevation view in FIG. 9a–b by switch 900. An ohmic coupling permits switching also of dc or low frequency signals. Basically, metal plate 914 is put on the underside of membrane 912 to provide direct metal-metal contacts with the microstrip segments; FIG. 9a shows the open postion with metal plate 912 suspended about 2 μm above microstrip segments 902–903, and FIG. 9b shows the switch closed with metal plate 914 bridging microstrip segments 902–903 for ohmic connection. With ohmic connection switch 900 may be much smaller than switch 400 because the large overlap area of the metal on the microstrip segments for high capacitance coupling is not needed for ohmic coupling. However, the ohmic coupling area must be sufficient to limit the current density to what the contact can support without creating hot spots and welding closed. Thus the dimensions depend upon the application. Both metal plate 914 and microstrip segments 902–903 may be gold or gold plated to provide good ohmic contact.

4. Underside metal plate capacitive coupling.

Figure 10:
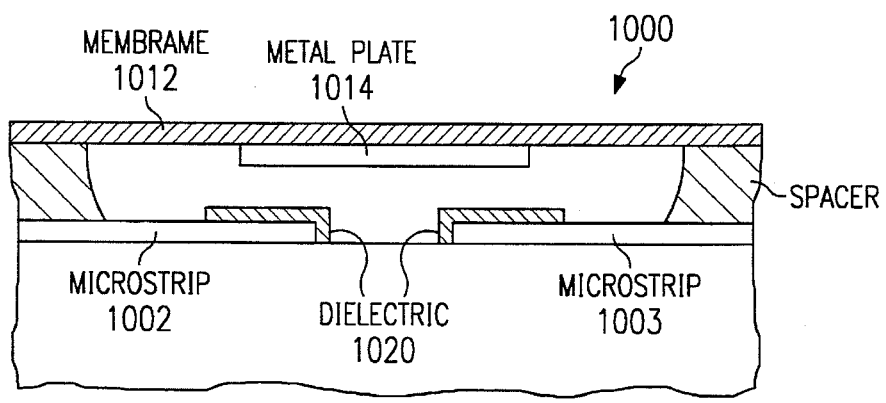
FIG. 10 is a cross sectional elevation view of a dielectric coated version of the preferred embodiment switch of FIGS. 9a–b.

FIG. 10 shows switch 1000 as a variation of switch 900 with metal plate 1014 on the underside of membrane 1012 but with dielectric coatings 1020 on microstrip segments 1002–1003 to provide capacitive coupling. A very thin (<0.03 μm) dielectric layer 1020 can be used on the microstrip segments to increase the capacitive coupling because this dielectric need not have the mechanical strength of the membrane 812 in switch 800. Also, high dielectric constant material could be used for the dielectric layer 1020; for example, alumina, PLZT, BST, etc.

5. Metal coated membrane capacitive coupling.

Figure 11A:
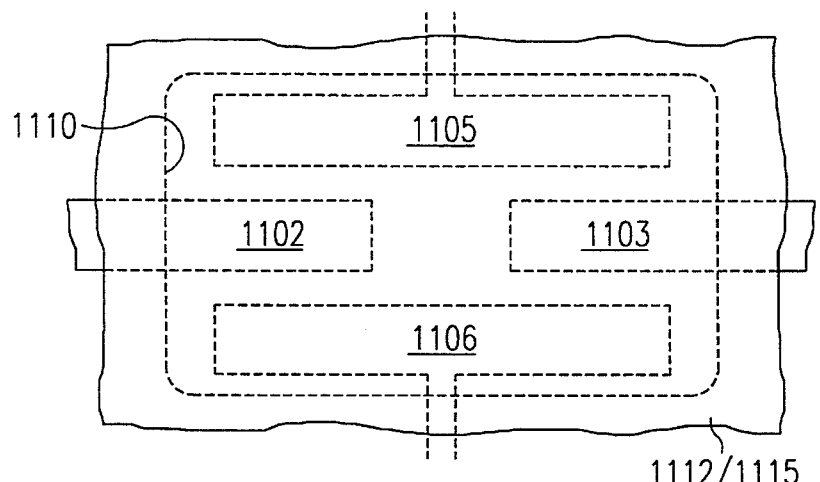
FIGS. 11 a–c are plan and cross sectional elevation views of a two-material membrane preferred embodiment switch.
Figure 11B:
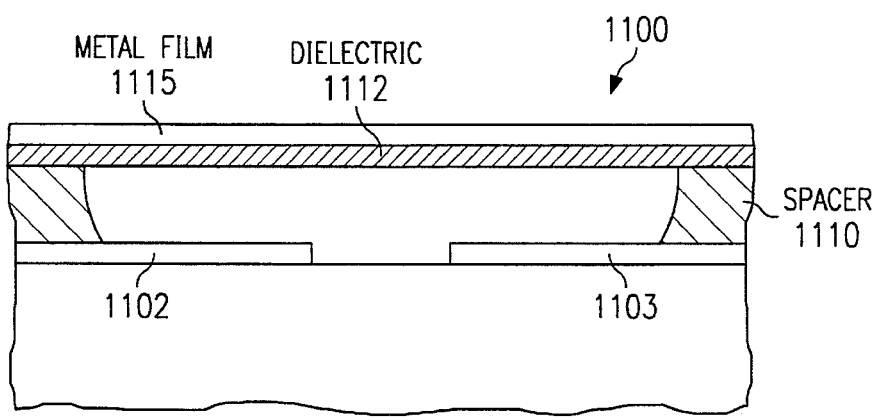

FIGS. 11a–b show in plan and cross sectional elevation views preferred embodiment switch 1100 which has metal film 1115 on silicon nitride file 1112 over microstrip segments 1102–1103. Switch 1100 differs from switch 400 by having a single metal film 1115 covering the entire membrane rather than a grounded metal film for the pull down electrodes to attract and a separate metal plate for the capacitive coupling of the microstrip segments. Grounded metal film 1115 has an inductive connection to ground for rf isolation. The use of single metal film 1115 for both the electrode attraction and the capacitive coupling of the microstrip segments provides a tradeoff of simpler fabrication but larger parasitic capacitance.

Figure 11C:
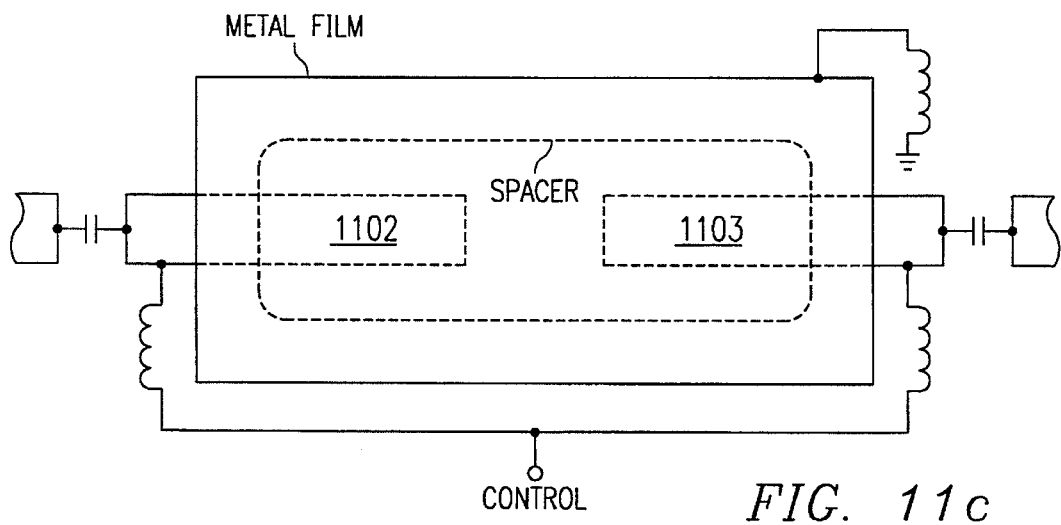

FIG. 11c heuristically illustrates in plan view an electrodeless version of switch 1100 in that the microstrip segments also provide the dc control voltage for pull down of the metal membrane. In particular, dc isolation of the portions of the microstrip segments in the switch from the remainder of the microstrip (by series capacitors and dc control voltage through chokes) permits use of the microstrip segments themselves as the electrodes. The varying rf voltage does not affect switch operation because of the inertia of the membrane. Thus the switch can be made narrower and be optimized for higher frequency operation.

Other transmission line geometry could be used such a coplanar waveguide with the ground lines running under the spacer.

6. Metal membrane ohmic coupling.

Figure 12A:
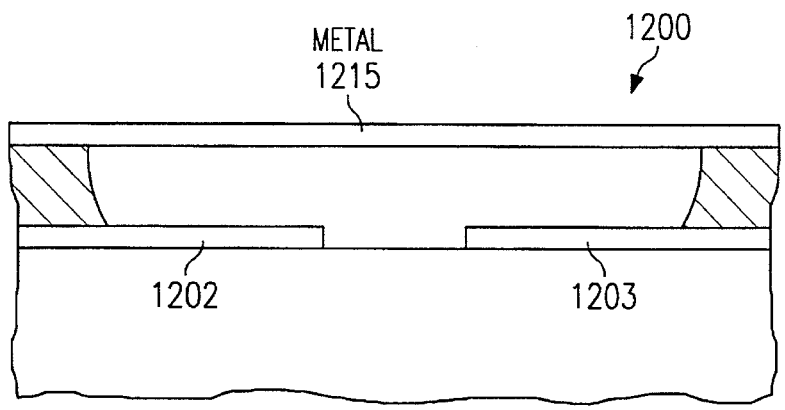
FIGS. 12a–d are plan and cross sectional elevation views of a metal membrane preferred embodiment switch.

FIG. 12a shows in cross sectional elevation view preferred embodiment switch 1200 which has metal film membrane 1215 over microstrip segments 1202–1203 which pulls down to create an ohmic connection between the microstrip segments. Switch 1200 emulates switch 1100 by having a single grounded metal film 1215 for both the pull down electrodes to attract and for the coupling of the microstrip segments. Grounded metal film 1215 also has an inductive connection to ground for rf isolation.

Metal membrane 1215 may be made of aluminum, gold, titanium-tungsten, or a layered structure such as TiW/Pt/Au.

Figure 12B:
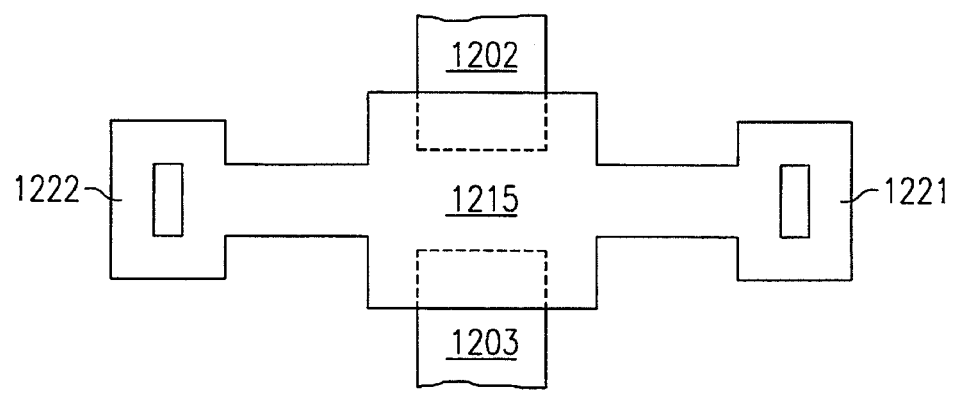
Figure 12C:
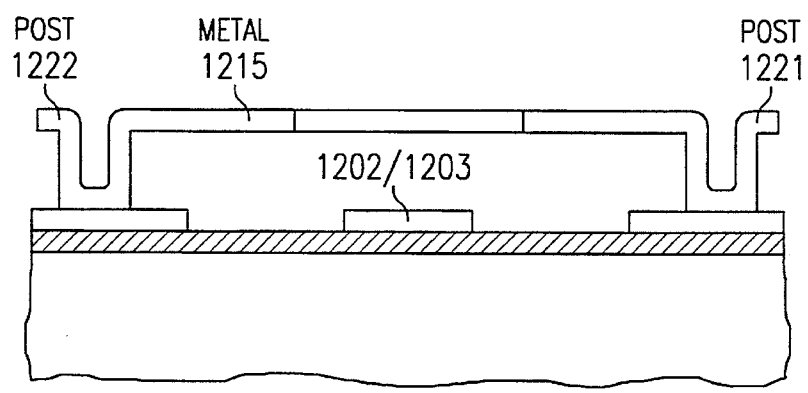
Figure 12D:
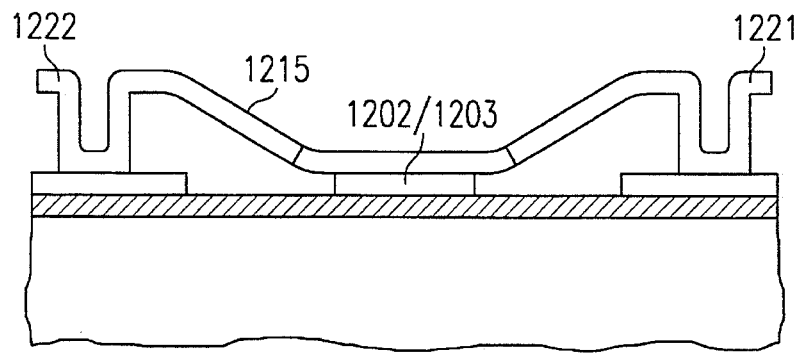

FIGS. 12b–c show in plan and cross sectional elevation views a variation of switch 1200 with a roughly indented rectangular metal membrane 1215 suspended on metal posts 1221–1222 at each short end and with coupled microstrips 1202–1203 entrant at each long end. A voltage applied to posts 1221–1222 pulls metal film down towards the grounded substrate and this makes the ohmic contact to the microstrips. The portions of metal film 1215 adjacent the posts is narrower than the center portion, so metal film 1215 bends primarily adjacent the posts as illustrated in FIG. 12d.

7. Metal membrane with dielectric coated microstrips capacitive coupling.

Figure 13A:
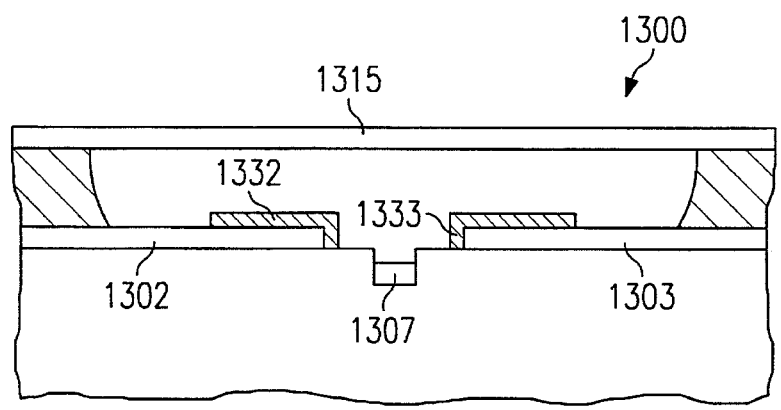
FIGS. 13a–b are cross sectional elevation views of a dielectric-coated microstrip preferred embodiment switch.
Figure 13B:
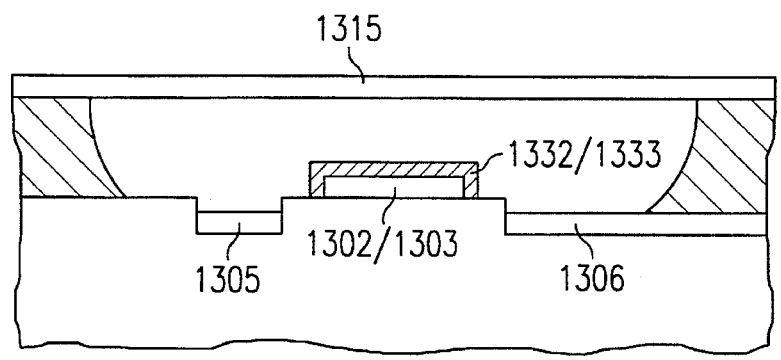

FIGS. 13a–b show in cross sectional elevation views preferred embodiment switch 1300 which has metal film membrane 1315 over microstrip segments 1302–1303 which have dielectric coatings 1332–1333. Switch 1300 emulates switch 1000 by having a single grounded metal film 1315 for both the pull down electrodes to attract and for the capacitive coupling of the microstrip segments. Grounded metal film 1315 also has an inductive connection to ground for rf isolation. Further, electrodes 1305–1306 also have dielectric coatings or are recessed below dielectric posts to avoid a short circuit during activation. FIG. 13b is a cross sectional along a line perpendicular to that of FIG. 13a and illustrates the recessed electrodes. FIG. 13a shows recessed electrode connector 1307 which connects electrodes 1305 and 1306 and also contributes to the isolation of the microstip segments 1302–1303.

Preferred Embodiment Switches With Component Membrane

1. Metal membrane component ohmic coupling.

Figure 14A:
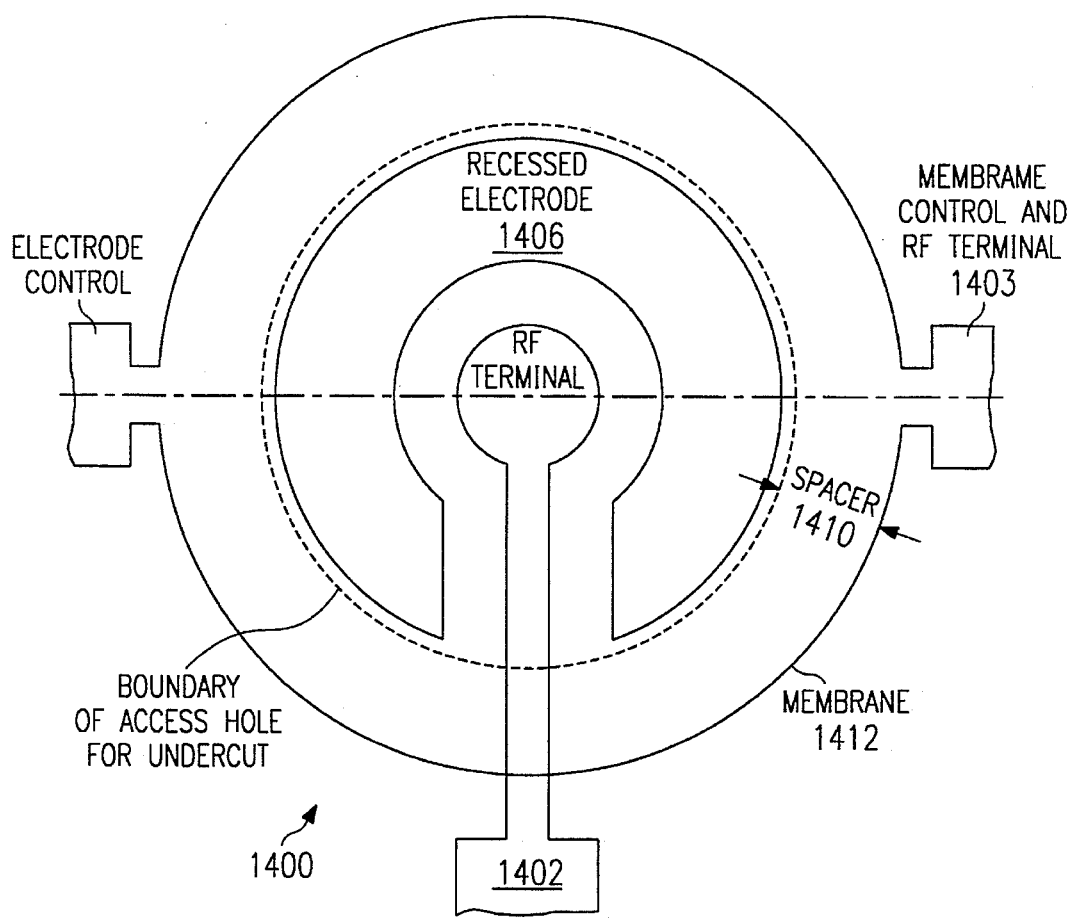
FIGS. 14a–d are plan and cross sectional elevation views of a component membrane preferred embodiment switch.
Figure 14B:
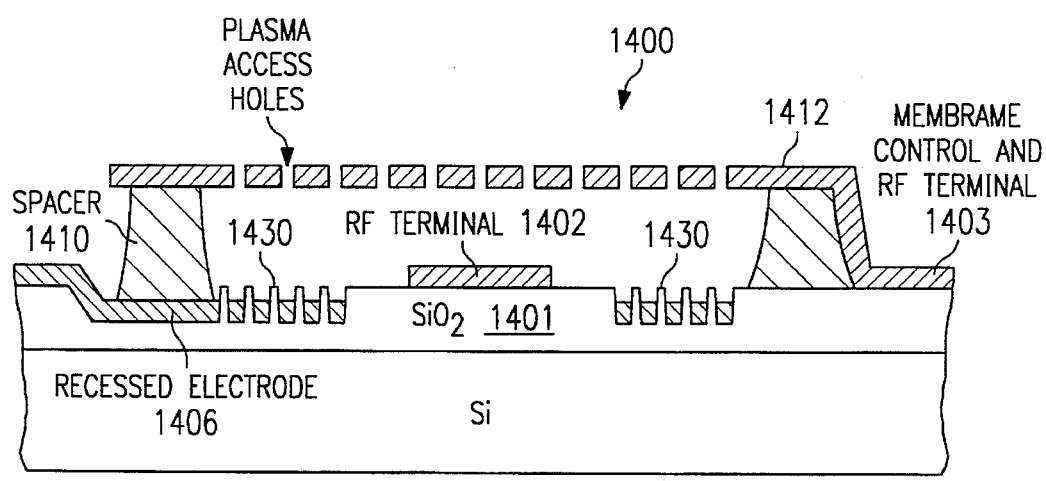

FIGS. 14a–b illustrate in plan and cross sectional elevation views preferred embodiment switch 1400 which differs from the previously described switches by connecting one microstrip to the deflectable membrane. In particular, switch 1400 includes a silicon substrate with a 2 μm thick silicon dioxide layer 1401 with transmission line microstrip segments 1402–1403 and control electrode 1406 on the surface of oxide 1401 and within an opening in spacer annulus 1410. Metal membrane 1412 lies on spacer 1410 and spans the opening and extends down the outside to connect to microstrip 1403. Metal membrane provides the rf signal conducting and mechanical deflection for the switching action, respectively. As with switch 1200 metal membrane 1412 and electrode 1406 form an air gap capacitor which deflects membrane 1412 when charged and thereby makes an ohmic connection of microstrip 1402 through membrane 1412 to microstrip 1403.

Electrode 1406 lies in a recess in oxide 1401, and additionally an array of oxide posts 1430, each about 2 μm in diameter, project through electrode 1406 with a spacing of about 5 μm, so metal membrane 1412 will not contact electrode 1406 when the activated electrode pulls the membrane down.

Annular spacer 1410 has an outside diameter of about 400 μm, and inside diameter (opening) of about 250 μm, and a height of about 2 μm. Microstrip 1402 may be narrowed from 50–75 μm wide to 25 μm wide to be separated from electrode 1406 but widen again to 50–75 μm at its circular terminus in the center of the opening; this allows a greater contact area with membrane 1412 and consequently a smaller operating current density. Electrode 1406 may lie in a 1 μm deep recess in oxide 1401. Roughly 30 volts between electrode 1406 and membrane 1412 will pull down the membrane to make contact with the terminus of microstrip 1402. Membrane 1412 is made of aluminum and about 0.4 μm thick; this provides sufficient restoring force to pull the membrane up off of microstrip 1402 and back to horizontal upon deactivation of electrode 1406. Of course, the dc grounding of membrane 1412 and microstrip 1403 is through a choke to ground (not shown) plus a series capacitor (not shown) to dc isolate the membrane from the remainder of microstrip 1403.

Figure 14C:
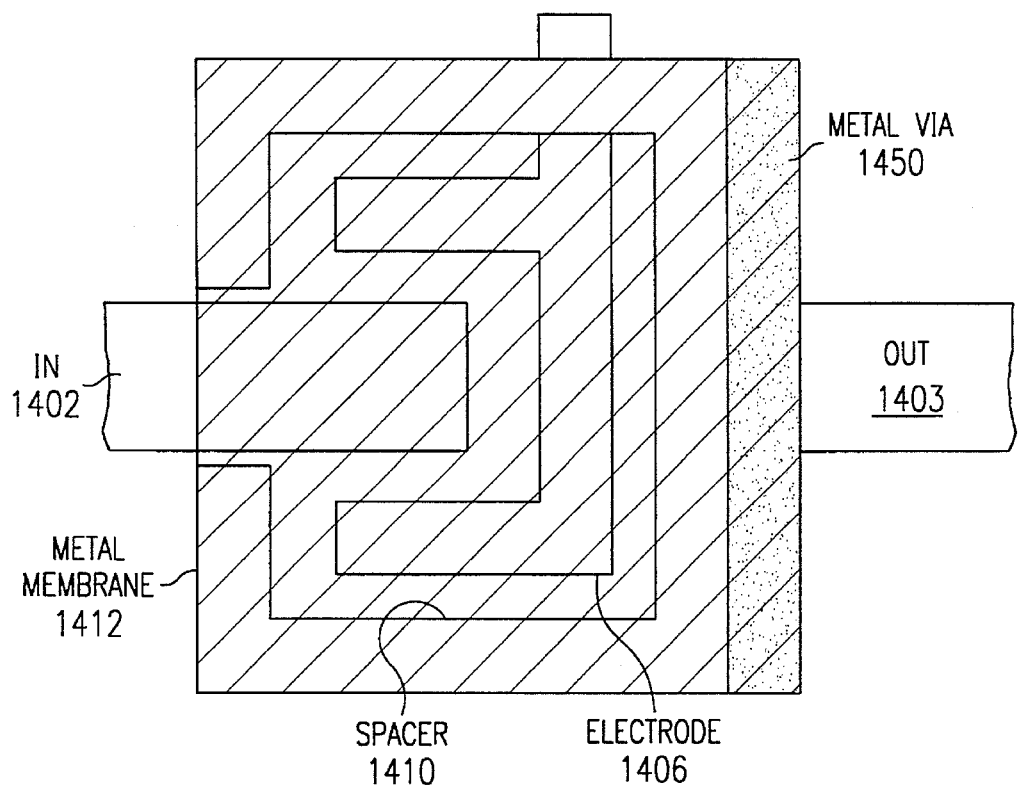
Figure 14D:
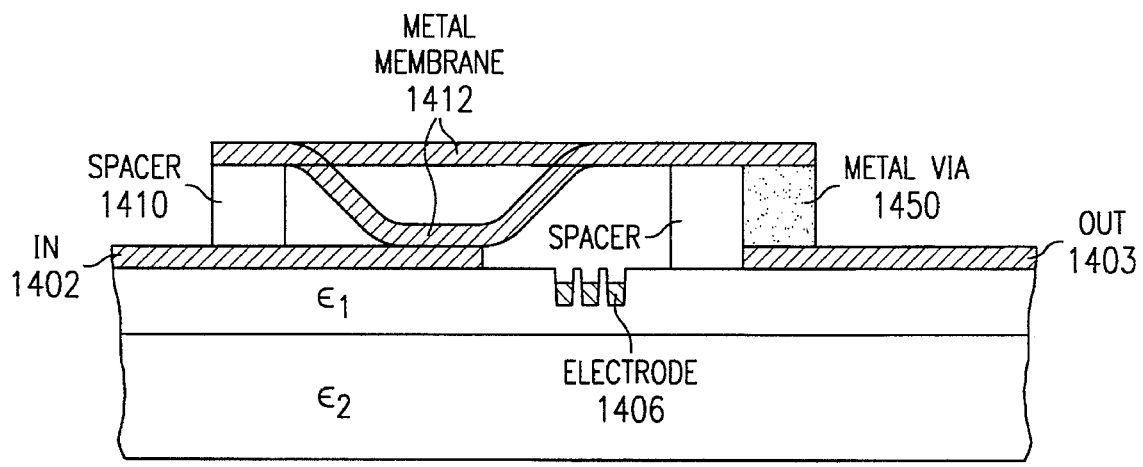

FIGS. 14c–d show in plan and cross sectional elevation views a rectangular rather than circular geometry for switch 1400. In this rectangular version, one side of membrane 1412 connects to microstrip 1403 by vertical metal via 1450.

2. Metal membrane component capacitive coupling.

Figure 15A:
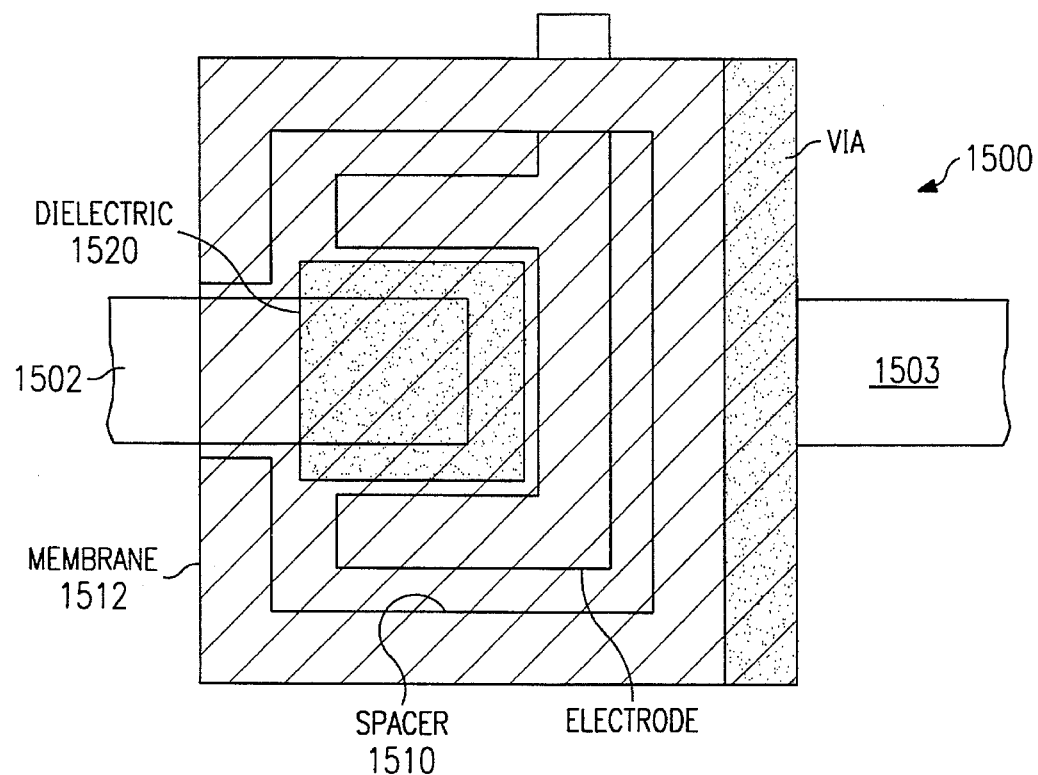
Figure 15B:
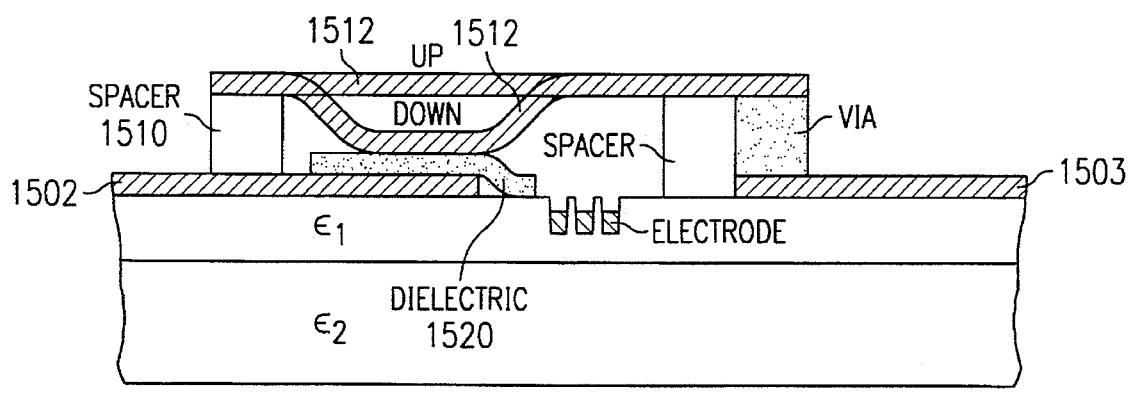

FIGS. 15a–b show in plan and cross sectional elevation views preferred embodiment capacitive switch 1500 which is the same as switch 1400 but with thin (<0.05 μm) dielectric 1520 coatings on the microstrip segment 1502. This prevents metal membrane 1512 from touching microstrip 1502 and provides capacitive coupling of the microstrips analogous to switches 1000 and 1300.

FIGS. 15c–d show in plan and cross sectional elevation views an electrodeless version of switch 1500 which omits the electrode and applies the dc pull down voltage to the dc-isolated portions the microstrips 1502–1503. Capacitors 1532–1533 provide the isolation and inductors 1542–1543 provide chokes for application of the pull down dc voltage between the microstrips.

3. Metal plus dielectric membrane component capacitive coupling.

Figure 16:
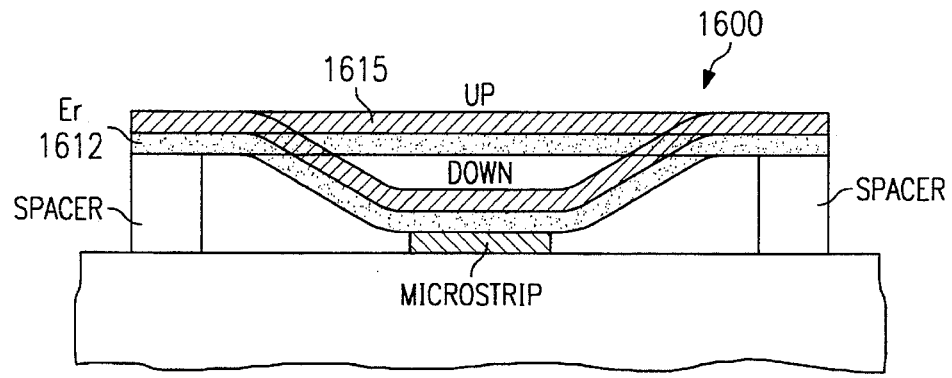
FIG. 16 is a cross sectional elevation view of a two-material membrane preferred embodiment.

FIG. 16 shows in cross section elevation view switch 1600 which is similar to switch 1400 except the membrane is dielectric membrane 1612 with overlying metal film 1615. Dielectric 1612 prevents ohmic contact but provides capacitive coupling of the underlying microstrip through metal film 1615 to microstrip. The use of dielectric film 1612 also eliminates the need to recess the pull down electrode. Note that FIG. 16 shows both the pulled up and the pulled down membrane positions.

4. Metal plus dielectric membrane component ohmic coupling.

Figure 17:
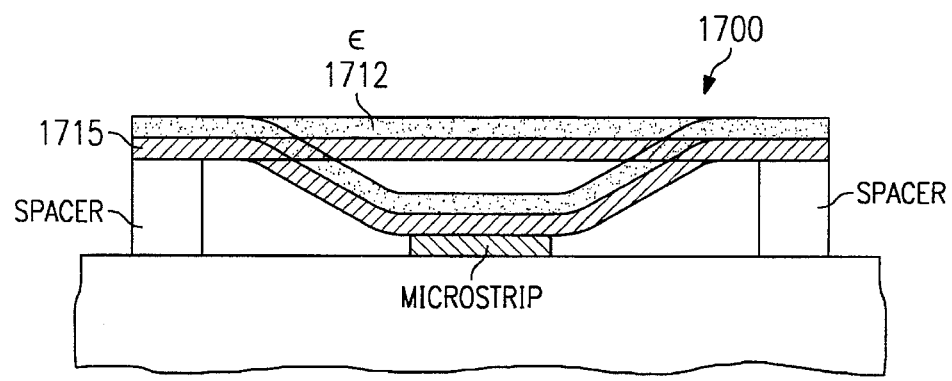
FIG. 17 is a cross sectional elevation view of another two-material membrane preferred embodiment.

FIG. 17 shows in cross section elevation view switch 1700 which is similar to switch 1400 except the membrane is dielectric membrane 1712 with underlying metal film 1715. This provides ohmic contact as in switch 1400 with additional dielectric covering of the membrane.

Preferred Embodiment Switches With
Torsion/Flexure Flap

1. Metal flap torsion ohmic coupling.

Figure 18A:
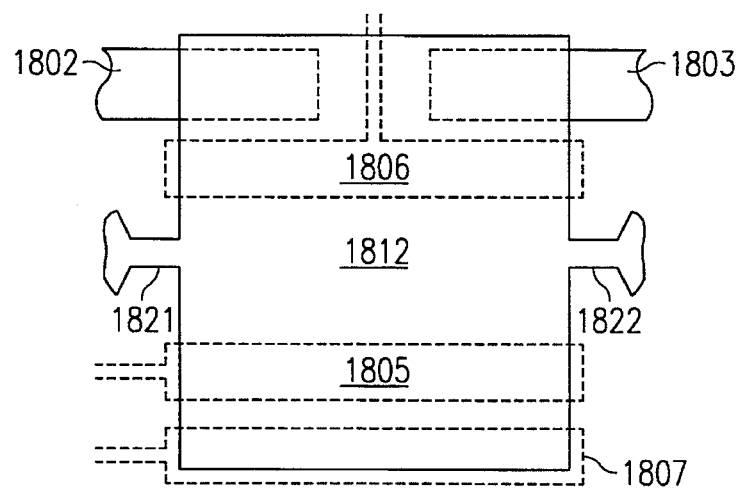
FIGS. 18a–e are plan and cross sectional elevatin views of a torsion hinged preferred embodiment.
Figure 18B:
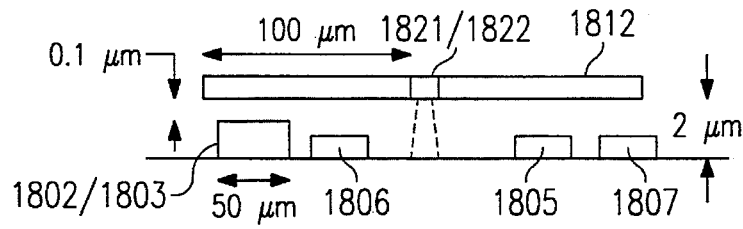

FIGS. 18a–b illustrate in plan and cross sectional elevation views preferred embodiment switch 1800 which differs from the previously described membrane switches by using stiff metal flap 1812 suspended by two thin metal hinges 1821–1822. This is analogous to the spatial light modulator torsion beam pixel of FIGS. 3a–d. Application of a voltage between dc-grounded flap 1812 and electrode 1806 attracts flap 1812 and rotates the flap counterclockwise (in FIG. 18b) about an axis through the hinges. This pulls one edge of the flap down to contact microstrips segments 1802–1803 to form an ohmic connection between the microstrips to close the switch. Flap 1812 is rf isolated from ground by a choke inductor. Removal of the applied voltage allows the twisted hinges to relax and return flap 1812 to parallel to the substrate surface as in FIG. 18b and thereby open the switch. Contrarily, a voltage applied to electrode 1805 twists hinges clockwise and moves the opposite edge of metal flap 1812 toward landing pad 1807 to further open the switch. Thus by applying a voltage to electrode 1805 at the same time that the pull down voltage on electrode 1806 is removed provides an electric opening of the switch rather than just relying on the relaxing of the twisted hinges alone. Indeed, thick (gold plated) microstrips 1802–1803 imply a small gap between flap 1812 and the microstrips for the case of no applied electrode voltages; thus flap 1812 will have a large area of contact with the microstrips because the flap is still close to parallel to the microstrip surfaces. A large area of contact (especially with a soft gold microstrip surface) limits the current density at the contact and extends switch life.

Figure 18C:
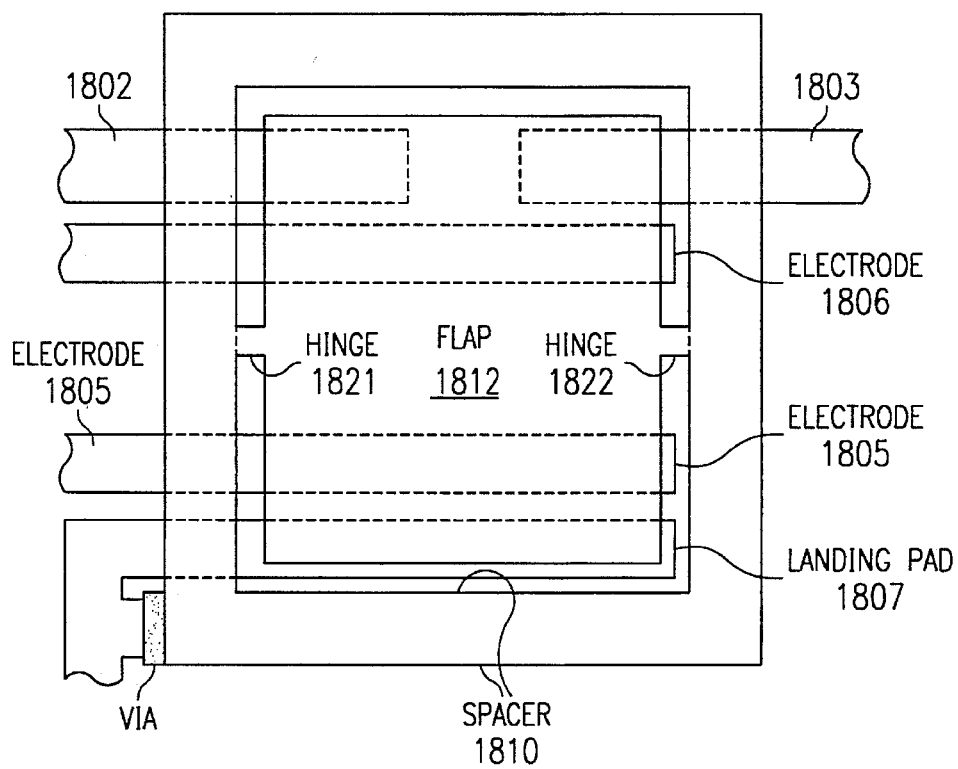
Figure 18D:
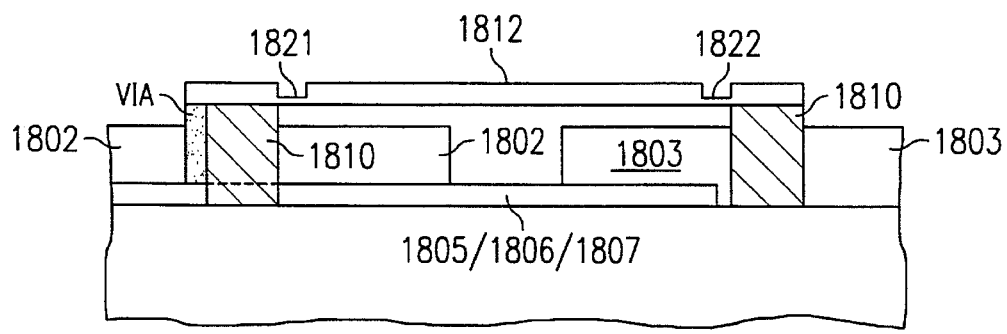
Figure 18E:
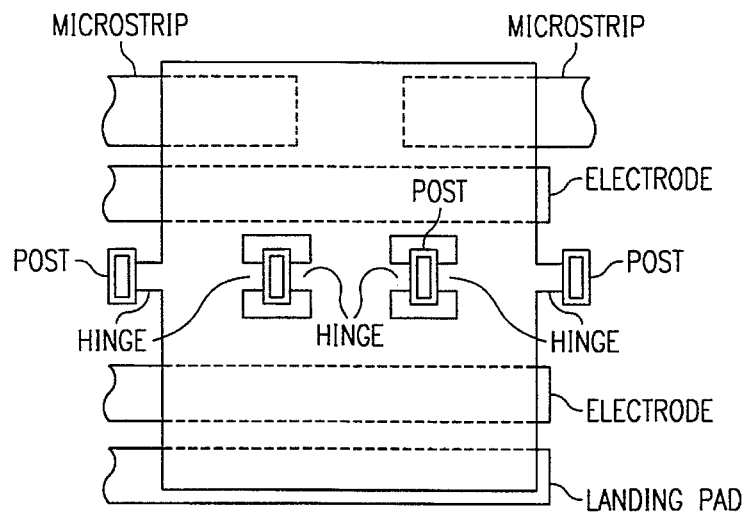

Metal flap 1812 may be about 200 μm wide (extending 100 μm from the rotation axis of the hinges) and fairly thick (5 μm) to remain somewhat stiff and avoid sagging. Hinges 1821–1822 may attach to a surrounding metal layer on a spacer as illustrated in FIGS. 18c–d or may attach to metal posts (analogous to the switch in FIGS. 12b–d) or even a series of metal posts as illustrated in FIG. 18e.

2. Metal flap torsion capacitive coupling.

Figure 19A:
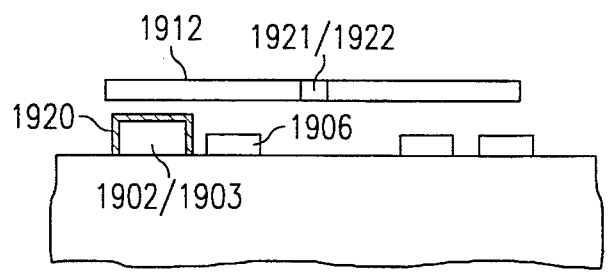
FIGS. 19a–b show a dielectric coated microstrip version of the embodiment of FIGS. 18a–e.

FIG. 19a shows switch 1900 which includes microstrip dielectric coatings but otherwise is analogous to switch 1800. In particular, microstrips 1902–1903 have dielectric coatings 1920. Thus, when voltage applied to electrode 1906 rotates flap 1912 about hinges 1921–1922 to pull on an edge of flap 1912 down to contact the microstrips, a capacitive coupling forms.

Figure 19B:
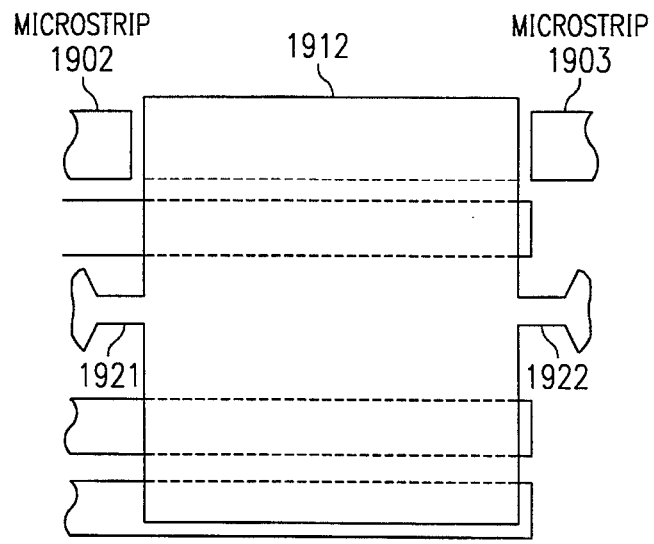

FIG. 19b shows an alternative capacitive coupling approach by torsion beam 1912 in which microstrips 1902–1903 have a separation of just the length of an edge of beam 1912. Thus when beam 1912 is pulled down into the separation space, it capacitively couples to each microstrip and thereby closes the switch.

3. Metal flap flexure ohmic coupling.

Figure 20A:
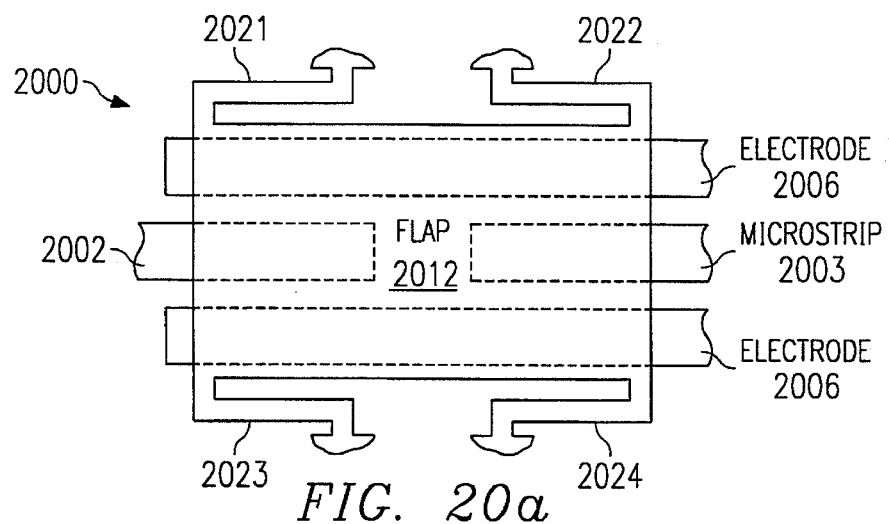
FIGS. 20a–c are plan and cross sectional elevatin views of a flexure hinged preferred embodiment.
Figure 20B:
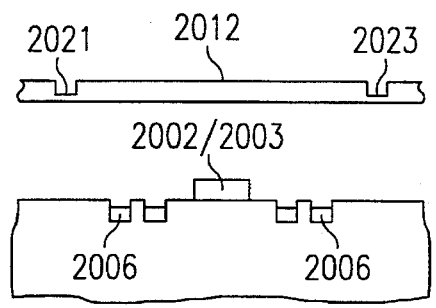
Figure 20C:
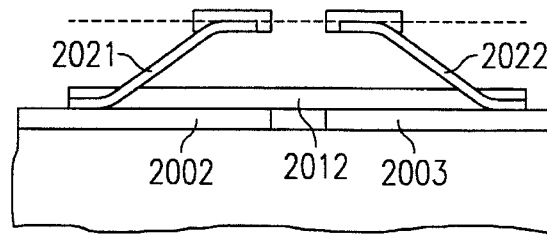

FIGS. 20a–c illustrate in plan and cross sectional elevation views preferred embodiment switch 2000 which includes rectangular metal flap 2012 suspended by flexure hinges 2021–2024 at each corner; recessed electrodes 2006 and microstrips 2002–2003 run under flap 2012. Flap 2012 is thicker than the hinges and is grounded through an rf choke. Switch 2000 operates as follows. With no voltage applied between electrodes 2006 and flap 2012, hinges 2021–2024 hold flap 2012 up over microstrips 2002–2003 and the switch is open as in FIG. 20b. Conversely, with an applied voltage between the electrodes and the flap, flap 2012 is pulled down to bend the hinges and to make contact with the microstrips and thereby close the switch as in FIG. 20c. When the electrode voltage is removed, the hinges relax and pull up the flap to open the switch.

Analogous to the hinges in switch 1800, hinges 2021–2024 may connect to a spacer or to posts.

4. Metal flap flexure capacitive coupling.

Figure 21:
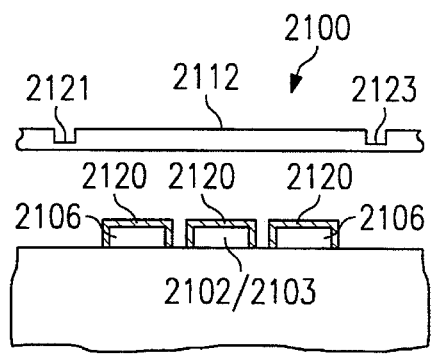
FIGS. 21 shows a dielectric coated microstrip version of the embodiment of FIGS. 20a–c.

FIG. 21 illustrates in cross sectional elevation view preferred embodiment switch 2100 which differs from switch 2000 simply by dielectric coatings 2120 on the microstrips 2102/2103 (and on electrodes 2106 to eliminate the need for recesses) for capacitive coupling. Hinges 2121–2124 support flap 2112 either by connection to a metal layer on a spacer or to metal posts.

Preferred Embodiment Switches With Pullup and Pulldown

1. Metal membrane with overlying pullup metal membrane

Figure 22:
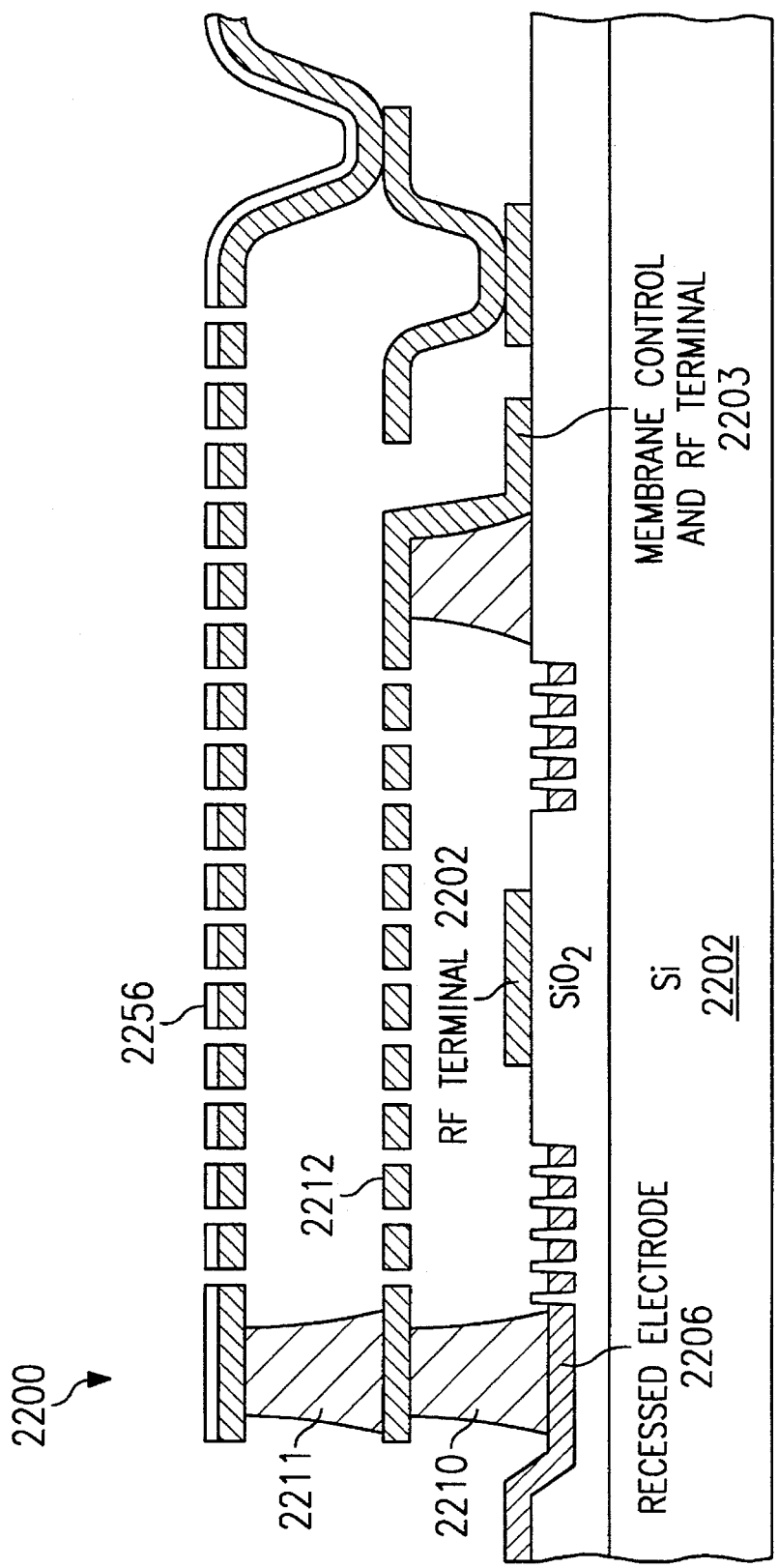
FIG. 22 is a cross sectinoal elevation view of a pull up preferred embodiment switch.

FIG. 22 illustrate in cross sectional elevation views preferred embodiment switch 2200 which is analogous to switch 1400 but with an additional overlying metallized dielectric membrane 2256 which acts as a pull up electrode for metal membrane 2212 which connects to microstrip 2202. As with switch 1400, a voltage applied between recessed electrode 2206 and membrane 2212 pulls the membrane down to make contact with microstrip terminus 2202 and thereby close the switch. Conversely, a voltage applied between overlying membrane 2256 and metal membrane 2212 (while no voltage is applied between underlying electrode 2206 and membrane 2212) pulls membrane 2212 up to open the switch. Thus analogous to switches 1800–1900, switch 2200 has electrical activation for both switch closing and opening and does not rely exclusively on mechanical restoration for switch opening.

FIG. 22 also shows spacers 2210–2211 and plasma access holes in both of the membranes. Switch could be fabricated by first form the underling electrode and microstrips; spin on spacer and form vias; deposit metal and pattern it for membrane 2212 plus a part of the vertical connection for the overlying membrane, this metal deposition also fills the vias to make vertical connections; spin on a second spacer layer and form a via; deposit metal and pattern it to from the overlying electrode membrane; lastly, plasma etch to remove unwanted spacer.

Other embodiments previously described may also have an overlying pull up electrode analogous to membrane 2256 in order to have electrical switch opening. The overlying pull up membrane could be supported by posts rather than spacer, so a spacerless switch with electrical pull up can be made. In this case insulation layers between stacked posts will be needed.

Preferred Embodiment Switches With Bistable Flap

1. Bistable membrane ohmic coupling.

Figure 23A:
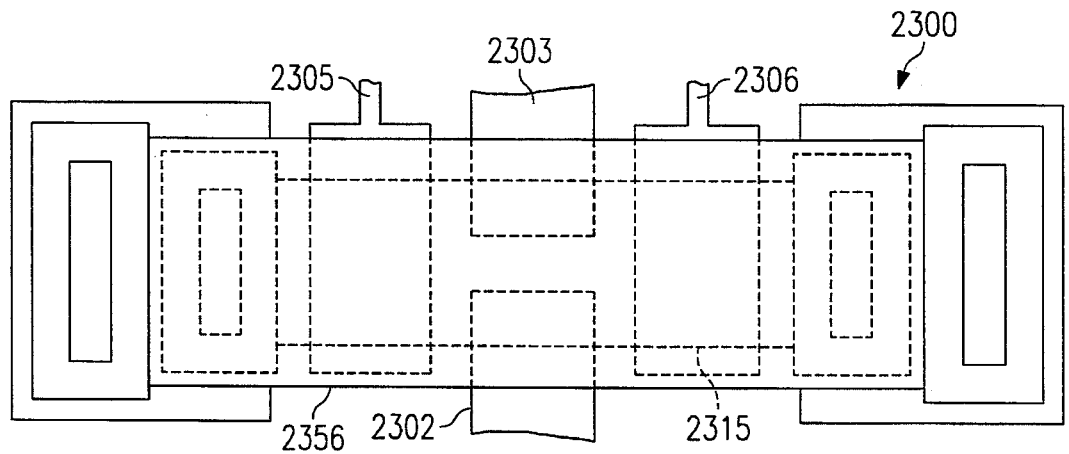
FIGS. 23a–b are plan and cross sectional elevatin views of a bistable membrane preferred embodiment switch.
Figure 23B:
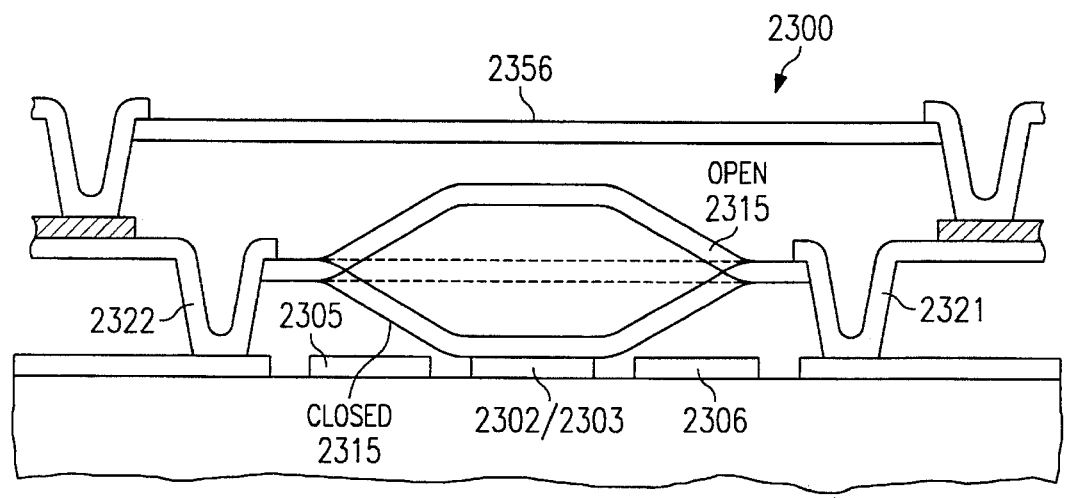

FIGS. 23a–b illustrate in plan and cross sectional elevation views preferred embodiment switch 2300 which differs from the previously desribed switches by use of a stiff bimetal membrane or a film 2315 formed with compressive strain which has two stable states of curvature as illustrated in FIG. 23b. TiW, silicon dioxide, and silicon nitride can all be easily deposited with compressive strain. For a dielectric membrane, apply a thin metallic coating on the bottom side. One curvature state corresponds to an open switch with the membrane separated from the microstrips (2315 OPEN in FIG. 23b), and the second state corresponds to a closed switch with the membrane making an ohmic connection between the microstrips (2315 CLOSED in FIG. 23b). The states can be toggled by voltage applied either between membrane 2315 and pulldown electrodes 2305–2306 or between membrane 2315 and overlying pullup electrode membrane 2356. Note that once membrane 2315 enters one of the two states, no further voltage need be applied to hold it in the state: there is no mechanical restoration force. And as with other electrodeless switch embodiments, dc isolation plus rf chokes are used for pull up (and pull down if it also is electrodeless) voltage. The use of both pull up and pull down electrodes is analogous to the structure of FIG. 22. Compressive strain membrane 2315 is attached to metal vias 2321–2322, so the membrane cannot relax. Fabrication would follow that of switch 1200 using posts, although a spacer version could be made analogous to switch 2200. In either case, the strain membrane must be attached to fixed supports to avoid relaxation of the strain.

Alternatively, a bimetallic bistable membrane can be toggled between curvature states by thermal cycling using the resistance of the membrane and running a dc current through the membrane. In this case the overlying pullup film 2356 may be omitted as well as the pull down electrodes. Further, direct laser beam heating may be used for the toggling.

The membrane length (between support vias) and thickness depend upon the switch size, film strain, and the Euler buckling criterion which states that the film will buckle if the strain exceeds $\pi^2/3$ times the square of the quotient of the thickness divided by the length. The strain can be controlled by deposition process parameter adjustments.

2. Bistable membrane capacitive coupling.

Switch 2300 can be turned into a capacitive coupled switch by applying dielectric coatings on the microstrips, or using a metal coated dielectric membrane. In particular, a 1.5 µm thick silicon membrane with a 0.4 µm thick aluminum top coating and 400 µm long by 30 µm wide could be used.

3. Bistable metal membrane as component.

Switch 2300 can also be connected analogous to switch 1400 with one microstrip attached to the metal vias which support a metal or metal coated dielectric film and only a single microstrip under the membrane.

4. Bistable metal membrane with top contact.

Figure 24:
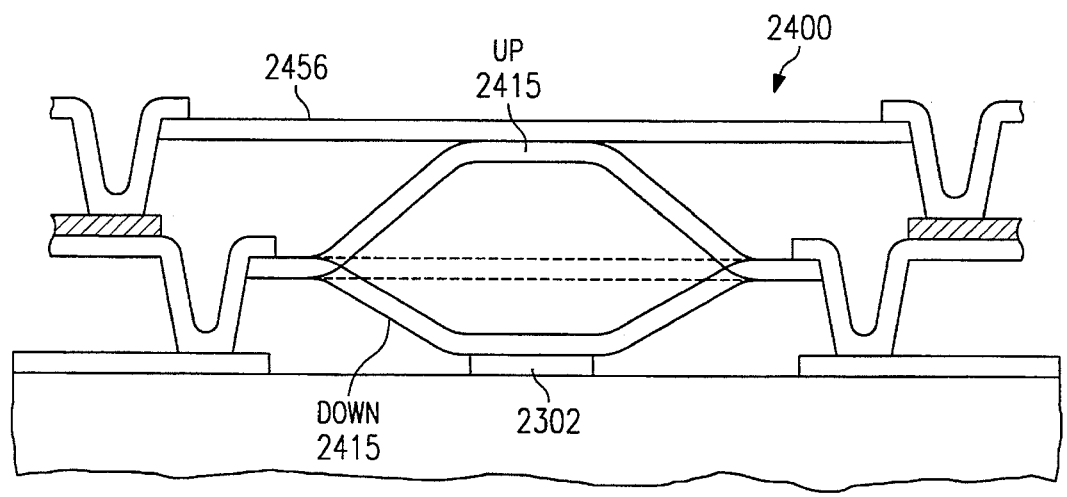
FIG. 24 is a cross sectinoal elevation view of a top contact version of the switch of FIGS. 23a–b.

FIG. 24 shows switch 2400 as a modification of switch 2300 in which the top pullup electrode membane 2456 makes contact with the compressive strain membrane 2415. This permits a third microstrip to be connected to the pullup membane vias and form an intrinsic SPDT. That is, an input microstrip connected to strain membrane 2415 will either connect to a first output microstrip 2302 when membrane 2415 is down or connect to a second output microstrip through top membrane 2456 when membrane 2415 is up.

Preferred Embodiment Multi-throw Switches

Almost all of the foregoing preferred embodiments are single pole-single throws (SPST) switches. However, these switches also provide the foundations for more involved switches which find wide application.

1. Single pole-double throw—SPDT

FIG. 5 shows an SPDT made with a single membrane, and FIG. 6 shows a merged version of two SPDTs formed with a single membrane. Similarly, FIG. 24 illustrates an SPDT.

Figure 25A:
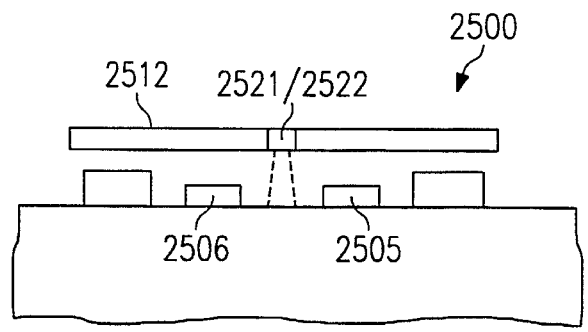
FIGS. 25a–c shows a torsion hinged SPDT and variation.
Figure 25B:
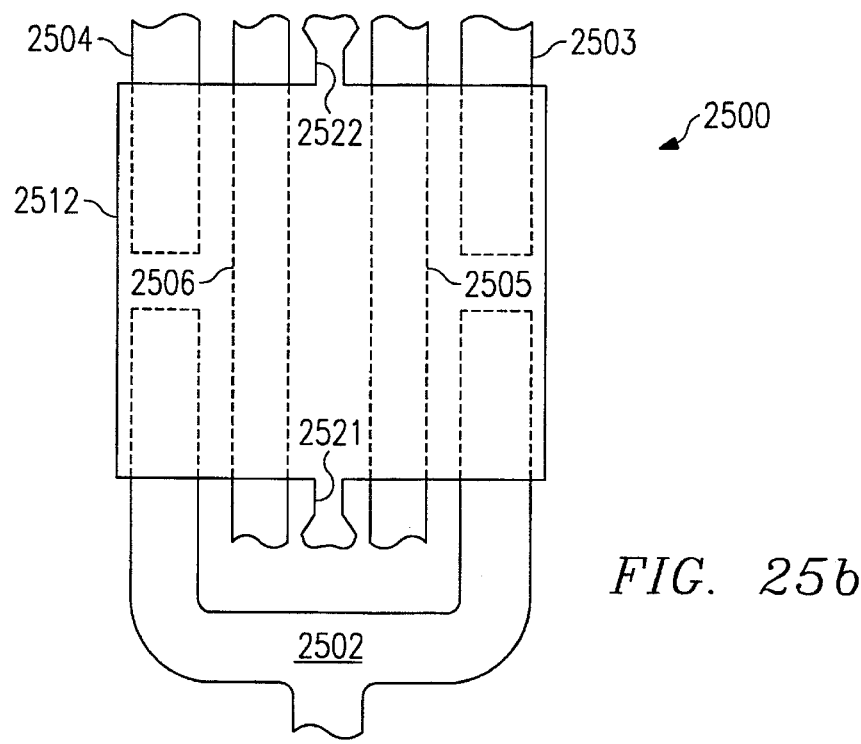
Figure 25C:
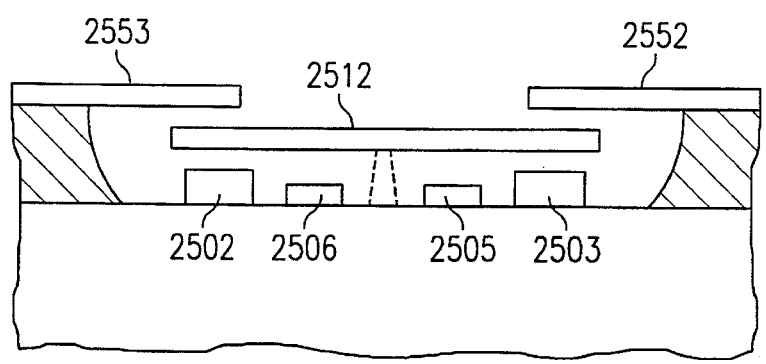

FIGS. 25a–b shows torsion flap SPDT switch 2500 including metal flap 2512 supported by hinges 2521–2522 with electrodes 2505–2506 on either side of the rotation axis of the torsion flap. Input on microstrip 2502 goes out either microstrip 2503 or 2504. Further, switch 2500 could be modified by an overlying pair of contacts such as illustrated in FIG. 25c. In this case the torsion flap would be rf isolated and just act as a conduit connecting either microstrip 2502 to overhanging conductor 2552 or microstrip 2503 to overhanging conductor 2553.

Figure 26:
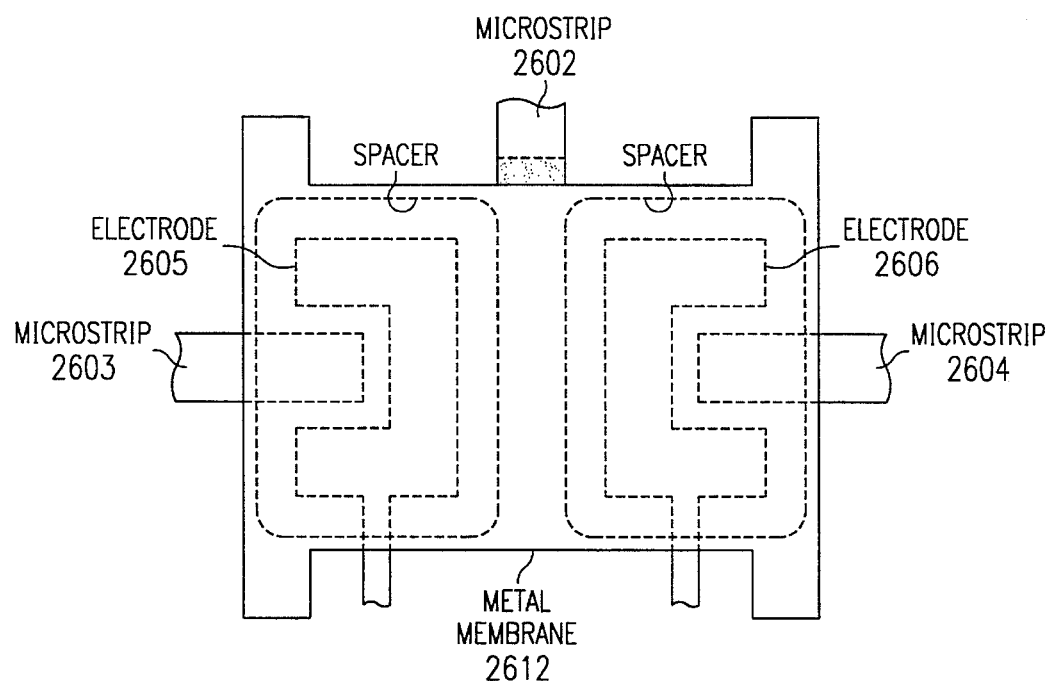
FIG. 26 shows a membrane SPDT.

FIG. 26 illustrates in plan view SPDT switch 2600 which could be considered an SPDT version of switch 1400. Metal memebrane 2612 connects by a via to input microstrip 2602 and extends over recessed pull down electrodes 2605–2606. With a dc pull down voltage between electrode 2605 and membrane 2612 pulls down to make connection with microstrip 2603 and close one switch; conversely, activation of electrode 2606 pulls the membrane down to microstrip 2604 and close the other switch. Membrane 2612 could be about 250 µm wide and 400 µm long and be suspended about 2 µm over the microstrips. About 30 volts dc will pull down an aluminum membrane of thickness 0.4 µm.

2. SP3T

Figure 27A:
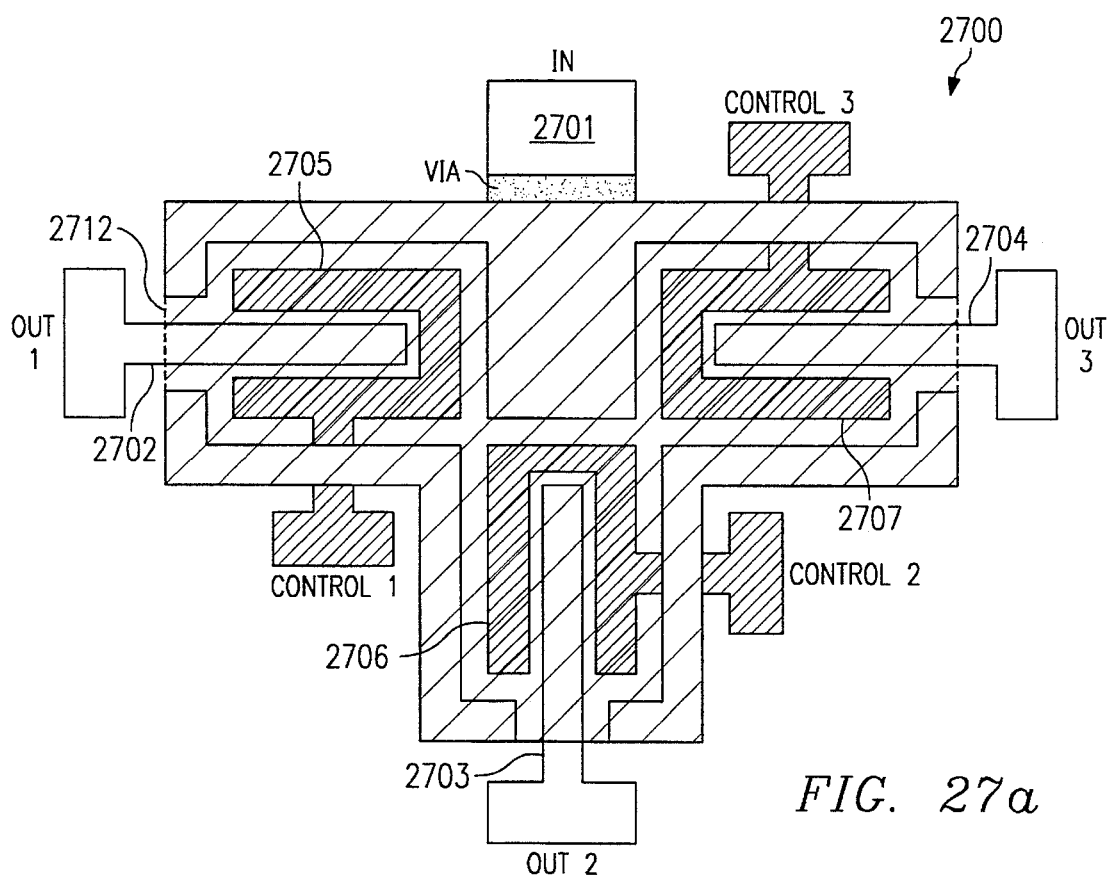
FIGS. 27a–b illustrate a membrane SP3T.
Figure 27B:
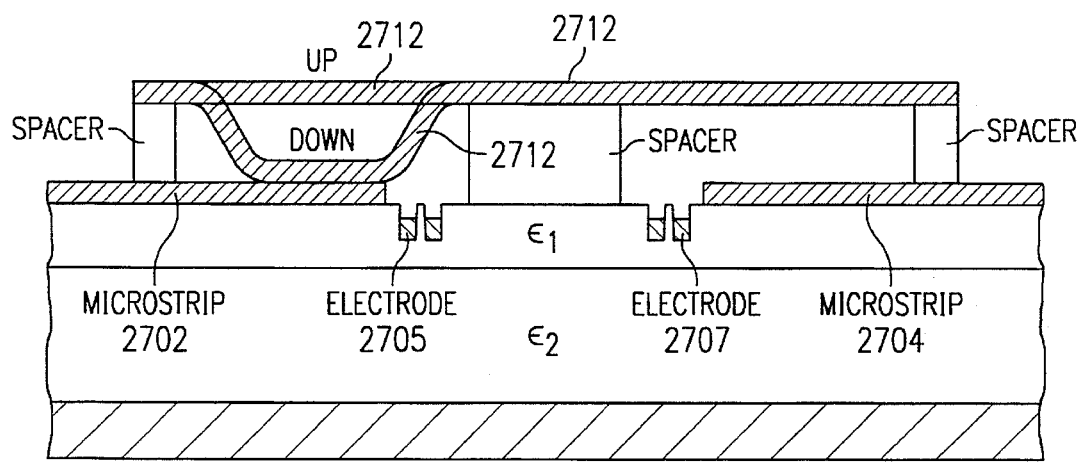

FIGS. 27a–b illustrate in plan and cross sectional views single pole-three throw (SP3T) switch 2700 made of three adjacent switches analogous to switch 1400 and with a common metal membrane 2712 connected by a via to input microstrip 2701 and three recessed electrodes 2705–2707 and corresponding output microstrips 2702–2704. More output microstrips and pull down electrodes could be included by expanding the square geometry either symmetrically as to a pentagon, hexagon, etc. or linearly as illustrated in the next section.

A capacitive coupling version of SP3T switch 2700 may easily be realized by dielectric coatings on the end portions of the three underlying microstrips. And the electrodes could also have dielectric coatings and thereby avoid being recessed.

3. SPMT

Figure 28B:
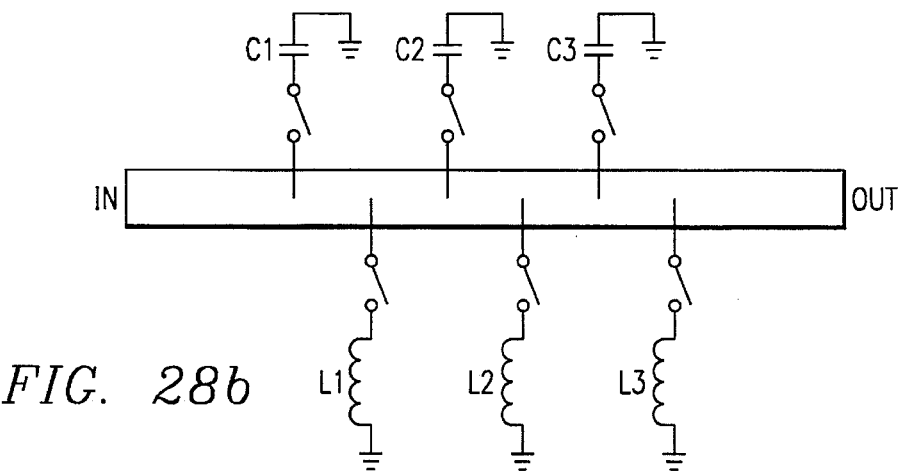
FIGS. 28a–b show a six output switch and application to a filter.
Figure 28A:
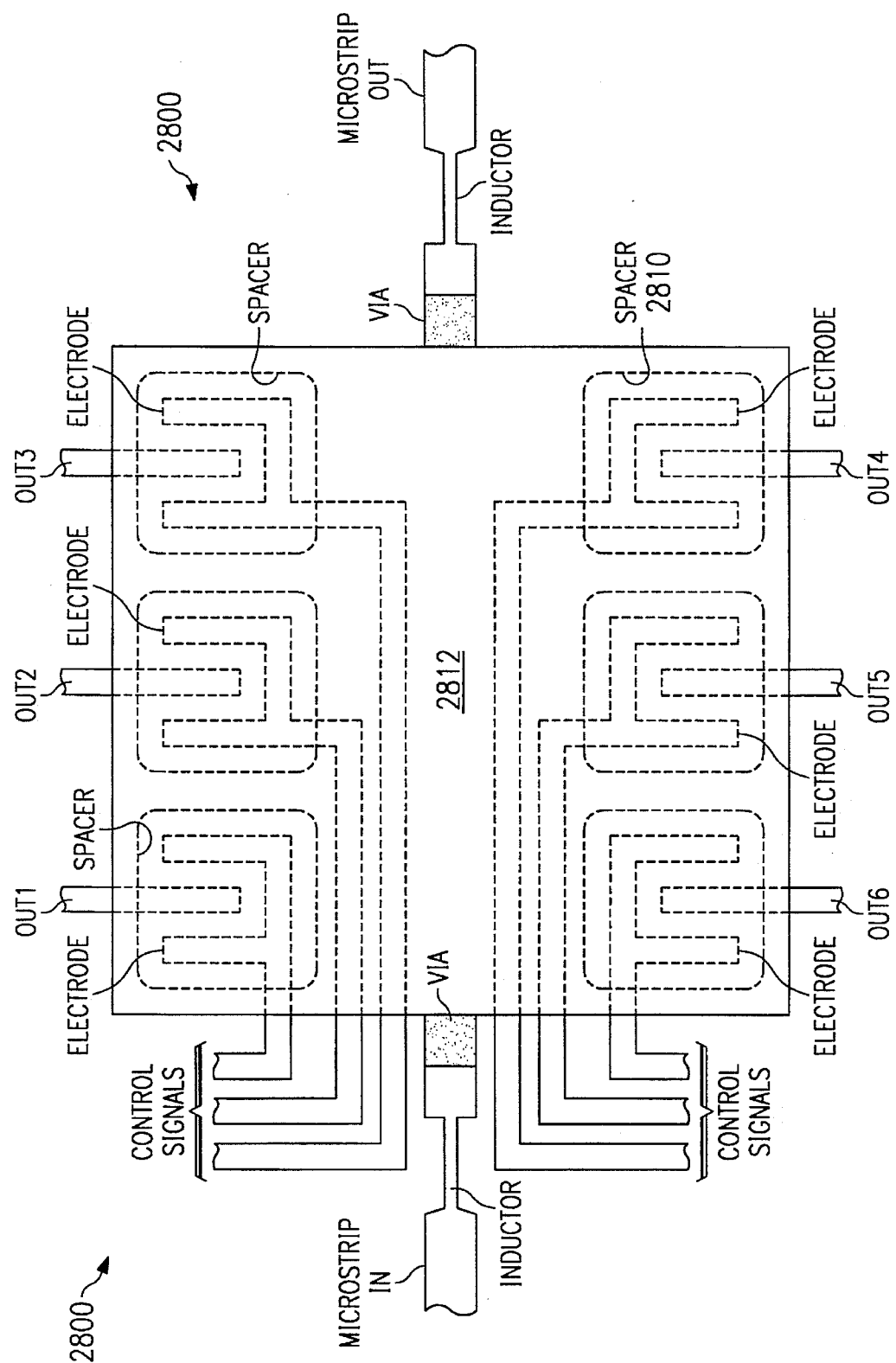

FIG. 28a shows in plan view six throw switch 2800 which could be used in a filter as heuristically illustrated in FIG. 28b. Switch 2800 includes metal membrane 2812 which spacer 2810 suspends over six output microstrips OUT1–OUT6 and corresponding recessed electrodes. Microstrips IN and OUT connect to opposite ends of membrane 2812 by vertical vias, and each includes an inductor to cancel out the excess capacitance of membrane 2812. Each electrode pulls down a portion of membrane 2812 to make contact with its corresponding output microstrip. As with the other embodiments, membrane 2812 will be dc isolated from the microstrip IN and microstrip OUT to provide the proper dc potential, typically ground.

In the filter application of FIG. 28b, the six output microstrips labelled OUT11–OUT6 connect to ground through either lumped or distributed or stub capacitors C1–C3 and inductors L1–L3.

Preferred Embodiment Shunt Switches

Figure 29A:
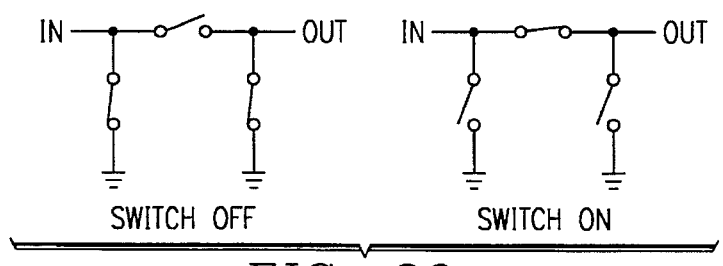
FIGS. 29a–h show shunt switches.
Figure 29B:
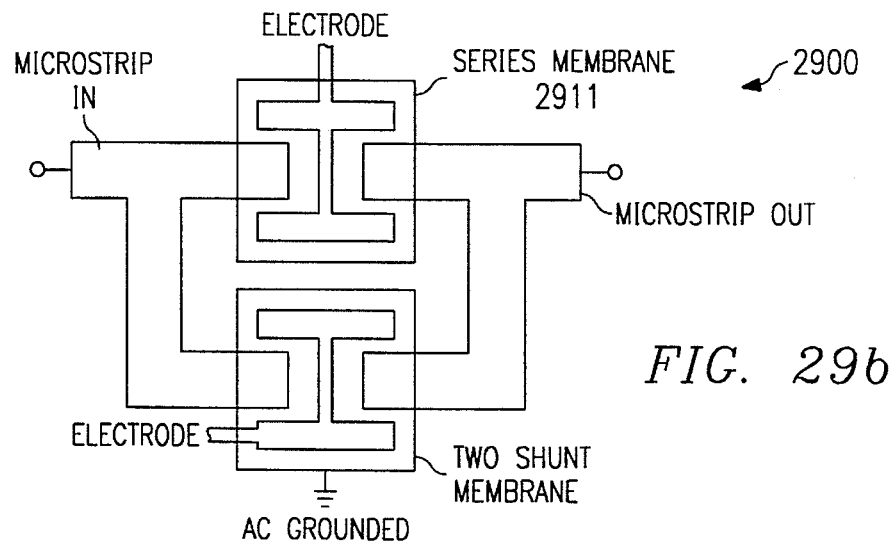

FIG. 29a illustrates heuristically a shunt-series-shunt switch configuration and FIG. 29b shows in plan view preferred embodiment 2900 utilizing the foregoing membrane switches. In particular, metal membrane 2911 pulls down to make the series connection between the IN and OUT microstrips, and metal membrane 2912 pulls down to make both shunt to ground connections for the microstrips.

Figure 29C:
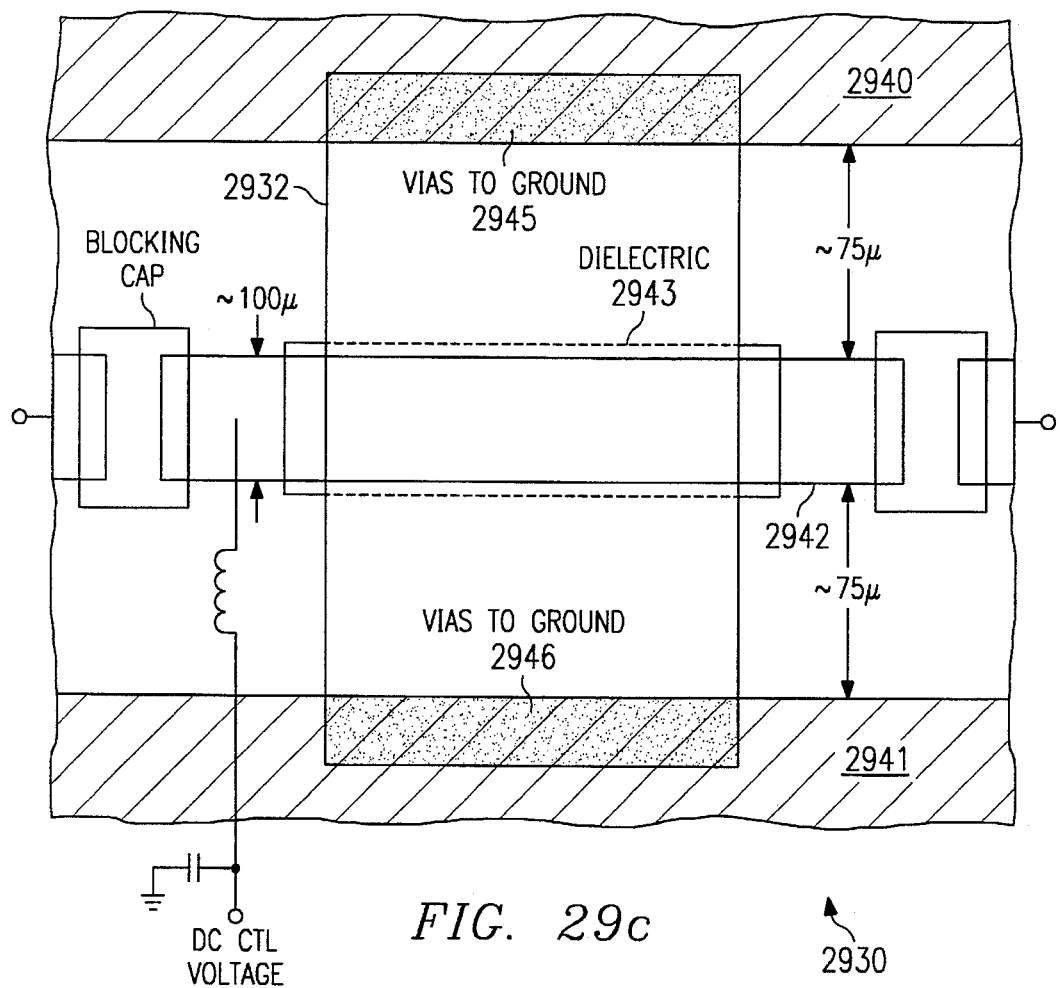
Figure 29D:
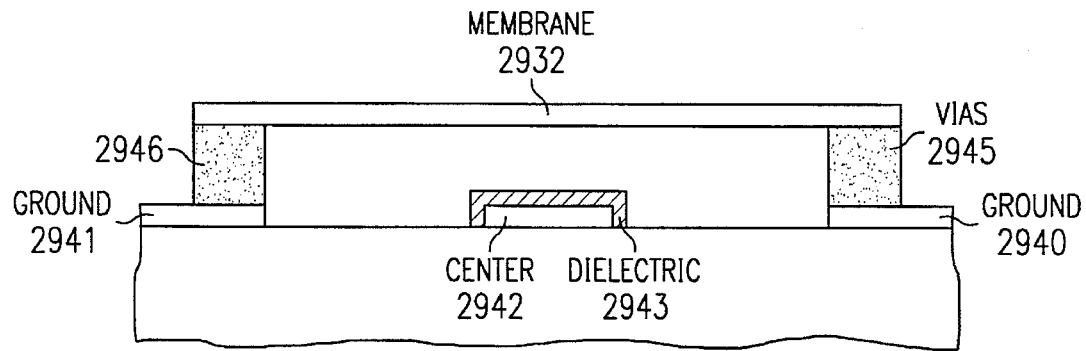

FIGS. 29c–d show in plan and cross sectional elevation views shunt switch 2930 tier a coplanar waveguide with ground lines 2940–2941 and center line 2942. Vias 2945–2946 suspend metal membrane 2932 about 2 µm over the centerline and connect the membrane to the ground lines. Centerline 2942 is coated with dielectric 2943 and is dc isolated for electrodeless operation. A pull down voltage applied to centerline 2942 pulls membrane 2932 down to capacitively couple the centerline to ground.

Figure 29E:
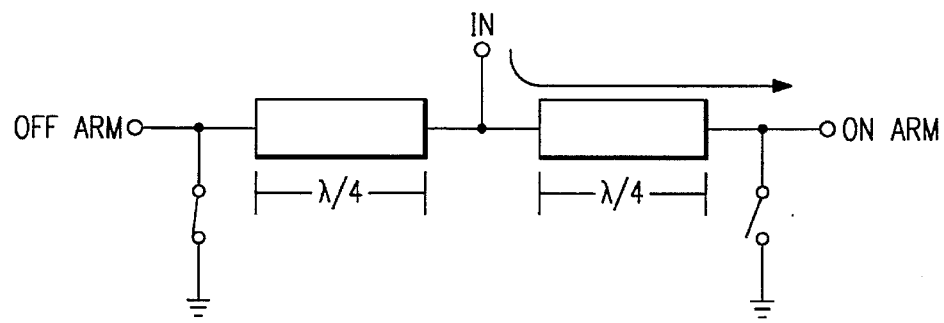
Figure 29F:
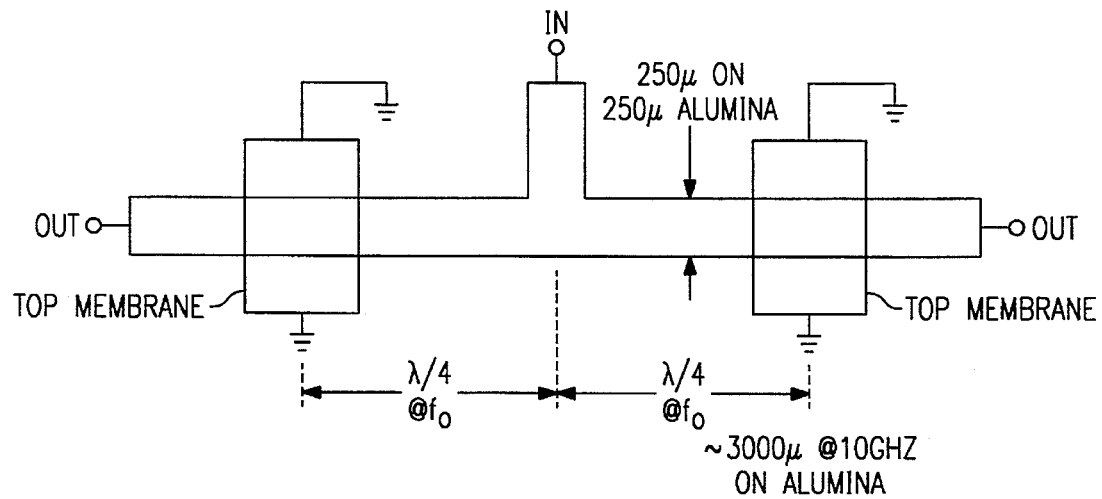
Figure 29G:
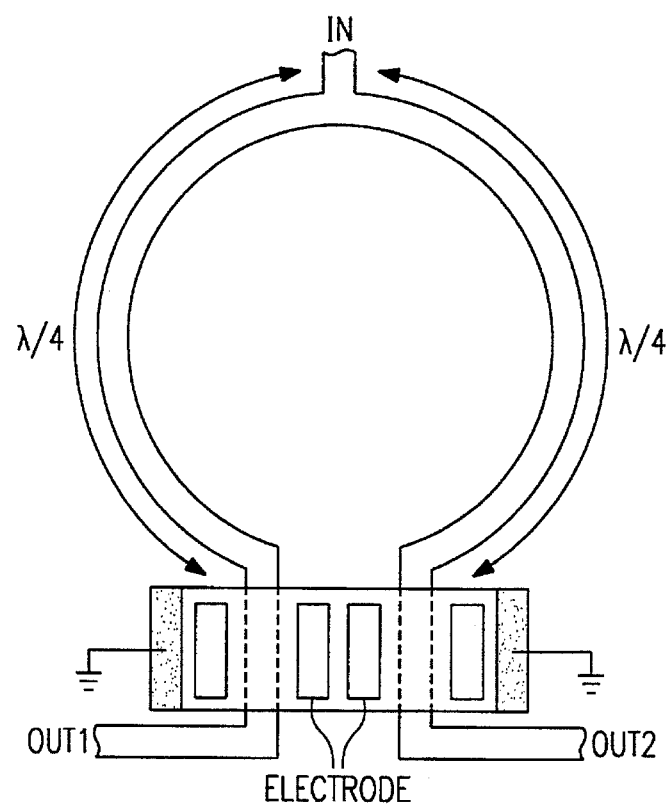
Figure 29H:
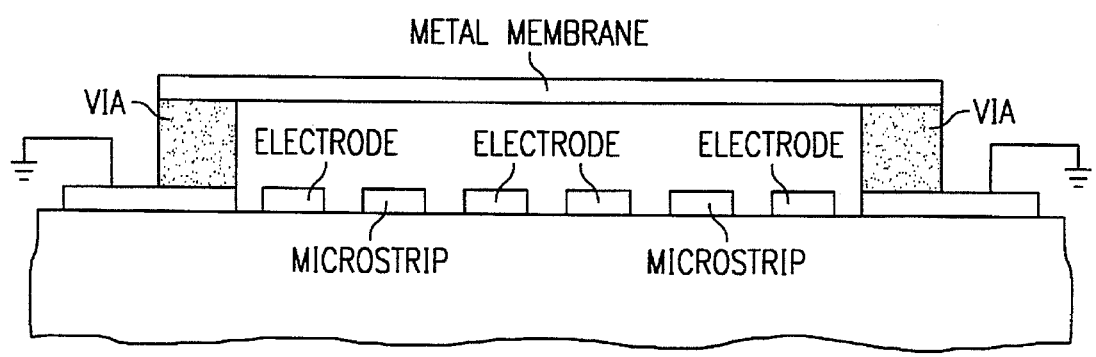
Figure 30A:
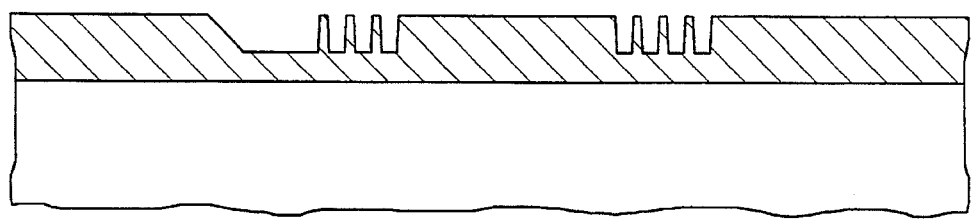
FIGS. 30a–f illustrate fabrication steps.
Figure 30B:
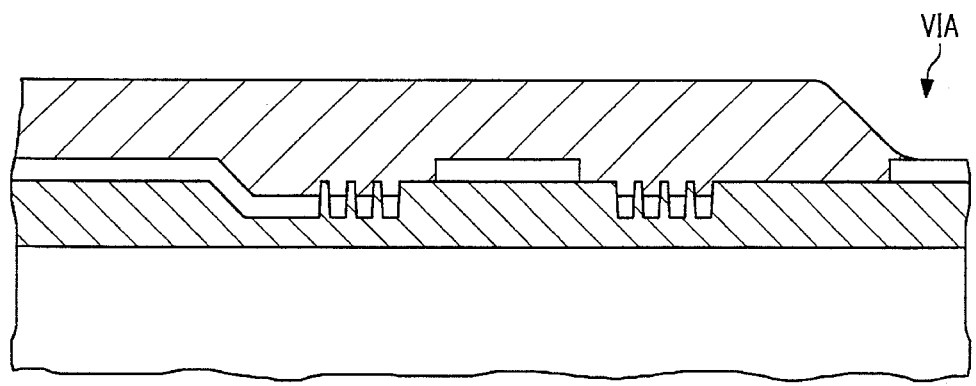
Figure 30C:
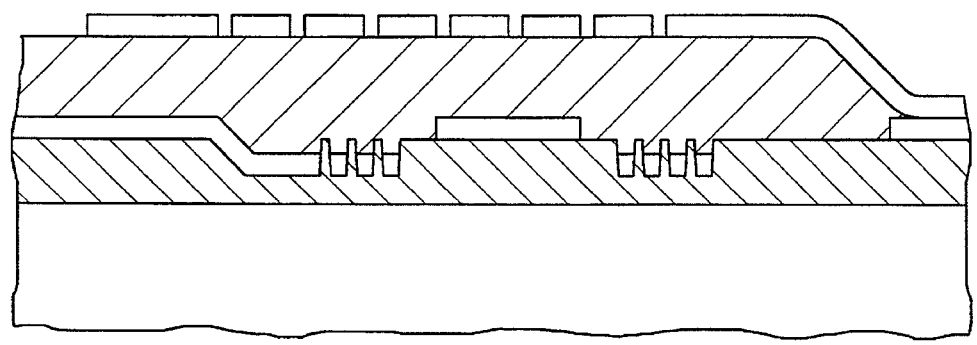
Figure 30D:
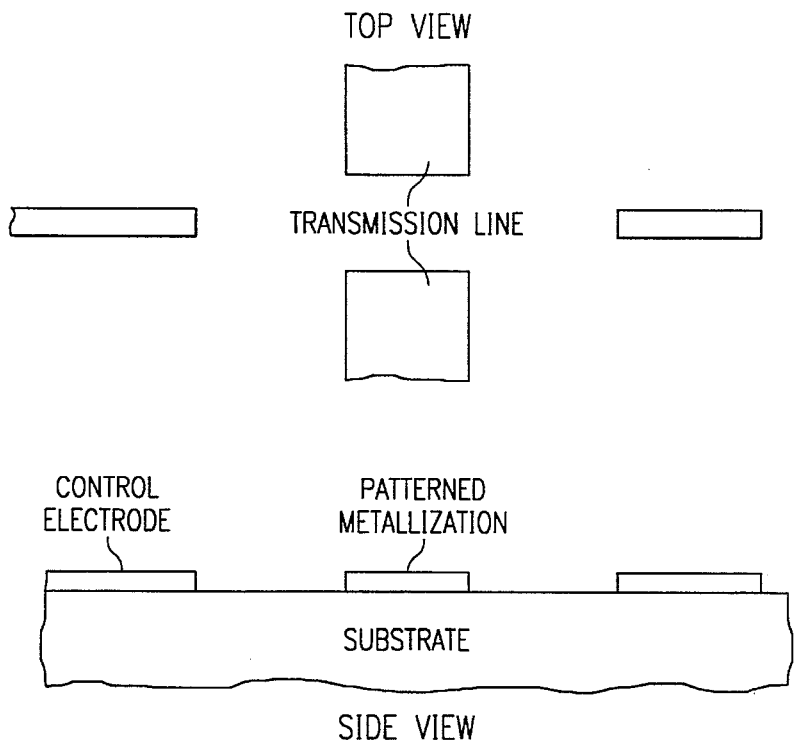
Figure 30E:
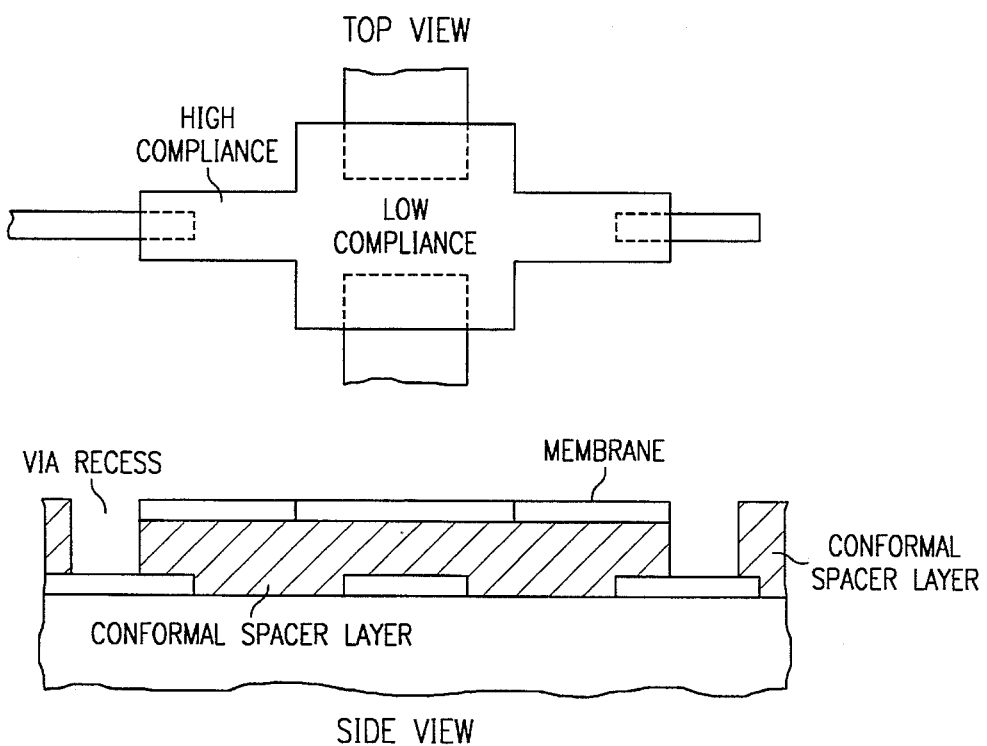
Figure 30F:
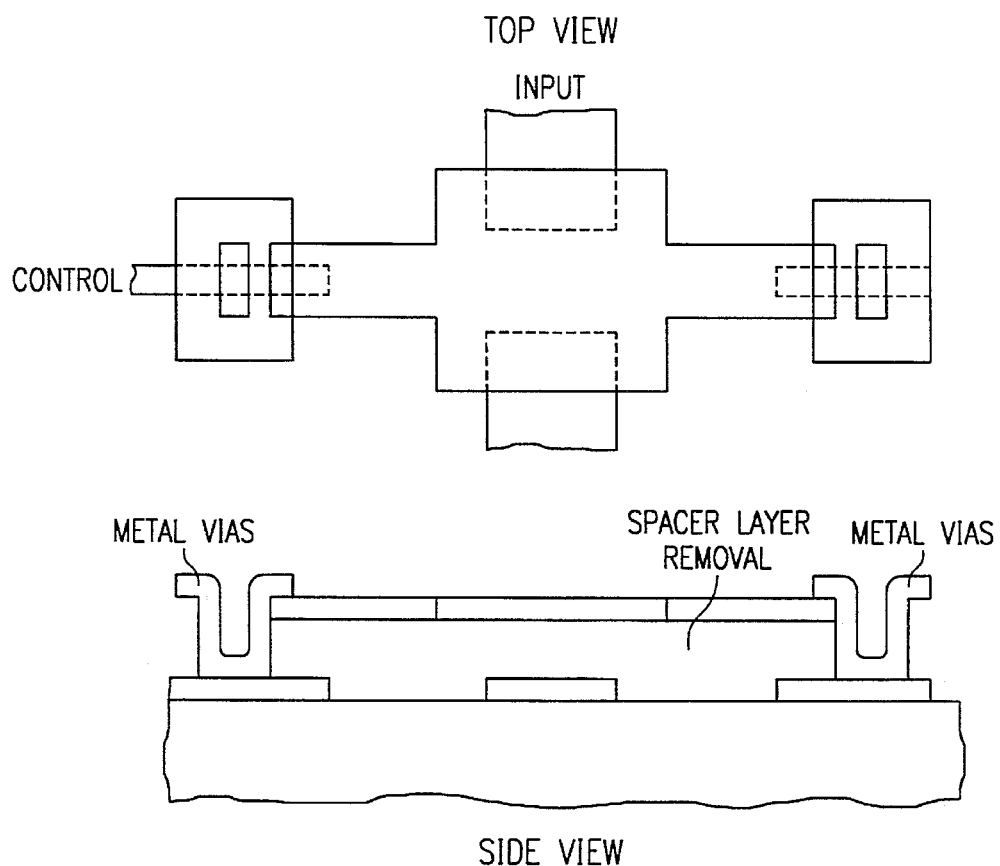
Figure 31:
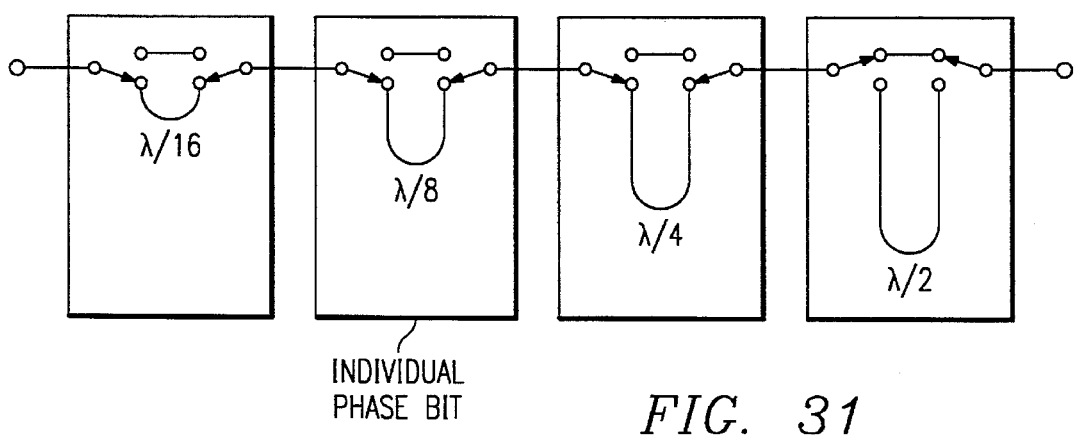
FIG. 31 shows a swithced line phase shifter.

FIGS. 29e–f show a narrow band SPDT switch which uses selective shunting of one of the arms to ground. This avoids off capacitance problems and uses resonant trensmission lines to achieve proper phaseing. The individual shunt to ground switches may each be like switch 2930 or may be combined with a single membrane as illustrated in FIGS. 29g–h. Alternatively, the torsion flap switch 2500 could be used with the flap connected to ground. Also, the foregoing could capacitively couple to ground by dielectric coatings on the microstrips.

Preferred Embodiment Fabarication Methods

The foregoing switches can be fabricated by the following preferred embodiment methods, illustrated in FIGS. 30a–f, or variants of these methods:

1. Method for spacer support switch.

Begin with an oxidized silicon substrate. Form any other devices, such as CMOS control logic, which are needed away from the area of the switch, and cover these devices with a protective coating. Then photolithographically define the location of the recessed electrode and etch the oxide with a timed etch (a fluorine plasma or an HF wet etch), the recess may have sloped sidewalls to help step coverage. Etch to the desired depth, e.g., 1 µm deeper than electrode thickness. See FIG. 30a. Then deposit by liftoff metal (e.g., TiW/Pt/Au roughly 0.4 µm thick) to form the microstrips and electrodes extending into the recess and on the oxide surface. If the microstrips are to be thicker (e.g., 5 µm) away from the switch, then electroplate them now also recess deeper. Spin on the spacer material (e.g., 2 µm of photoresist or polyimide) which planarizes the surface. Expose the spacer and develop it to form the via for vertical connection from the evenual metal membrane down to the corresponding microstrip; see FIG. 30b. A bake will slope the sidewalls of the spacer for better step coverage. Next, deposit the metal film membrane (e.g., sputter Al with a thickness 0.4 µm or low temperature CVD tungsten), this also covers the via sidewalls. If Then spin on photoresist and pattern it to define the membrane (about 400 µm diameter) plus connection into the via plus the plasma access holes. Then etch the metal film (e.g., KOH for Al); see FIG. 30c. Lastly perform a timed plasma etch of the spacer to form the opening under the membrane while leaving the spacer annulus to support the membrane.

This process is relatively straightforward and compatible with low-cost processing such as silicon CMOS processing, and the switches can be integrated with CMOS control circuitry or other logic for driving the electrodes to control the switches.

2. Method for via-post supported switch.

First spin on photoresist and pattern it to define the locations for the electrodes and microstrips. Next, deposit metal (e.g., TiW/Pt roughly 0.3 µm thick) lines by liftoff; see FIG. 30d. Then do any needed electroplating of portions of the microstrips away from the switch. Deposit a 2 µm thick layer of planarizing spacer; e.g., spin on photoresist or polyimide. Deposit a layer of membrane metal to the desired thickness on the spacer. The thickness will depend upon membrane material, switch size, and switching speed; for example switch 1200 has about 0.4 µm of aluminum. Then photolithographically etch the metal layer to membrane size and etch vias in the spacer down to the electrodes; see FIG. 30e. Deposit conformal metal (e.g., CVD tungsten) to fill the vias and photolithographically etch the conformal metal to remove it everywhere except in the vias. Lastly, strip the spacer; see FIG. 30f.

Alternatively, the vias could be formed first and then membrane metal and via metal deposited in the same step or as successive steps with a liftoff for the thicker metal on a thinner underlying metal.

Preferred Embodiment Phase Shifters

1. Switched line time delay phase shifter.

FIG. 31a shows a schematic preferred embodiment four-bit switched line time delay phase shifter. Each bit contains two SPDT switches that select either of two possible line length paths. The SPDT switches may be any of the preferred embodiment switches; in particular, FIG. 6 shows merged SPDTs.

2. Quadrature hybrid coupled time delay phase shifter.

Figure 32A:
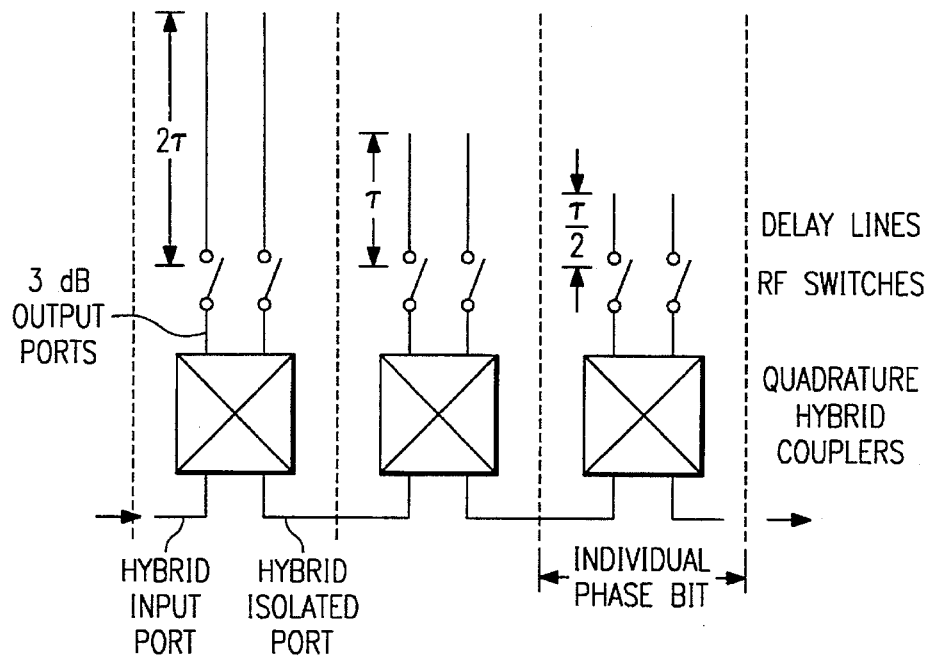
FIGS. 32a–b show quadrature hybrid-coupled time delay phase shifters

FIG. 32a schematically illustrates a 3-bit quadrature hybrid-coupled time delay phase shifter with preferred embodiment SPST switches. A quadrature hybrid coupler has the property that identical reflection coefficients placed on the two 3 dB output ports cause the reflected signals to add constructively as the hybrid isolated port and to add destructively (or cancel) on the hybrid input port. The destructive cancellation at the input port allows the hybrid to maintin its impedance matched property. The phase of the resultant constructively added signal at the isolated port has a 1:1 relationship to the phase of the reflection coefficients placed on the hybrid output ports. If unity magnitude reflection coefficients are used, total reflection occurs which results in lossless transmission from the hybrid input port to hybrid isolated port with a phase that is determined by the reflection coefficient phase.

Purely reactive circuits (unity magnitude reflection coefficients) are created on the hybrid 3 dB output ports as determined by the switch positions. By using differing pairs of line lengths on the various hybrids, the required phase bits will produce the differential phase shifts as determined by pairs of switch states. The cascade connection of three each hybrid bits allows the realization of any phase from 0 to 360 degrees in 45 degree increments.

Figure 32B:
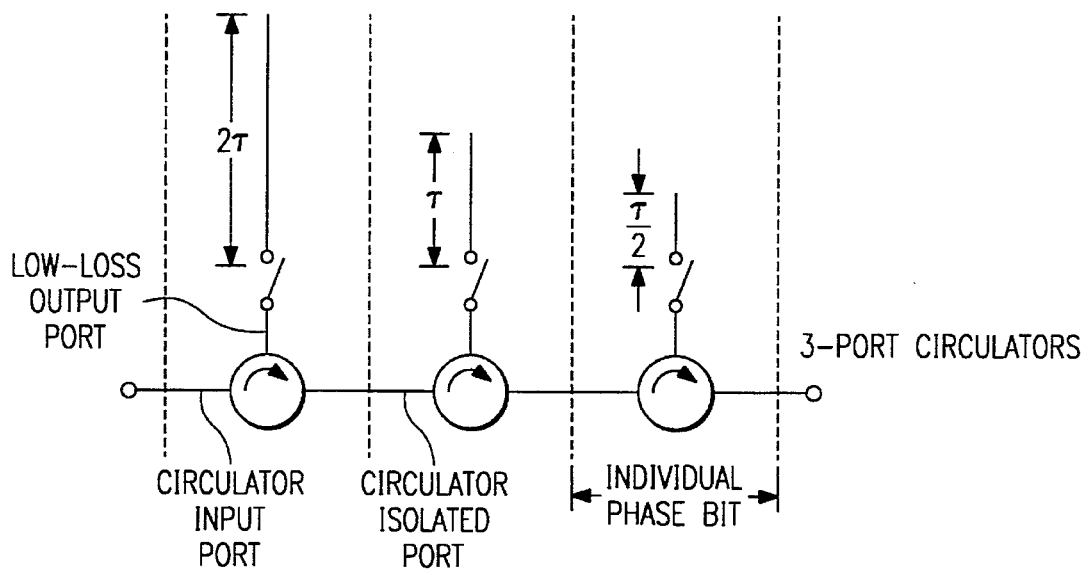

A similar type phase shifter design in FIG. 32b can be realized by using 3-port circulators instead of 3 dB quadrature couplers. Again, the transmitted signal phase of each bit is established by the position of switches on the circulator low-loss output port to reflect the signal to the originally isolated port. The advantage is that each bit requires only one switch to establish the required transmission phase differential.

3. Periodically loaded-line phase shifter.

Figure 33:
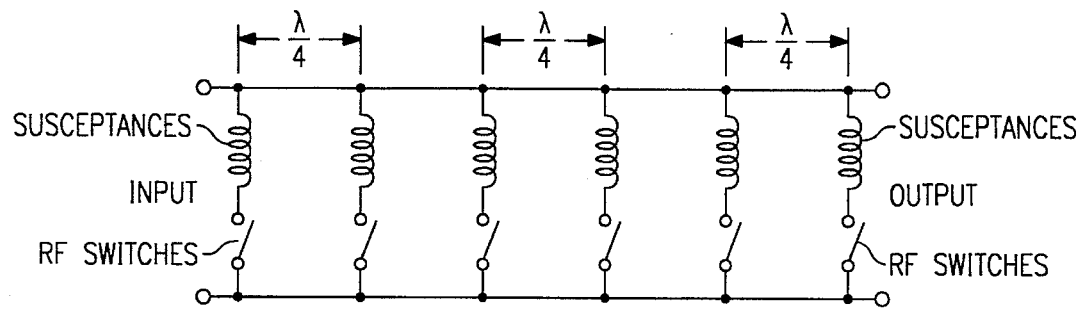
FIG. 33 shows a periodically loaded-line phase shifter.

A periodically loaded-line phase shifter consists of a transmission line periodically loaded with switched susceptances. Pairs of identical switchable susceptances are spaced approximately one quarter-wavelength apart along the transmission line as shown in FIG. 33 with SPST switches to ground; however, a single preferred embodiment multithrow switch as in FIG. 28a is used with the microstrip in/out grounded. Reflections from each pair of identical susceptances tend to cancel so that the transmissin line impedance match is maintained. Each pair of switchable susceptances produce an increment of the toal desired phase shift dieferenetial. If each susceptance pair produces 22.5 degrees of differential hpase shift, 32 switches would be required to eetablish any phase from 0 to 360 degrees in 22.5 degree increments.

Preferred Embodiment Time Delay Networks

1. Aperture fill time compensating networks

FIG. 34a shows that a signal wavefront incident on an array of length L from an angle θ off broadside travels a distance of Lsinθ farther to the last element of the array than it does to the first element. The time it takes for the signal to be present at all elements of the array is T=(L/c)sinθ where c is the speed of light in free space. This time T is known as the aperture fill time. For pulsed systems and large arrays, this can be an instantaneous bandwidth limiting factor. To reduce or eliminate this problem, switchable time-delay networks (FIG. 34c using preferred embodiment SPDT or merged SPDTs as in FIG. 6) can be incorporated behind each element or each subarray of elements of the array. FIGS. 34b shows a 4 by 4 subarray that could be used as a time steered subarray in a phase steered aperture. The phase shifters shown are as in FIG. 31. If each subarray power amplifier was 16 watts, then each element could receive up to 1 watt. Each element of subarray 3400 is a square patch radiator with side length of approximately 0.350 inch.

2. Digital phase scanning

Figure 35:
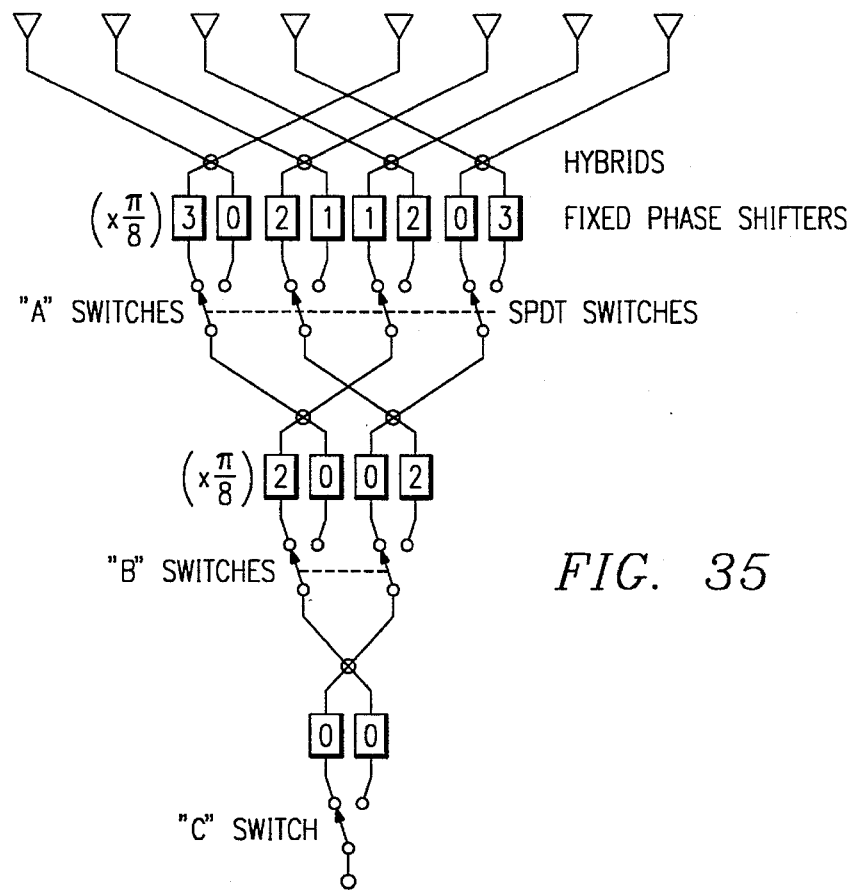
FIG. 35 shows digital phase scanning.

FIG. 35 shows a schematic of a digitral phase scanned linear array. Each hybrid is a quadrature coupler device and is interconnected with fixed time delay phase shifters and preferred embodiment SPDT rf switches. The fixed phase shifters are each multiples of 22.5 degrees (π/8 radians) as shown in the Figure. By appropriate selection of the switch states, element-to-element phase increments of ±22.5, ±67.5, ±112.5, and ±157.5 degrees can be achieved. Each of these 8 linear element-to-element phase distributions will form a separate beam in space. However, only one beam may be formed at a time.

Preferred Embodiment Beam Selection

1. Butler matrix beam selection

Figure 36A:
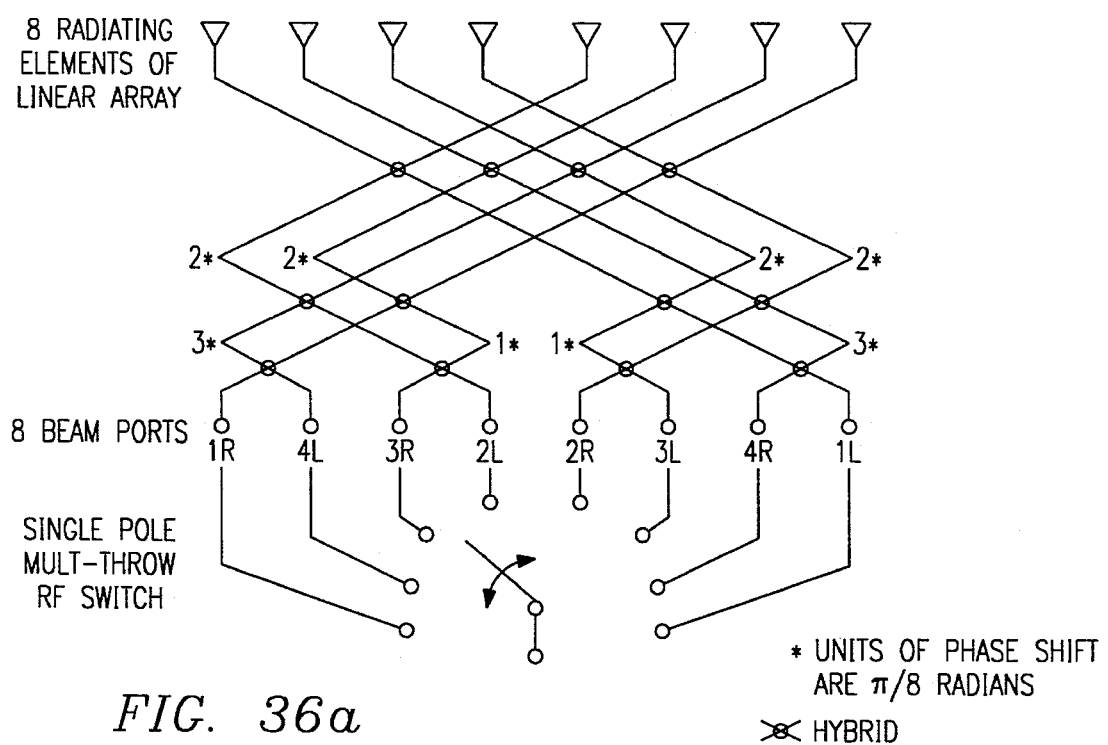
FIGS. 36a–b illustrate Butler matrix beam selection.
Figure 36B:
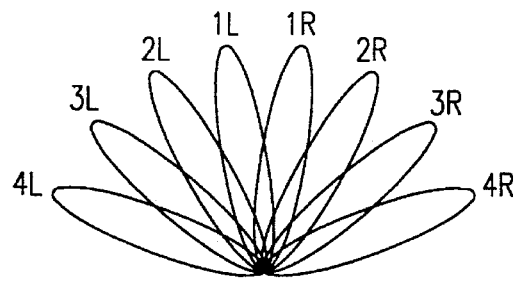

FIG. 36a shows a schematic of an 8-beam Butler matrix connected to a linerar array of 8 radiating elements. The network has 8 beam ports labeled 1 through 4 left and 1 through 4 right. FIG. 36b shows the 8 array beam patterns generated by the network and are labeled 1 through 4 left and 1 through 4 right. A signal received from the diretion of the peak of one of the beams will emerge from the network on the port labeled with the same beam number. Conversely, a signal applied on one of the network beam ports will create the corresponding beam in free space. Single pole, multi-throw rf switching on the 8 beam ports allow the individual beams to be selected one at a time. Preferred embodiment integrated multithrow switches are used. Multiple switch schemes would allow simultaneous beam forming since all 8 beams can exist at the same time.

2. Blass matrix beam selection.

Figure 37:
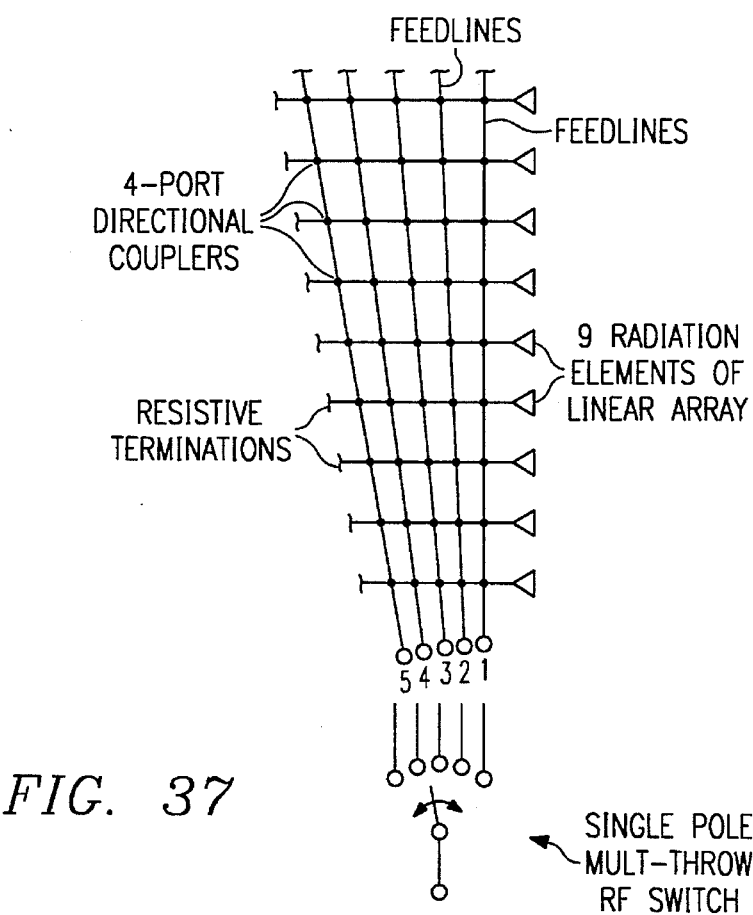
FIG. 37 is a 5-beam Blass matrix beam selection.

As with the Butler matrix, the Blass matrix network will also create simultaneous beams in free space. However, unlike the Butler matrix which has the same number of beams as radiating elements (usually an integral power of 2), the Blass network can create an arbitrary number of simultaneous beams with an arbitrary number of elements. FIG. 37 shows a schematic of a 5-beam Blass matrix feeding a linear array of 9 radiating elements. Also, unlike the Butler matrix which has beams evenly spaced in pointing angles, The Blass matrix can have a linear length progression from elements 1 through 9 between any two adjacent feedlines of the Figure and park the beams at any arbitrary pointing direction in space. Again, rf switching between the beam ports allows individual beam selection for transmit or receive or multiple beam selection of the simultaneous beams. A preferred embodiment integrated multithrow switch is used.

3. Rotman lens beam selection

Figure 38:
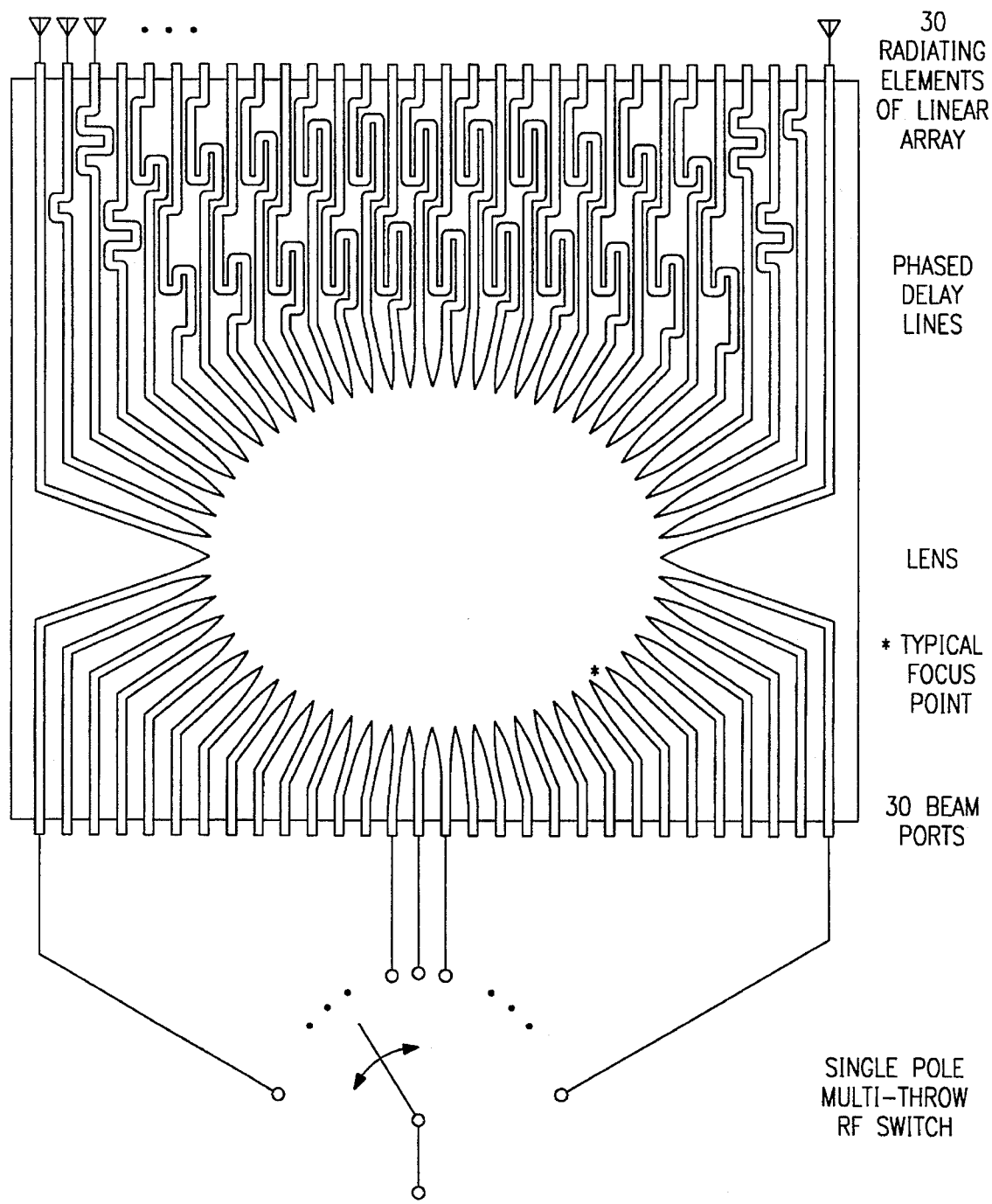
FIG. 38 shows a 30-beam Rotman lens feeding a 30 element linear array.

The Rotman leans is an optical device that focusses the input from several ports of a linear array to a unique point on the rear of the lens. This focussed point is determined by the direction of arrival of the array signal and therefore phase progression of the signals across the linear array. Several beam ports are placed along the back of the lens to collect this focussed energy for each of several possible simultaneous angles of signal arrival. FIG. 38 shows a schematic of a 30 beam Rotman lens feeding a linear array of 30 radiating elements. As with the Butler and Blass matrices, the many Rotman lens beam ports can be switched to a single receiver or transmitter by a preferred embodiment single pole multi-throw rf switch. Also, multiple switch schemes can allow multiple beams to be selected at the same time from the many simultaneous beams.

4. Circular symmetric array beam selection

Figure 39:
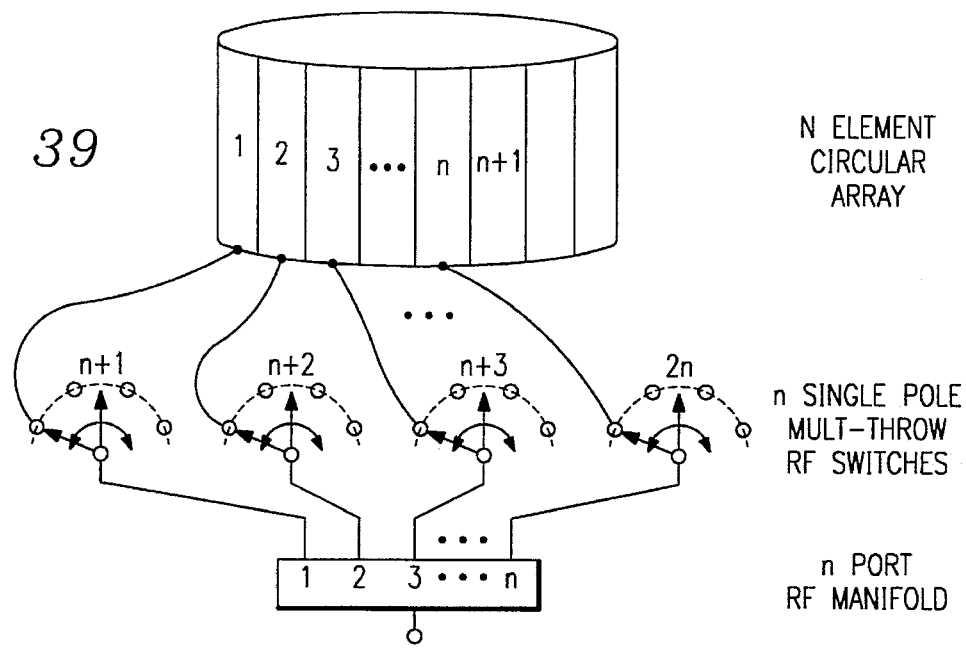
FIG. 39 illustrates circular symmetric array beam selection.

The array of FIG. 39 has elements located at a constant interval around the circular antenna. An rf manifold is used to create n outputs where n is a subset of the total N elements of the circular array. The manifold can have uniform amplitude and phase weighting for maximum effective radiated power or can be amplitude tapered to yield low sidelobe free space patterns. The maifold distribution can also be phase-spoiled to give an altered pattern shape.

A comutating sector of n elements is excited at any one time by rotating rf switching to give 360 degree scan coverage of the pattern, as determined by the manifold. Preferred embodiment intgrated single pole multithrow switches are used.

Preferred Embodiment Transmit/Receive Duplexing

1. Transmit/receive duplexing

FIG. 40 is a simplified schematic of a transmit/receive module. Preferred embodiment SPDT rf switches are used to select either trasnmit or recive capability by connecting the manifold and radiating element ports through the transmit power amplifier (PA) or the receive low noise amplifier (LNA) respectively.

Preferred Embodiment Frequency Seletion

1. Filter selectivity tuning

Figure 41:
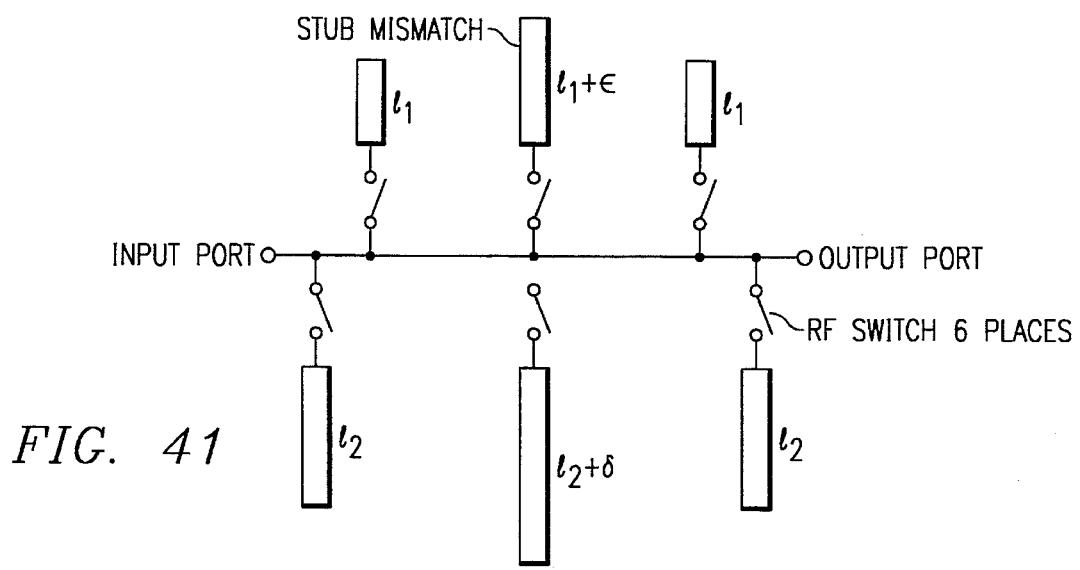
FIG. 41 shows filter selectivity tuning.

An rf filter is a two port device that selectively passes desired frequencies while reflecting or absorbing unwanted frequencies. A reflective filter with a desired passband and stop band is often realized by the accumulation of precise synchronously tuned mismatches spaced along the transmission line connecting input and output ports. FIG. 41 shows the schematic of a filter in which the synchronously tuned mismatches are stubs (either open or short circuited) that create selective frequency reflections. The frequency selective regions for passband and stopband are determined by the stub spacing, or separation, and stub lengths. By rf switching, the desired set of 3 upper or 3 lower stubs in the Figure can be selected for the frequency response as required. Preferred embodiment SPST switches provide the connections.

2. Channelizer switching

Many rf systems are required to be broadband for wide frequency coverage applications. However, some components in the system may be inherently narrow band and cannot cover the full operating bandwidth. Also, the wide bandwidth nature of the system may allow unwanted wideband noise to degrade system performance. Therefore, a bank of similar components, each working in its designed narrow band, may be switched in and out as the frequency is varied to satisfy the full band requirement of the system.

Figure 42:
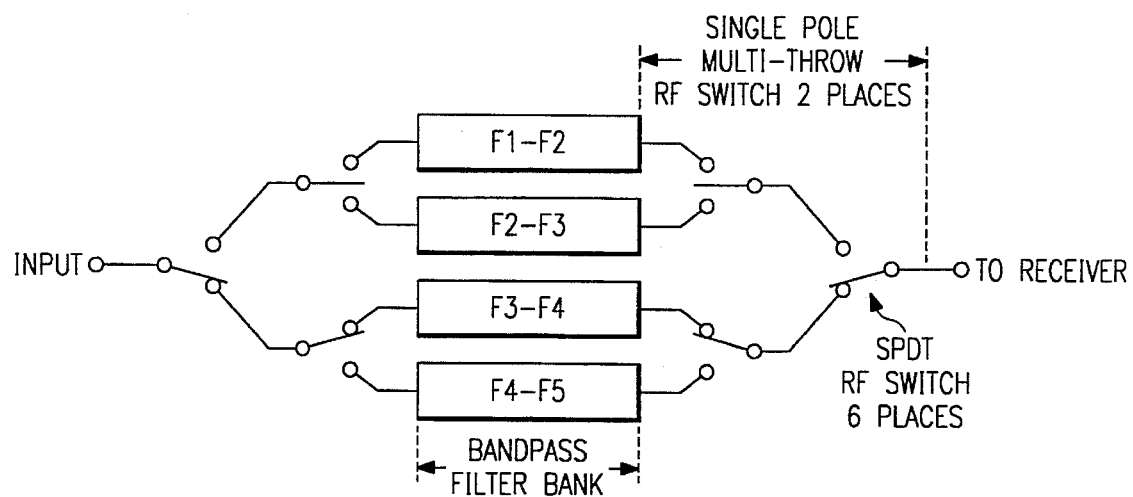
FIG. 42 shows channelizer switching.

Wideband noise can be detrimental to system noise figure and signal-to-noise ratio. FIG. 42 shows an application of the switching technique to minimize the undesirable noise effect. The channelizer is a bank of narrow band bandpass filters each fixed-tuned to contiguous frequency bands across the system bandwidth. As the frequency is varied across the band of operation, the approriate channelizer filter is switched into the receiver path to continuously minimize the noise bandwidth. Note that FIG. 42 depicts a technique to realize a single pole multi-throw rf switch by using a set of SPDT switches. In either case, preferred embodiment SPDTs or preferred embodiment multithrow switches are used.

3. Electronic device impedance match tuning

Elecronic devices ranging from hand-held cellular telephones to high power radar transmitters operate in the microwave frequency range and are subject to high frequencvy impedance mismatch problems. The matching network required to improve the impedance match may be different under differing operating conditions. An example is a hand-held telephone with its antenna in the stowed position versus partially or fully extended or operating inside an aircraft versus a conference room or office. Rf switching can be used to create this needed variable tuning network.

Figure 43:
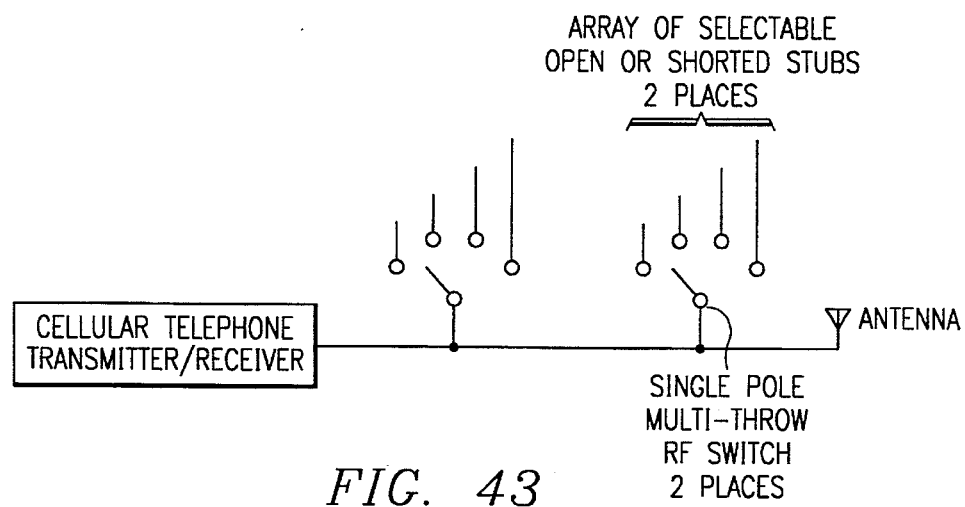
FIG. 43 illustrates electronic device impedance match tuning.

FIG. 43 shows an example of variable tuning the impedance match between the antenna and transmitter/receiver of a cellular telephone. An array of open or shorted stubs can be selected (either manually or automatically) to continuously improve the impedance match between the two electronic devices. This improved match will increase the signal-to-noise ratio, reduce the required transmit power and prolong operating battery life. Preferred embodiment multithrow switches are used, and FIGS. 28*a–b* show the case for six elements.

4. Antenna frequency selectivity tuning.

Figure 44:
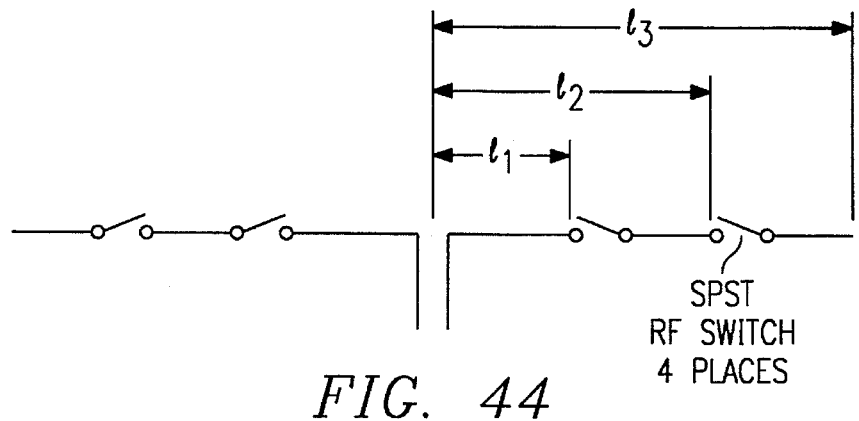
FIGS. 44–45 show dipole and circular patch antenna frequency selectivity tuning.
Figure 45:
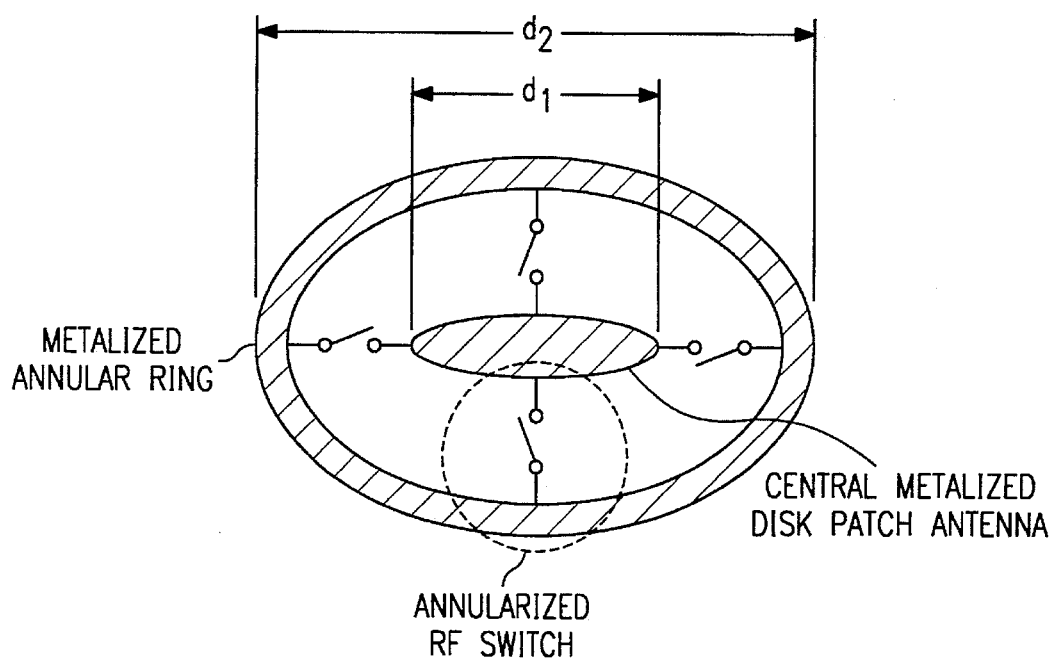

Most rf antennas operate at a frequency range that is determined by the radiating element size. By altering the physical dimensions of various antennas, the antenna tuned frequency can be selected. FIGS. 44–45 shows two examples of rf switching used to select the antenna size, and therefore, antenna selective tuned frequency.

FIG. 44 shows a dipole antenna whose half wave resonant length can be selectively chosen as $21_1$, $21_2$, or $21_3$ by the appropriate preferred embodiment rf switch positions. Thus, the dipole can be tuned to any one of three frequencies. Additional tuned frequencies may be generated by extending the antenna size with additional switches.

FIG. 45 presents a circular patch antenna consisting of the central metallized disk. The disk will resonate and, therefore, radiate at a frequency in which the disk diameter, $d_1$, is one-half wavelength. By the implementation of rf switching to effectively increase the patch antenna diameter to $d_2$, the antenna will resonate (and radiate) at a different frequency. This rf switching may be realized, for example, by a movable (or deformable) metallized annular contact as in switch 1400 that connects the central disk of the Figure to the metallized annular ring.

Another embodiment of this concept is to let the movable metallized annular contact have an outer diameter of $d_2$, thus eliminating the need for the metallized annular ring in FIG. 45. When the movable annular contact is connected to the central disk, the effective patch diameter of the switched combination is $d_2$.

5. Reconfigurable low RCS (Radar Cross-Section) antenna arrays.

Stealth technology requires that antenna arrays have very low RCS properties. An antenna array that is instantaneously non-operating may reflect and re-radiate unwanted signals as a result of an enemy jammer (for example) illuminating the array. Thus, enemy detection of the presence of an aircraft of other platform carrying the array may be achieved.

By intantaneous intentional detuning, or spoiling, the antenna array radiating elements in a random manner, the radiation pattern from the array apertaure can be significantly altered or eliminated. Thus, reduction of re-radiated unwanted signals can be achieved. Techniques similar to those mentioned in the Antenna Frequency Selectivity Tuning section can be implemented to realize this reconfigurable low RCS antenna array capability. That is, preferred embodiment switches among patches of an array can be open and closed to vary the effective patch sizes.

Modifications

The preferred embodiments may be varied in many ways while retaining one or more of the features of micromechanical switching by membranes or flaps supported on at least two sides.

For example, the dimensions, materials, and voltages can be varied to accommodate switching speed, frequencies of concern, switching control voltage desired, and so forth.

What is claimed is:

1. An integrated circuit switch, comprising:
   (a) a membrane supported over a first conductor on a substrate;
   (b) a conductive region on said membrane and connecting to a second conductor on said substrate; and
   (c) a pulldown electrode on said substrate and under said membrane,
   (d) wherein a voltage greater than a pulldown threshold and applied between said conductive region and said pulldown electrode will pull said membrane down to make a capacitive coupling to said first conductor.

2. The switch of claim 1, further comprising:
   (a) a pullup electrode supported over said membrane;
   (b) wherein a voltage greater than a pullup threshold and applied between said conductive region and said pullup electrode will pull said membrane up to disrupt any electrical coupling of said membrane to said first conductor when no voltage is applied between said membrane and said pulldown electrode.

3. The switch of claim 2, wherein:
   (a) said membrane has two stable states with one stable state with the membrane pulled down and the other stable state with the membrane pulled up.

4. The switch of claim 3, wherein:
   (a) said membrane includes a layer of a compressive dielectric.

5. An integrated circuit switch, comprising:
   (a) a membrane supported over first and second conductors on a substrate;
   (b) a conductive region on said membrane; and
   (c) a pulldown electrode on said substrate and under said membrane;
   (d) wherein a voltage greater than a threshold and applied between said conductive region and said pulldown electrode will pull said membrane down to electrically couple said first and second conductors.

6. The switch of claim 5, wherein:
   (a) said electrically couple is a capacitive couple.

7. The switch of claim 5, wherein:
   (a) said electrically couple is an ohmic couple.

8. The switch of claim 5, further comprising:
   (a) a pullup electrode supported over said membrane;
   (b) wherein a voltage greater than a pullup threshold and applied between said conductive region and said pullup electrode will pull said membrane up to disrupt any electrical coupling of said first and second conductors when no voltage is applied between said membrane and said pulldown electrode.

9. The switch of claim 8, wherein:
   (a) said membrane has two stable states with one stable state with the membrane pulled down and the other stable state with the membrane pulled up.

10. An integrated circuit multiple-throw switch, comprising:
    (a) a membrane supported over a plurality of output conductors on a substrate;
    (b) a conductive region on said membrane and connecting to an input conductor on said substrate; and
    (c) a plurality of pulldown electrodes on said substrate and under said membrane;
    (d) wherein a voltage greater than a pulldown threshold and applied between said conductive region and one of said plurality of pulldown electrodes will pull said membrane down to make a capacitive coupling to a corresponding one of said plurality of output conductors.

11. An integrated circuit switch comprising:
    a dielectric membrane supported over a first conductor on a substrate;
    a conductive region on said membrane and connecting to a second conductor on said substrate; and
    a pulldown electrode on said substrate and under said membrane,
    wherein a voltage greater than a pulldown threshold and applied between said conductive region and said pulldown electrode will pull said membrane down to make an electrical coupling to said first conductor.

12. The switch of claim 11 wherein said coupling is capacitive.

13. The switch of claim 11 wherein said coupling is ohmic.

14. The switch of claim 11 further comprising a pullup electrode supported over said membrane, wherein a voltage greater than a pullup threshold and applied between said conductive region and said pullup electrode will pull said membrane up to disrupt any electrical coupling of said membrane to said first conductor when no voltage is applied between said membrane and said pulldown electrode.

15. The switch of claim 14 wherein said membrane has two stable states with one stable state with the membrane pulled down and the other stable state with the membrane pulled up.

16. The switch of claim 15 wherein said membrane includes a layer of a compressive dielectric.

17. An integrated circuit switch comprising:

a membrane supported over a first conductor on a substrate;

a conductive region on said membrane and connecting to a second conductor on said substrate;

a pulldown electrode on said substrate and under said membrane; and a pullup electrode supported over said membrane, wherein a voltage greater than a pulldown threshold and applied between said conductive region and said pulldown electrode will pull said membrane down to make an electrical coupling to said first conductor, and wherein a voltage greater than a pullup threshold and applied between said conductive region and said pullup electrode will pull said membrane up to disrupt any electrical coupling of said membrane to said first conductor when no voltage is applied between said membrane and said pulldown electrode.

18. The switch of claim 17 wherein said membrane has two stable states with one stable state with the membrane pulled down and the other stable state with the membrane pulled up.

19. The switch of claim 18 wherein said membrane includes a layer of a compressive dielectric.

* * * * *